United States Patent
Lee et al.

(10) Patent No.: US 11,797,267 B2
(45) Date of Patent: Oct. 24, 2023

(54) METHOD FOR PLAYING AUDIO SOURCE USING USER INTERACTION AND A MUSIC APPLICATION USING THE SAME

(71) Applicant: Verses, Inc., Gimpo-si (KR)

(72) Inventors: Sung Wook Lee, Incheon (KR); Kyung Tae Kim, Incheon (KR); Jung Woo Kang, Incheon (KR)

(73) Assignee: Verses, Inc., Gimpo-Si (KR)

( * ) Notice: Subject to any disclaimer, the term of this patent is extended or adjusted under 35 U.S.C. 154(b) by 0 days.

(21) Appl. No.: 18/096,877

(22) Filed: Jan. 13, 2023

(65) Prior Publication Data
US 2023/0153057 A1 May 18, 2023

Related U.S. Application Data

(63) Continuation of application No. 17/244,668, filed on Apr. 29, 2021, now Pat. No. 11,579,838.

(30) Foreign Application Priority Data

| Nov. 26, 2020 | (KR) | 10-2020-0160721 |
| Nov. 26, 2020 | (KR) | 10-2020-0160722 |
| Apr. 8, 2021 | (KR) | 10-2021-0045930 |
| Apr. 20, 2021 | (KR) | 10-2021-0050821 |
| Apr. 20, 2021 | (KR) | 10-2021-0050822 |
| Apr. 20, 2021 | (KR) | 10-2021-0050823 |

(51) Int. Cl.
*G06F 3/048* (2013.01)
*G06F 3/16* (2006.01)
*G06F 3/04883* (2022.01)

(52) U.S. Cl.
CPC ......... *G06F 3/165* (2013.01); *G06F 3/04883* (2013.01)

(58) Field of Classification Search
CPC ...... G06F 3/04842; G06F 3/167; G06F 3/165; G06F 3/0484
See application file for complete search history.

(56) References Cited

U.S. PATENT DOCUMENTS

| 6,154,600 A * | 11/2000 | Newman | G06F 3/0213 386/281 |
| 6,414,686 B1 * | 7/2002 | Protheroe | G11B 27/034 345/475 |
| 7,742,609 B2 * | 6/2010 | Yeakel | H04H 60/04 715/728 |

(Continued)

*Primary Examiner* — Steven B Theriault
(74) *Attorney, Agent, or Firm* — WTA Patents

(57) ABSTRACT

A method for playing audio source, executed by one or more processors, comprising: playing an audio source set including a first audio source and a second audio source; displaying a first object for an interaction with a user; obtaining an input for the first object; and adjusting at least a part of the audio source set based on the input; wherein in order that a selective change to the audio source set is given by the interaction with the user, when a first input related to the first object is obtained, the audio source set is adjusted so that an output level of the first audio source selected by the first input is highest, wherein in order that a random change to the audio source set is given by the interaction with the user, when a second input related to the first object is obtained, a random audio effect is applied to at least one audio source included in the audio source set.

6 Claims, 27 Drawing Sheets

(56) References Cited

U.S. PATENT DOCUMENTS

| | | | | |
|---|---|---|---|---|
| 7,774,707 | B2* | 8/2010 | Sim | G10H 1/0066 715/727 |
| 8,477,965 | B2* | 7/2013 | Radford | H04H 60/04 381/119 |
| 8,520,858 | B2* | 8/2013 | Metcalf | H04R 5/00 381/59 |
| RE44,611 | E* | 11/2013 | Metcalf | H04S 7/30 381/17 |
| 9,438,993 | B2* | 9/2016 | Gärdenfors | H04M 3/561 |
| 9,640,158 | B1* | 5/2017 | Baker | G10H 1/0008 |
| 9,812,104 | B2* | 11/2017 | Seo | G10H 1/053 |
| 9,877,129 | B2* | 1/2018 | Kim | H04S 1/002 |
| 9,973,163 | B1* | 5/2018 | Desmond | H03G 5/025 |
| 10,014,841 | B2* | 7/2018 | Tammi | H03G 7/007 |
| 10,091,599 | B2* | 10/2018 | Lee | H04R 3/005 |
| 10,186,244 | B2* | 1/2019 | Ou | G10H 1/0091 |
| 10,291,986 | B1* | 5/2019 | Plitkins | H04R 5/04 |
| 10,360,886 | B2* | 7/2019 | Kim | G06F 3/0482 |
| 10,529,312 | B1* | 1/2020 | Adams | G10H 1/42 |
| 10,540,137 | B2* | 1/2020 | Kim | G06F 3/165 |
| 11,120,818 | B2* | 9/2021 | Magnusson | H03G 1/02 |
| 11,127,415 | B2* | 9/2021 | Magnusson | H04N 5/765 |
| 11,212,331 | B1* | 12/2021 | Gaiduchenko | H04L 65/61 |
| 2002/0141597 | A1* | 10/2002 | Wilcock | G11B 19/025 381/61 |
| 2002/0150254 | A1* | 10/2002 | Wilcock | G06F 3/011 381/1 |
| 2002/0151996 | A1* | 10/2002 | Wilcock | G06F 3/167 381/61 |
| 2003/0000368 | A1* | 1/2003 | Isozaki | G10H 1/0058 84/609 |
| 2004/0030425 | A1* | 2/2004 | Yeakel | H04H 60/04 381/119 |
| 2006/0095147 | A1* | 5/2006 | Van De Kerkhof | G06F 3/04847 700/52 |
| 2006/0117261 | A1* | 6/2006 | Sim | G10H 1/0066 715/727 |
| 2007/0169615 | A1* | 7/2007 | Chidlaw | G10H 1/0091 84/723 |
| 2008/0297483 | A1* | 12/2008 | Kim | G06F 3/04847 345/173 |
| 2009/0129609 | A1* | 5/2009 | Oh | H04R 1/406 381/92 |
| 2010/0056128 | A1* | 3/2010 | Hwang | H04M 1/72403 455/418 |
| 2010/0085379 | A1* | 4/2010 | Hishikawa | G06F 3/017 381/119 |
| 2010/0194677 | A1* | 8/2010 | Fiebrink | G06F 3/0488 345/184 |
| 2010/0247062 | A1* | 9/2010 | Bailey | G11B 27/034 386/280 |
| 2010/0272297 | A1* | 10/2010 | Boretzki | H04R 25/70 381/312 |
| 2010/0303261 | A1* | 12/2010 | Stieler von Heydekampf | H04H 60/04 381/119 |
| 2010/0328419 | A1* | 12/2010 | Etter | H04S 7/303 381/306 |
| 2011/0004467 | A1* | 1/2011 | Taub | G11B 27/034 381/62 |
| 2011/0013075 | A1* | 1/2011 | Kim | H04N 7/147 348/370 |
| 2011/0064233 | A1* | 3/2011 | Van Buskirk | G10H 1/125 381/61 |
| 2011/0078571 | A1* | 3/2011 | Asbahr | A63F 13/52 715/716 |
| 2012/0054613 | A1* | 3/2012 | Yoo | H04M 1/724 715/716 |
| 2012/0130516 | A1* | 5/2012 | Reinsch | G10H 1/46 700/94 |
| 2013/0089221 | A1* | 4/2013 | Kim | H04S 7/302 381/97 |
| 2013/0251157 | A1* | 9/2013 | Munch | H04S 7/30 381/17 |
| 2014/0068435 | A1* | 3/2014 | Miyajima | G11B 27/10 715/716 |
| 2014/0115470 | A1* | 4/2014 | Meaney | H04N 21/4143 715/719 |
| 2014/0211969 | A1* | 7/2014 | Kim | H03G 3/04 381/109 |
| 2014/0270214 | A1* | 9/2014 | Brandt | G10H 1/0091 381/61 |
| 2014/0281986 | A1* | 9/2014 | Hsu | G11B 27/031 715/716 |
| 2014/0294183 | A1* | 10/2014 | Lee | G06F 3/165 381/56 |
| 2015/0003616 | A1* | 1/2015 | Middlemiss | H04S 7/303 381/17 |
| 2015/0070148 | A1* | 3/2015 | Cruz-Hernandez | G06F 3/016 340/407.1 |
| 2015/0110281 | A1* | 4/2015 | Mizuhiki | G10H 1/0091 381/61 |
| 2015/0113407 | A1* | 4/2015 | Hoffert | H04N 21/482 715/720 |
| 2015/0186109 | A1* | 7/2015 | Jarvinen | G06F 3/167 715/728 |
| 2015/0199024 | A1* | 7/2015 | Birnbaum | H04N 21/41407 715/702 |
| 2016/0041806 | A1* | 2/2016 | Laaksonen | G06F 3/16 700/94 |
| 2016/0071526 | A1* | 3/2016 | Wingate | G01S 3/807 704/233 |
| 2016/0080684 | A1* | 3/2016 | Farrell | H04N 5/77 386/227 |
| 2016/0291930 | A1* | 10/2016 | Isherwood | G06F 3/0346 |
| 2016/0342200 | A1* | 11/2016 | Dziuk | G11B 27/038 |
| 2017/0019745 | A1* | 1/2017 | Lee | H04R 29/008 |
| 2017/0047053 | A1* | 2/2017 | Seo | G10H 1/053 |
| 2017/0206055 | A1* | 7/2017 | Baker | G06F 3/165 |
| 2018/0083587 | A1* | 3/2018 | Tammi | H03G 3/04 |
| 2018/0260993 | A1* | 9/2018 | Thumm | A63F 13/57 |
| 2018/0268792 | A1* | 9/2018 | Serletic | G10H 1/0025 |
| 2019/0045315 | A1* | 2/2019 | Dickins | G06F 3/017 |
| 2019/0103080 | A1* | 4/2019 | Decker | G10H 1/40 |
| 2019/0286412 | A1* | 9/2019 | McGibney | H04R 3/005 |
| 2019/0344185 | A1* | 11/2019 | Fargo | G06T 19/20 |
| 2020/0052667 | A1* | 2/2020 | Jeon | H04M 1/72454 |
| 2020/0081682 | A1* | 3/2020 | Vestal | H04L 65/611 |
| 2020/0209952 | A1* | 7/2020 | Järvinen | G06F 3/017 |
| 2020/0374649 | A1* | 11/2020 | Hestermann | H04S 7/30 |
| 2020/0387538 | A1* | 12/2020 | Shintani | G06F 16/685 |
| 2021/0357173 | A1* | 11/2021 | Wei | H04N 21/4394 |
| 2021/0358514 | A1* | 11/2021 | Betts | H04S 7/30 |
| 2021/0405960 | A1* | 12/2021 | Glaser | G06F 3/165 |

* cited by examiner

FIG. 20
1510
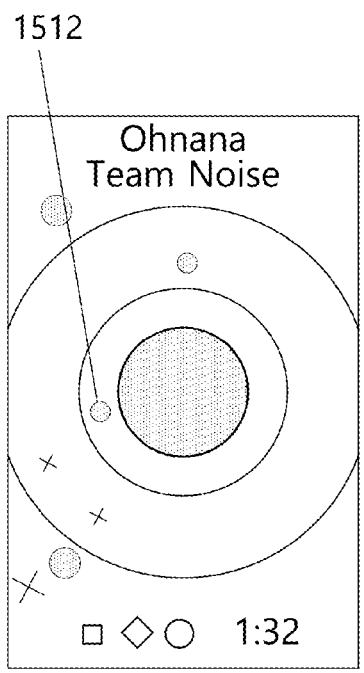 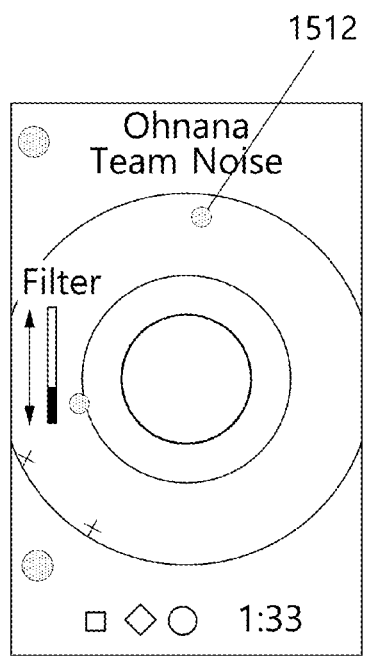

FIG. 26

- S1910: DISPLAYING AT LEAST ONE OBJECT FOR NON-LINEARLY PLAYING A FIRST AUDIO SOURCE SET, A SECOND AUDIO SOURCE SET, AND A THIRD AUDIO SOURCE SET
- S1920: PLAYING AT LEAST ONE OF A FIRST AUDIO SOURCE SET, A SECOND AUDIO SOURCE SET, AND A THIRD AUDIO SOURCE SET

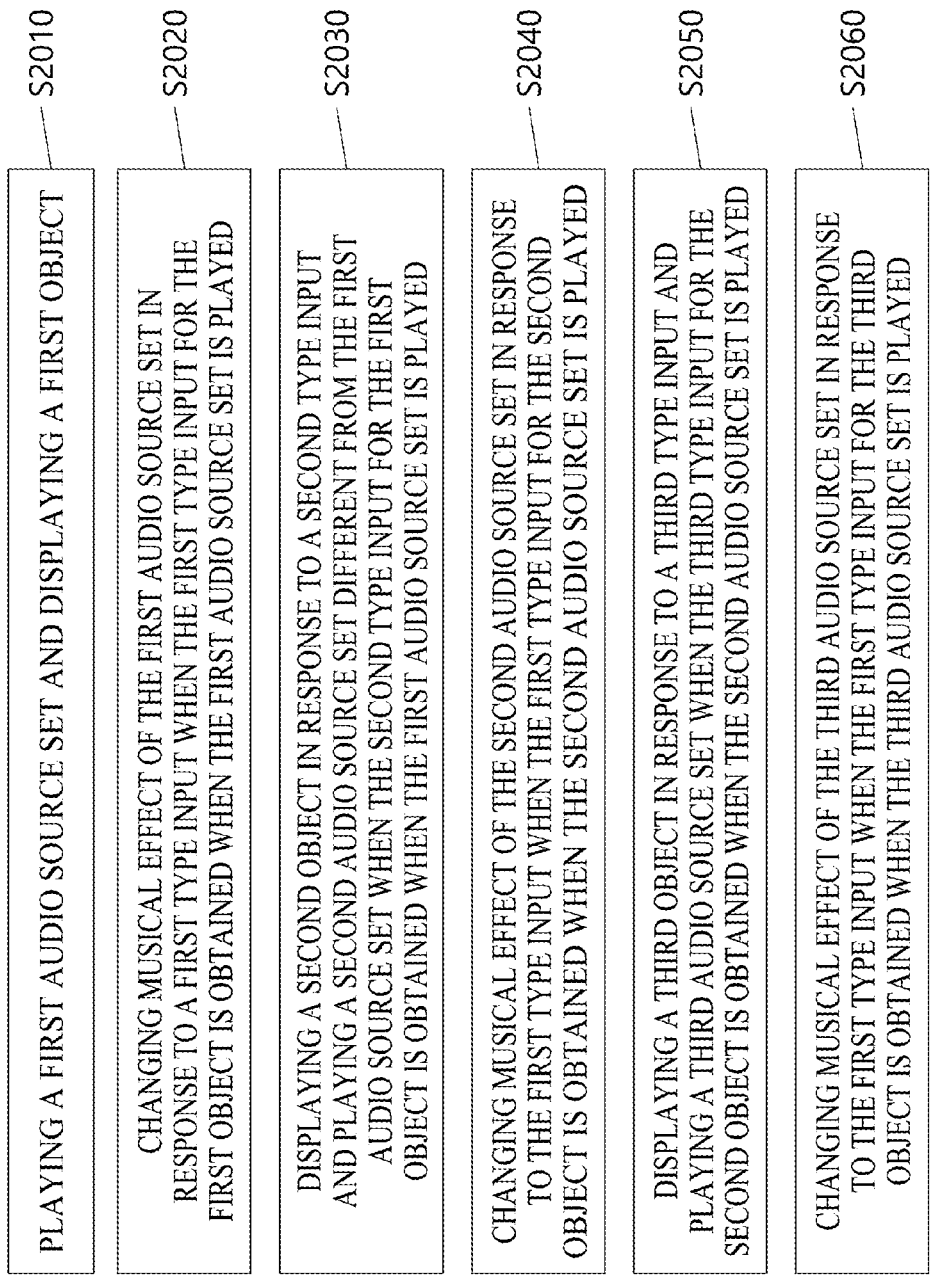

METHOD FOR PLAYING AUDIO SOURCE USING USER INTERACTION AND A MUSIC APPLICATION USING THE SAME

CROSS-REFERENCE TO RELATED APPLICATIONS

This is a continuation of U.S. patent application Ser. No. 17/244,668, filed on Apr. 29, 2021, which claims priority to and the benefit of Korean Patent Application No. 10-2020-0160721, filed on Nov. 26, 2020, Korean Patent Application No. 10-2020-0160722, filed on Nov. 26, 2020, Korean Patent Application No. 10-2021-0045930, filed on Apr. 8, 2021, Korean Patent Application No. 10-2021-0050821, filed on Apr. 20, 2021, Korean Patent Application No. 10-2021-0050822, filed on Apr. 20, 2021, Korean Patent Application No. 10-2021-0050823, filed on Apr. 20, 2021, the disclosure of which are incorporated herein by reference in their entirety.

TECHNICAL FIELD

The present disclosure relates to a method for playing audio source using user interaction and a music application using the same, more specifically, a method for playing audio source limited in time and space as various music by using user interaction and a music application using the same.

BACKGROUND

Since recording and listening to music using storage media, music has become the target of passive appreciation, and actively and proactively participating in music has been regarded as the realm of a musical expert.

Also, due to the physical limitations of record plates that were used as storage media in the early days, the conventional length of music has been decided, and even in the era of digital music, which is beyond the physical limits of record plates, the conventional length of music has become the length of popular music.

Eventually, it is bound to remain in the limited role of inactive/passive appreciation of the given music within a limited length of time, such that most of the consumers of music living in the modern society have lost one of the natural pleasures of music.

Therefore, in order to bring back the original enjoyment of music to the consumers of music, an audio source playback method that lowers the barriers to participation in music, uses limited audio sources, and is carefully designed to break away from the conventional length of music may be needed.

SUMMARY

The present disclosure is directed to provide a realistic audio source playback method for giving a user a natural musical vitality.

The present disclosure is directed to provide a realistic audio source playback method for imparting liveliness to music based on an interaction with a user.

The present disclosure is directed to provide a realistic audio source playback method for creating various musical experiences to users.

The present disclosure is directed to provide a realistic audio source playback method for creating a user-led and diverse musical experience.

The present disclosure is directed to provide a realistic audio source playback method for non-linearly playing an audio source set.

According to an embodiment, a realistic audio source playback method to give a natural musical vitality to the user by changing the frequency spectrum constituting the sound in real time based on the musical meter includes playing a first audio source set including a first audio source and a second audio source, displaying a guide object included in the guide area, displaying the first object moved to the guide object, and playing a second audio source set including at least a third audio source so that the output level of the third audio source is higher than the output level of the second audio source to change the frequency spectrum constituting the sound output after the time point at which the first input is acquired when the first object at least partially overlaps with the guide area at a time point at which the first input is obtained from the user, and when bar is a musical meter including a reference beat number of at least one of the first to third audio sources, the first audio source set is played in a partial section of the first bar in which the first object is displayed, and a time point at which the first object overlaps at least partially with the guide area may be provided to a realistic audio source playback method included in a section between the last beat of the first bar and the first beat of the second bar so that the second audio source set is played in a partial section of the second bar in which the first object is not displayed.

According to another embodiment, a realistic audio source playback method to give a natural musical vitality to the user by changing the frequency spectrum constituting the sound in real time includes playing the first audio source, displaying a guide object included in the guide area, displaying the first type object and the second type object moved to the guide object, obtaining a first input related to the first type object and a second input related to the second type object, playing at least one audio source in response to the second input when the second input is obtained, and changing an audio source to be played in response to the second input when the first input is obtained, and a realistic audio source playback method can be provided in which a second audio source is played when the second input is obtained from the user at a first time point, the audio source to be played is changed in response to the second input when the first input is obtained from the user at a second time point after the first time point, and a third audio source different from the second audio source is played hen a second input is obtained from the user at a third time point after the second time point.

According to another embodiment, a realistic audio source playback method to induce a natural musical change within a limited time and space to the user based on an interaction with a user and to give a sense of life by allowing free musical change includes playing the first audio source, displaying a guide object included in the guide area, displaying the first object moved to the guide object, outputting a first audio effect in response to the first input in order to induce a sound change due to an interaction with the user in a time section in which the first object overlaps the guide area as the first input is obtained from the user when the first object overlaps at least partially with the guide area, and outputting a second audio effect in response to the second input in order to extend the temporal degree of freedom of sound change in a temporal section in which the first object does not overlap with the guide area as a second input for an area corresponding to the position of the first object is obtained from the user when the first object does not overlap with the guide area.

According to another embodiment, a realistic audio source playback method to create a variety of musical experiences for the user by giving the user a leading musical experience by giving the user a selective change to the audio source based on the interaction with the user includes playing an audio source set including a first audio source and a second audio source, displaying a first object for interaction with a user, obtaining an input for the first object, and adjusting at least a part of the audio source set based on the obtained input, and in the adjusting of the at least a part of the audio source set, when a first input related to the first object is obtained so that a selective change to the audio source set is given at a time point intended by the user according to an interaction with the user, the audio source set is applied so that the output level of the first audio source selected by the first input among the audio source sets is highest, and when a second input related to the first object is obtained so that a random change to the audio source set is given at a time point intended by the user according to the interaction with the user, a random audio effect is applied to at least one audio source in the audio source set.

According to another embodiment, a realistic audio source playback method to generate a variety of musical experiences for users by giving users the possibility of continuous change to the audio source based on interactions with the user to generate a leading musical experience to the user, but by giving the possibility of random change to the audio source includes playing an audio source set including a first audio source and a second audio source, displaying at least one object for interaction with a user, obtaining an input for the at least one object, and adjusting at least part of the audio source set based on the obtained input, and in the adjusting of the at least part of the audio source set, a first object among the at least one object is displayed during a first time section in order to perform a selective change to the audio source set at a time point expected by the user according to the interaction with the user, and the audio source set is adjusted so that the output level of the first audio source selected by the first input among the audio source sets is the highest when a first input related to the first object is obtained, and a second object among the at least one object is displayed at an arbitrary time point for a time within a second time section shorter than the first time section in order to perform a selective change to the audio source set is performed at an arbitrary time section according to the interaction with the user, and an audio effect corresponding to the second object is applied to at least a part of the audio source set when a second input related to the second object is obtained.

According to another embodiment, a realistic audio source playback method to create a variety of musical experiences for users by giving users the possibility of continuous change to the audio source based on interactions with the user to create a leading musical experience to the user, but by giving the possibility of random change to the audio source includes playing an audio source set including a first audio source and a second audio source, displaying at least one object for interaction with a user, obtaining an input for the at least one object, and adjusting at least part of the audio source set based on the obtained input, and in the adjusting of the at least part of the audio source set, in order to maintain the possibility of the user's interaction with the first audio effect group, but randomly generate the possibility of the user's interaction with the second audio effect group, a first object among the at least one object is displayed during a first time section, and a second object among the at least one or more objects is displayed at an arbitrary time point for a second time section shorter than the first time section, and when a first input related to the first object is obtained from a user, at least one audio effect included in the first audio effect group is applied, and when a second input related to the second object is obtained from a user, at least one audio effect included in the second audio effect group is applied.

According to another embodiment, an audio source playback method for non-linearly playing a first audio source set, a second audio source set, and a third audio source set based on an interaction with a user includes displaying at least one object for non-linearly playing the first audio source set, the second audio source set, and the third audio source set, and playing at least one audio source set of the first audio source set, the second audio source set, and the third audio source set, and in order to play the first, second and third audio source sets non-linearly based on the user's interaction, when the first input for the at least one object is obtained when the first audio source set is played, the second audio source set is played irrespective of whether the first audio source set is terminated, and as the second input for the at least one object is obtained when the first audio source set is played, the third audio source set is played regardless of whether the first audio source set is terminated, and the second audio source set is played as at least one audio source set of the first and third audio source sets is terminated, and the third audio source set is set not to be played according to the end of the first and second audio source sets.

According to another embodiment, an audio source playback method for non-linearly playing a first audio source set, a second audio source set, and a third audio source set based on an interaction with a user includes displaying at least one object for non-linearly playing the first audio source set, the second audio source set, and the third audio source set, and playing at least one audio source set of the first audio source set, the second audio source set, and the third audio source set, and in order to play the first, second and third audio source sets non-linearly based on the user's interaction, the second audio source set is played according to the end of at least one audio source set of the first and third audio source sets, and when an input to the at least one object among the first or second audio source set play is obtained in the third audio source set, it is set to play regardless of the end of the first or second audio source set, and when there is no input to the at least one object among the playback of the first or second audio source set, it is set not to be played.

According to another embodiment, an audio source playback method for non-linearly playing a first audio source set, a second audio source set, and a third audio source set based on an interaction with a user includes displaying at least one object for non-linearly playing the first audio source set, the second audio source set, and the third audio source set, and playing at least one audio source set of the first audio source set, the second audio source set, and the third audio source set, and in order to play the first, second and third audio source sets non-linearly based on the user's interaction, as the first input for the at least one object is obtained when the first audio source set is played, the second audio source set is played irrespective of whether the first audio source set is terminated, and as the second input for the at least one object is obtained when the first audio source set is played, the third audio source set is played regardless of whether the first audio source set is terminated, and the average energy of the third audio source set at the same volume is greater than the average energy of the second audio source set, and the number of times of inputting the second input or the length of the input period is greater than the number of times of inputting the first input or longer than the length of the input period of the first input.

According to another embodiment, an audio source playback method for non-linearly playing a first audio source set, a second audio source set, and a third audio source set based on an interaction with a user includes playing the first audio source set and displaying the first object, adjusting the first audio source set in response to the first type input when the first type input related to the first object is obtained when the first audio source set is played, displaying a second object in response to the second type input and playing a second audio source set different from the first audio source set when the second type input for the first object is obtained when the first audio source set is played, adjusting the second audio source set in response to the first type input when the first type input for the second object is obtained when the second audio source set is played, displaying a third object in response to the third type input and playing a third audio source set when the third type input for the second object is obtained when the second audio source set is played, and adjusting a third audio source in response to the first type input when the first type input for the third object is obtained when the third audio source set is played.

According to an embodiment of the present invention, a realistic audio source playback method may be provided to give a user a natural musical dynamism by changing a frequency spectrum constituting a sound in real time based on a musical meter.

According to an embodiment of the present invention, a realistic audio source playback method may be provided to induce a natural musical change within a limited space and time to the user based on an interaction with the user and to give a sense of life by allowing a free musical change.

According to an embodiment of the present invention, a realistic audio source playback method may be provided to generate a leading musical experience for the user by giving selective changes to the audio source based on the interaction with the user and generate various musical experiences for users by giving non-selective changes to the audio source.

According to an embodiment of the present invention, a realistic audio source playback method may be provided to generate a leading musical experience for the user by giving the possibility of continuous change to the audio source based on the interaction with the user and generate various musical experiences to users by giving the possibility of arbitrary change to the audio source.

According to an embodiment of the present invention, an audio source playback method for non-linearly playing at least one audio source set based on an interaction with a user may be provided.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIGS. 18 to 20 are diagrams for explaining an interface according to an embodiment.

FIG. 26 is a flowchart illustrating a realistic audio source playback method according to an embodiment.

FIG. 27 is a flowchart illustrating a realistic audio source playback method according to an embodiment.

DETAILED DESCRIPTION

Figure 1:
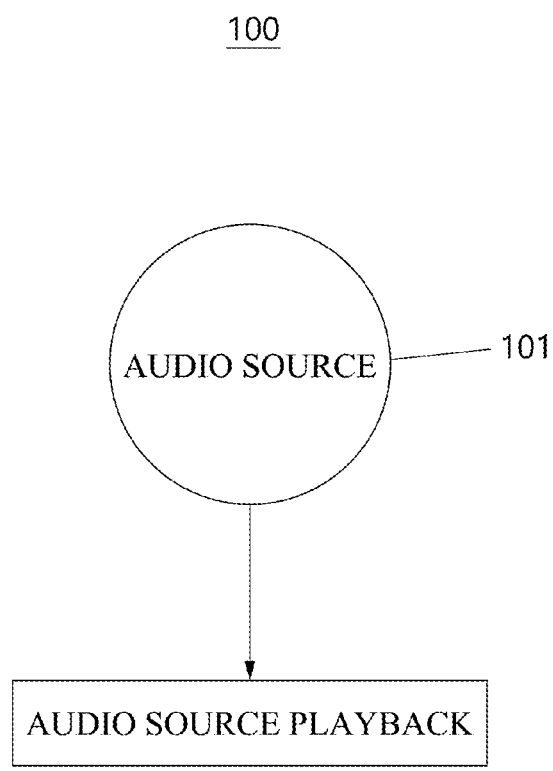
FIG. 1 is a diagram illustrating a conventional audio source play system.

The above-described objects, features, and advantages of the present disclosure will be more apparent through the following detailed description with reference to the attached drawings. However, since a variety of modifications and a variety of embodiments of the present disclosure may be made, hereinafter, particular embodiments are illustrated in the drawings and will be described in detail.

Throughout the drawings, thicknesses of layers and areas may be exaggerated for clarity. Designation of an element or a layer as being on "on" another element or layer includes not only a case of being directly on the other element or layer but also a case of an intervening layer or element being present therebetween. Throughout the specification, like reference numerals basically refer to like elements. Elements in the drawings with respect to each of embodiments which have the same function within the equal conceptual scope will be described as being referred to as like reference numerals.

A detailed description of well-known functions or components of the related art will be omitted when it is deemed to obscure the essence of the present disclosure. Also, ordinal numbers used herein (for example, a first, a second, and the like) are merely identification symbols for distinguishing one component from another component.

Also, the terms "module" and "unit" related to components used herein are given or mixedly used in consideration of only convenience of drafting the specification and do not have mutually distinguishable meanings or functions in and of themselves.

Since the embodiments described in this specification are intended to clearly explain the spirit of the present invention to those of ordinary skill in the technical field to which the present invention belongs, the present invention is not limited to the examples described herein, and the scope of the present invention should be construed as including modifications or variations that do not depart from the spirit of the present invention.

The terms used in this specification have been selected from general terms that are currently widely used as possible in consideration of functions in the present invention, but this may vary according to the intention of a person of ordinary skill in the technical field to which the present invention belongs, precedents, or the emergence of new technologies. However, if a specific term is defined and used in an arbitrary meaning unlike this, the meaning of the term will be separately described. Therefore, the terms used in the present specification should be interpreted based on the actual meaning of the term and the entire contents of the present specification, not a simple name of the term.

The drawings attached to the present specification are for easy explanation of the present invention, and since the shape shown in the drawings may be exaggerated and displayed as necessary to aid understanding of the present invention, the present invention is not limited by the drawings.

In the present specification, when it is determined that a detailed description of a well-known configuration or function related to the present invention may obscure the subject matter of the present invention, a detailed description thereof will be omitted as necessary.

According to an embodiment of the present invention, a realistic audio source playback method to give a natural musical vitality to the user by changing the frequency spectrum constituting the sound in real time based on the musical meter includes playing a first audio source set including a first audio source and a second audio source, displaying a guide object included in the guide area, displaying the first object moved to the guide object, and playing a second audio source set including at least a third audio source so that the output level of the third audio source is higher than the output level of the second audio source to change the frequency spectrum constituting the sound output after the time point at which the first input is acquired when the first object at least partially overlaps with the guide area at a time point at which the first input is obtained from the user, and when bar is a musical meter including a reference beat number of at least one of the first to third audio sources, the first audio source set is played in a partial section of the first bar in which the first object is displayed, and a time point at which the first object overlaps at least partially with the guide area may be provided to a realistic audio source playback method included in a section between the last beat of the first bar and the first beat of the second bar so that the second audio source set is played in a partial section of the second bar in which the first object is not displayed.

Here, the first input may include a touch input.

Here, the first input may include a touch input corresponding to the position of the first object.

Here, the first input may include a touch input for a background object.

Here, the second audio source set may include the first audio source and the third audio source, but may not include the second audio source.

Here, the second audio source set includes the first audio source, the second audio source, and the third audio source, but the volume level of the second audio source may be set to be lower than the volume level of the third audio source.

Here, the first audio source, the second audio source, and the third audio source may each include different musical instrument sounds.

Here, the first audio source may include a piano sound, the second audio source may include a drum sound, and the third audio source may include a guitar sound.

Here, when the first object at least partially overlaps the guide area at a time point at which the first input is obtained, a fourth audio source may be additionally played.

Here, the fourth audio source may include vocal sound.

Here, when the first object at least partially overlaps the guide area at a time point at which the first input is obtained, at least one visual effect may be output.

Here, the at least one visual effect may include lyrics information corresponding to a vocal sound included in the fourth audio source to be additionally played.

According to another embodiment of the present invention, a realistic audio source playback method to give a natural musical vitality to the user by changing the frequency spectrum constituting the sound in real time includes playing the first audio source, displaying a guide object included in the guide area, displaying the first type object and the second type object moved to the guide object, obtaining a first input related to the first type object and a second input related to the second type object, playing at least one audio source in response to the second input when the second input is obtained, and changing an audio source to be played in response to the second input when the first input is obtained, and a realistic audio source playback method can be provided in which a second audio source is played when the second input is obtained from the user at a first time point, the audio source to be played is changed in response to the second input when the first input is obtained from the user at a second time point after the first time point, and a third audio source different from the second audio source is played hen a second input is obtained from the user at a third time point after the second time point.

Here, the first type object and the second type object may be displayed to be visually distinguished.

Here, the number of the first type objects displayed on one screen at the at least one time point may be less than the number of the second type objects.

Here, the first input and the second input include an input for a background object, and the first input related to the first type object may be an input obtained at a time point at which the first type object at least partially overlaps with the guide area, and the second input related to the second type object may be an input obtained at a time point at which the second type object at least partially overlaps with the guide area.

Here, the second audio source and the third audio source may include different musical instrument sounds.

According to another embodiment of the present invention, a realistic audio source playback method to induce a natural musical change within a limited time and space to the user based on an interaction with a user and to give a sense of life by allowing free musical change includes playing the first audio source, displaying a guide object included in the guide area, displaying the first object moved to the guide object, outputting a first audio effect in response to the first input in order to induce a sound change due to an interaction with the user in a time section in which the first object overlaps the guide area as the first input is obtained from the user when the first object overlaps at least partially with the guide area, and outputting a second audio effect in response to the second input in order to extend the temporal degree of freedom of sound change in a temporal section in which the first object does not overlap with the guide area as a second input for an area corresponding to the position of the first object is obtained from the user when the first object does not overlap with the guide area.

Here, the first input may include a touch input for a background object.

Here, the first audio effect and the second audio effect may be the same audio effect.

Here, the second input includes a drag input for an area corresponding to the position of the first object, and the first audio effect may be output singularly in response to the first input, but the second audio effect may be continuously output for a duration of the second input.

Here, the first audio effect is an audio effect for additionally playing a second audio source, and the second audio effect is an audio effect for additionally playing a third audio source, and the length of the third audio source may be longer than the length of the second audio source.

According to another embodiment of the present invention, a realistic audio source playback method to generate a variety of musical experiences for the user by giving the user a leading musical experience by giving the user a selective change to the audio source based on the interaction with the user includes playing an audio source set including a first audio source and a second audio source, displaying a first object for interaction with a user, obtaining an input for the first object, and adjusting at least a part of the audio source set based on the obtained input, and in the adjusting of the at least a part of the audio source set, when a first input related to the first object is obtained so that a selective change to the audio source set is given at a time point intended by the user according to an interaction with the user, the audio source set is applied so that the output level of the first audio source selected by the first input among the audio source sets is highest, and when a second input related to the first object is obtained so that a random change to the audio source set is given at a time point intended by the user according to the interaction with the user, a random audio effect is applied to at least one audio source in the audio source set.

Here, the first input related to the first object may include a drag input for the first object, and the second input related to the first object may include a touch input on the first object.

Here, in order to adjust the audio source set so that the output level of the first audio source is the highest, the second audio source may not be played.

Here, in order to adjust the audio source set so that the output level of the first audio source is the highest, the volume level of the first audio source may be set to be higher than the volume level of the second audio source.

Here, the volume level of the first audio source is increased and the volume level of the second audio source is decreased, but the volume level of the first audio source may be non-linearly increased, and the volume level of the second audio source may be non-linearly decreased.

Here, the arbitrary audio effect may be determined based on a time point at which the second input is obtained.

According to another embodiment of the present invention, a realistic audio source playback method to generate a variety of musical experiences for users by giving users the possibility of continuous change to the audio source based on interactions with the user to generate a leading musical experience to the user, but by giving the possibility of random change to the audio source includes playing an audio source set including a first audio source and a second audio source, displaying at least one object for interaction with a user, obtaining an input for the at least one object, and adjusting at least part of the audio source set based on the obtained input, and in the adjusting of the at least part of the audio source set, a first object among the at least one object is displayed during a first time section in order to perform a selective change to the audio source set at a time point expected by the user according to the interaction with the user, and the audio source set is adjusted so that the output level of the first audio source selected by the first input among the audio source sets is the highest when a first input related to the first object is obtained, and a second object among the at least one object is displayed at an arbitrary time point for a time within a second time section shorter than the first time section in order to perform a selective change to the audio source set is performed at an arbitrary time section according to the interaction with the user, and an audio effect corresponding to the second object is applied to at least a part of the audio source set when a second input related to the second object is obtained.

Here, the size of the first object may be larger than the size of the second object.

Here, the audio effect corresponding to the second object may include at least one of a tempo control for an audio source, a low pass filter, a high pass filter, a pitch control, a beat repeater, an echo, and a psychedelic mode.

Here, the audio effect corresponding to the second object may be matched and set when the second object is generated.

Here, the number of the second objects displayed on one screen at the at least one time point may be greater than the number of the first objects.

According to another embodiment of the present invention, a realistic audio source playback method to generate a variety of musical experiences for users by giving users the possibility of continuous change to the audio source based on interactions with the user to generate a leading musical experience to the user, but by giving the possibility of random change to the audio source includes playing an audio source set including a first audio source and a second audio source, displaying at least one object for interaction with a user, obtaining an input for the at least one object, and adjusting at least part of the audio source set based on the obtained input, and in the adjusting of the at least part of the audio source set, in order to maintain the possibility of the user's interaction with the first audio effect group, but randomly generate the possibility of the user's interaction with the second audio effect group, a first object among the at least one object is displayed during a first time section, and a second object among the at least one or more objects is displayed at an arbitrary time point for a second time section shorter than the first time section, and when a first input related to the first object is obtained from a user, at least one audio effect included in the first audio effect group is applied, and when a second input related to the second object is obtained from a user, at least one audio effect included in the second audio effect group is applied.

Here, the first audio effect group includes an audio effect for adjusting an audio source set such that an output level of the first or second audio source included in the audio source set is higher than an output level of another audio source, and the second audio effect group may include at least one audio effect among tempo adjustment, low pass filter, high pass filter, pitch adjustment, beat repeater, echo, and psychedelic mode for at least one audio source in the audio source set.

Here, when the first input is obtained for the first object, the audio source set may be adjusted such that the output level of the first audio source selected by the first input among the audio source set is highest.

According to another embodiment of the present invention, an audio source playback method for non-linearly playing a first audio source set, a second audio source set, and a third audio source set based on an interaction with a user includes displaying at least one object for non-linearly playing the first audio source set, the second audio source set, and the third audio source set, and playing at least one audio source set of the first audio source set, the second audio source set, and the third audio source set, and in order to play the first, second and third audio source sets non-linearly based on the user's interaction, when the first input for the at least one object is obtained when the first audio source set is played, the second audio source set is played irrespective of whether the first audio source set is terminated, and as the second input for the at least one object is obtained when the first audio source set is played, the third audio source set is played regardless of whether the first audio source set is terminated, and the second audio source set is played as at least one audio source set of the first and third audio source sets is terminated, and the third audio source set is set not to be played according to the end of the first and second audio source sets.

Here, the first audio source set may correspond to a first portion of music, the second audio source set may correspond to a second portion of the music, and the third audio source set may correspond to a third portion of the music.

Here, the third audio source set may correspond to a highlight portion of the music.

Here, the number of times the second input is input or the length of the input period may be greater than the number of times that the first input is input or longer than the length of the input period of the first input.

Here, the average energy of the third audio source set at the same volume level may be greater than the average energy of the second audio source set.

Here, the at least one object includes a plurality of objects, and an object related to the first input and an object related to the second input may be different from each other.

According to another embodiment of the present invention, an audio source playback method for non-linearly playing a first audio source set, a second audio source set, and a third audio source set based on an interaction with a user includes displaying at least one object for non-linearly playing the first audio source set, the second audio source set, and the third audio source set, and playing at least one audio source set of the first audio source set, the second audio source set, and the third audio source set, and in order to play the first, second and third audio source sets non-linearly based on the user's interaction, the second audio source set is played according to the end of at least one audio source set of the first and third audio source sets, and when an input to the at least one object among the first or second audio source set play is obtained in the third audio source set, it is set to play regardless of the end of the first or second audio source set, and when there is no input to the at least one object among the playback of the first or second audio source set, it is set not to be played.

According to another embodiment of the present invention, an audio source playback method for non-linearly playing a first audio source set, a second audio source set, and a third audio source set based on an interaction with a user includes displaying at least one object for non-linearly playing the first audio source set, the second audio source set, and the third audio source set, and playing at least one audio source set of the first audio source set, the second audio source set, and the third audio source set, and in order to play the first, second and third audio source sets non-linearly based on the user's interaction, as the first input for the at least one object is obtained when the first audio source set is played, the second audio source set is played irrespective of whether the first audio source set is terminated, and as the second input for the at least one object is obtained when the first audio source set is played, the third audio source set is played regardless of whether the first audio source set is terminated, and the average energy of the third audio source set at the same volume is greater than the average energy of the second audio source set, and the number of times of inputting the second input or the length of the input period is greater than the number of times of inputting the first input or longer than the length of the input period of the first input.

According to another embodiment of the present invention, an audio source playback method for non-linearly playing a first audio source set, a second audio source set, and a third audio source set based on an interaction with a user includes playing the first audio source set and displaying the first object, adjusting the first audio source set in response to the first type input when the first type input related to the first object is obtained when the first audio source set is played, displaying a second object in response to the second type input and playing a second audio source set different from the first audio source set when the second type input for the first object is obtained when the first audio source set is played, adjusting the second audio source set in response to the first type input when the first type input for the second object is obtained when the second audio source set is played, displaying a third object in response to the third type input and playing a third audio source set when the third type input for the second object is obtained when the second audio source set is played, and adjusting a third audio source in response to the first type input when the first type input for the third object is obtained when the third audio source set is played.

Here, as the second type input for the third object is obtained when the third audio source set is played, the method may further include playing one of the first audio source set and the second audio source set in response to the second type input.

Here, as the third type input for the first object is obtained when the first audio source set is played, the method may further include displaying the third object and playing the third audio source set in response to the third type input.

Here, the first object, the second object, and the third object may have different shapes.

Here, the type of instrument sound included in the third audio source set is more than the type of instrument sound included in the second audio source set, and the number of sides of the third object may be greater than the number of sides of the second object.

1. Definition of Terms

In the present disclosure, a sound source or an audio source may mean an object or place that generates sound, and mean various things that are stored or generated so that a specific sound can be output using various media.

For example, in this disclosure, a sound source or an audio source may correspond to records stored so that sound can be output using a turntable, CD recordings stored so that sound can be output using a computing device and a speaker connected to it, audio data stored or generated in sound wave format, audio data stored or generated in analog-signal format, audio data stored or generated in digital-signal format, and the like but the present disclosure is not limited thereto.

However, in this disclosure, for convenience of description, a sound source or an audio source may be described as an audio source.

In addition, in the present disclosure, the audio source may correspond to audio data stored in a data format to which audio compression techniques are applied, such as MP3, FLAC, etc., but the present disclosure is not limited thereto.

In addition, in the present disclosure, sound generated from an audio source or output from a sound output device based on an audio source may be described as sound included in the audio source or sound data included in the audio source but the present disclosure is not limited thereto.

In addition, in the present disclosure, an audio source may include at least one piece of sound data. For example, in the present disclosure, the audio source may include one piece of sound data of a specific length for a specific sound, but the present disclosure is not limited thereto.

In addition, in the present disclosure, an audio source may include one sound data corresponding to one object. For example, in the present disclosure, the audio source may include one piece of sound data of a specific length for a specific sound corresponding to a piano, but the present disclosure is not limited thereto.

In addition, in the present disclosure, an audio source may include a plurality of sound data for one object. For example, in the present disclosure, an audio source may include a plurality of sound data of a specific length for a plurality of sounds corresponding to a piano, and also, for example, in this disclosure, the audio source may include a plurality of sound data in which at least one sound for a piano is arranged in time series, but the present disclosure is not limited thereto.

In addition, in the present disclosure, an audio source may include a plurality of sound data for a plurality of objects. For example, in this disclosure, the audio source may include a plurality of sound data including sound data in which at least one or more notes for the piano are listed in a time series and sound data in which at least one or more sounds for the guitar are listed in time series, but the present disclosure is not limited thereto.

In addition, in the present disclosure, the musical meter may mean a unit for classifying and describing music, and may include a beat, a bar, a motive, a phrase, a period, and the like.

In addition, in the present disclosure, a beat may mean one beat of a reference beat as a basic unit of time, and may be understood as a beat that can be understood by a person skilled in the art.

In addition, in the present disclosure, a bar may mean a musical meter including a reference beat number of an audio source, and mean the minimum unit of music divided by vertical lines in the score, and may be understood as a bar that a person skilled in the art can understand.

2. Conventional Audio Source Play System

FIG. 1 is a diagram illustrating a conventional audio source play system.

Referring to FIG. 1, a conventional audio source play system 100 may play an acquired audio source 101 in time series.

For example, the conventional audio source play system 100 may be limited to storing the obtained audio source 101 and outputting a sound source according to time information included in the stored audio source 101.

Therefore, according to the conventional audio source play system 100, temporal and musical changes to the obtained audio source 101 cannot be applied, so that only one piece of music can be played based on one stored audio source.

3. Audio Source Play System According to Present Invention

Figure 2:
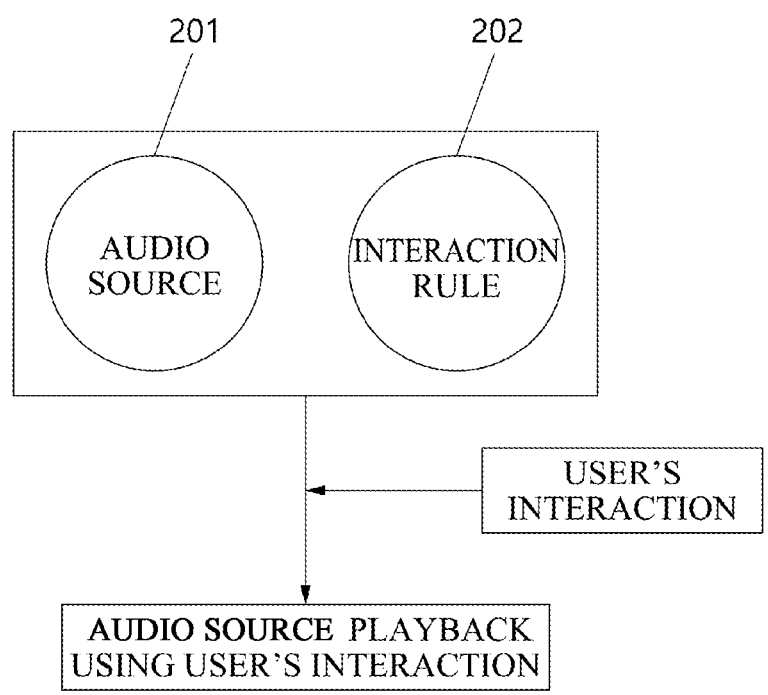
FIG. 2 is a diagram illustrating an audio source play system according to an exemplary embodiment.

FIG. 2 is a diagram illustrating an audio source play system 200 according to an exemplary embodiment.

Referring to FIG. 2, the audio source play system 200 according to an embodiment of the present invention may include an audio source 201 and an interaction rule 202.

In this case, since the above-described contents may be applied to the audio source 201, a redundant description will be omitted.

The interaction rule 202 according to an embodiment may be a rule for matching a specific interaction of a user acquired from a controller with a specific operation of the controller.

For example, the interaction rule 202 according to an embodiment may be an interaction rule set to apply a first audio effect to an audio source played when a user's touch input to a first object is obtained, but the present invention is not limited thereto.

In this case, the user's interaction may be specified according to the target of the interaction and the type of the interaction.

For example, the touch input for a first object may be specified as a first interaction, the touch input for the second object may be specified as the second interaction, the drag input for the first object may be specified as a third interaction, and the drag input for the second object may be specified as the fourth interaction, but the present invention is not limited thereto.

Also, the specific operation of the controller may include an operation of applying an audio effect to apply musical transformation to the played audio source 201, an operation of applying a visual effect to the displayed screen, an operation of replacing or changing the audio source being played, an operation of adding an audio source different from the audio source being played, and an operation of not playing at least some of the audio sources to be played, but the present invention is not limited thereto.

In addition, the audio source play system 200 according to an embodiment of the present invention may play the audio source 201 by using the user's interaction according to the interaction rule 202.

For example, the audio source play system 200 according to an embodiment may be system that plays at least some of the audio sources according to a first interaction rule when a user's first interaction is acquired, and plays another part of the audio source according to a second interaction rule when the second interaction of the user is obtained, but the present invention is not limited thereto.

In addition, for example, the audio source play system 200 according to an embodiment may apply a first audio effect to an audio source played according to a first interaction rule when a user's first interaction is obtained, and apply the second audio effect to the audio source played according to the second interaction rule when the second interaction of the user is obtained, but the present invention is not limited thereto.

In addition, for example, the audio source play system 200 according to an embodiment may apply the first visual effect to a screen output through the display device according to the first interaction rule when the user's first interaction is obtained and apply the second visual effect to the screen output through the display device according to the second interaction rule when the second interaction of the user is obtained, but the present invention is not limited thereto.

Moreover, in addition to the above-described examples, in the audio source play system 200 according to the present invention, when various user interactions are acquired, various operations such as play of an audio source, application of an audio effect, and application of a visual effect may be performed according to the corresponding interaction rule, and through this, various music can be generated and played.

In addition, in order to implement the audio source play system according to the present invention, a file, an application, etc. including the audio source 201 and the interaction rule 202 may be provided, but the present invention is not limited thereto.

Figure 3:
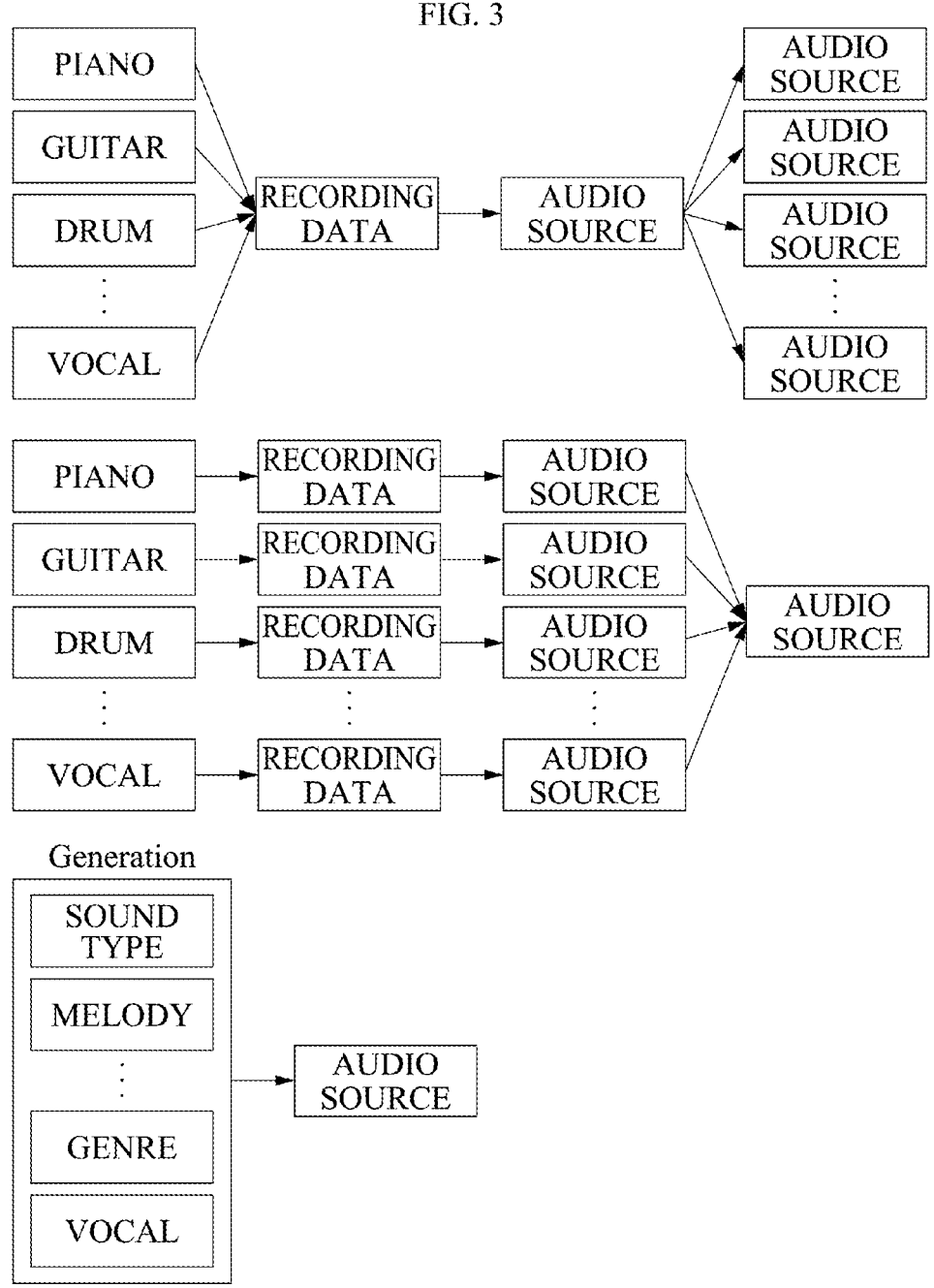
FIG. 3 is a diagram for describing a method of obtaining an audio source according to an exemplary embodiment.

FIG. 3 is a diagram for describing a method of obtaining an audio source according to an exemplary embodiment.

Referring to FIG. 3, recording data in which at least one musical instrument and vocal ensemble are recorded may be used to obtain an audio source according to an exemplary embodiment, but the present invention is not limited thereto.

In this case, the at least one musical instrument may include a piano, a guitar, a drum, a bass, and the like, but is not limited thereto, and may include all machines and instruments for generating sound.

Also, at this time, the recorded data may be recorded data recorded by combining a piano, guitar, drum, and bass, and may be recorded data in which the performance of the piano, guitar, and drum bass is recorded and re-output through an output device such as a speaker is recorded, but the present invention is not limited thereto.

Also, a source separation technique may be used to obtain an audio source according to an embodiment.

For example, it is possible to obtain an audio source by separating the audio source recorded through the above-described ensemble or the like into audio sources corresponding to each musical instrument using a source separation model, but the present invention is not limited thereto.

In this case, the separated audio sources may physically correspond to each musical instrument, but are not limited thereto, and may also include the case that it is considered to correspond to each musical instrument semantically.

In addition, the source separation model according to an embodiment may be implemented using a machine learning method. For example, the source separation model may be a model implemented through supervised learning, but is not limited thereto, and may be a model implemented through unsupervised learning, semi-supervised learning, reinforcement learning, and the like.

In addition, the source separation model according to an embodiment may be implemented with an artificial neural network (ANN). For example, the source separation model may be implemented as a feedforward neural network, a radial basis function network, or a Cohenen self-organizing network, but the present invention is not limited thereto.

In addition, the source separation model according to an embodiment may be implemented as a deep neural network (DNN). For example, the source separation model may be implemented with a convolutional neural network (CNN), a recurrent neural network (RNN), a long short term memory network (LSTM), or Gated Recurrent Units (GRUs) but the present invention is not limited thereto.

In addition, the data input to the source separation model may be an audio source itself obtained by recording, or may be pre-processed audio source data.

In addition, a structure separation technique may be used to obtain an audio source according to an embodiment.

For example, the audio source recorded through the above-described ensemble or the like may be separated into at least two music sections using a structural separation model to obtain an audio source, but the present invention is not limited thereto.

In this case, the structure separation model according to an embodiment may be implemented using a machine learning method. For example, the structure separation model may be a model implemented through supervised learning, but is not limited thereto, and may be a model implemented through unsupervised learning, semi-supervised learning, reinforcement learning, and the like.

In addition, the structure separation model according to an embodiment may be implemented with an artificial neural network (ANN). For example, the structure separation model may be implemented as a feedforward neural network, a radial basis function network, or a Cohenen self-organizing network, but the present invention is not limited thereto.

In addition, the structure separation model according to an embodiment may be implemented as a deep neural network (DNN). For example, the structure separation model may be implemented with a convolutional neural network (CNN), a recurrent neural network (RNN), a long short term memory network (LSTM), or Gated Recurrent Units (GRUs) but the present invention is not limited thereto.

In addition, the data input to the structure separation model may be an audio source itself obtained by recording, or may be pre-processed audio source data.

Further, according to an exemplary embodiment, recording data in which performances of at least one or more musical instruments and vocals are recorded may be used to obtain an audio source, but the present invention is not limited thereto.

In this case, the at least one musical instrument may include a piano, a guitar, a drum, a bass, and the like, but is not limited thereto, and may include all machines and instruments for generating sound.

In addition, at this time, the recorded data may be recorded data recorded by performing each of the piano, guitar, drum, and bass and may be recorded data in which the performance of each of the piano, guitar, drum, and bass is recorded and the sound re-outputted through an output device such as a speaker is recorded, but the present invention is not limited thereto.

Also, according to an embodiment, at least one audio source may be generated to obtain an audio source.

For example, according to an embodiment, in order to obtain an audio source, at least one audio source may be generated based on a sound type, melody, genre, vocal, and the like, but the present invention is not limited thereto.

In addition, an audio source generation model may be used to obtain an audio source according to an embodiment.

In this case, the audio source generation model according to an embodiment may be implemented using a machine learning method. For example, the sound generation model may be a model implemented through supervised learning, but is not limited thereto, and may be a model implemented through unsupervised learning, semi-supervised learning, reinforcement learning, and the like.

In addition, the audio source generation model according to an embodiment may be implemented with an artificial neural network (ANN). For example, the sound generation model may be implemented as a feedforward neural network, a radial basis function network, or a Cohenen self-organizing network, but the present invention is not limited thereto.

In addition, the audio source generation model according to an embodiment may be implemented as a deep neural network (DNN). For example, the sound generation model may be implemented with a convolutional neural network (CNN), a recurrent neural network (RNN), a long short term memory network (LSTM), or Gated Recurrent Units (GRUs) but the present invention is not limited thereto.

In addition, according to an embodiment, the audio source generation model may be applied to the acquired audio source in order to acquire the audio source.

For example, an audio source translated into English may be obtained by applying an audio source generation model to an audio source recorded in Korean, but the present invention is not limited thereto.

Also, for example, an audio source that can be determined as a female voice may be obtained by applying an audio source generation model to an audio source recorded as a male voice, but the present invention is not limited thereto.

However, the above-described examples are merely examples for acquiring an audio source, and embodiments of the present invention are not limited thereto, and examples of acquiring an audio source by various methods may be included.

Figure 4:
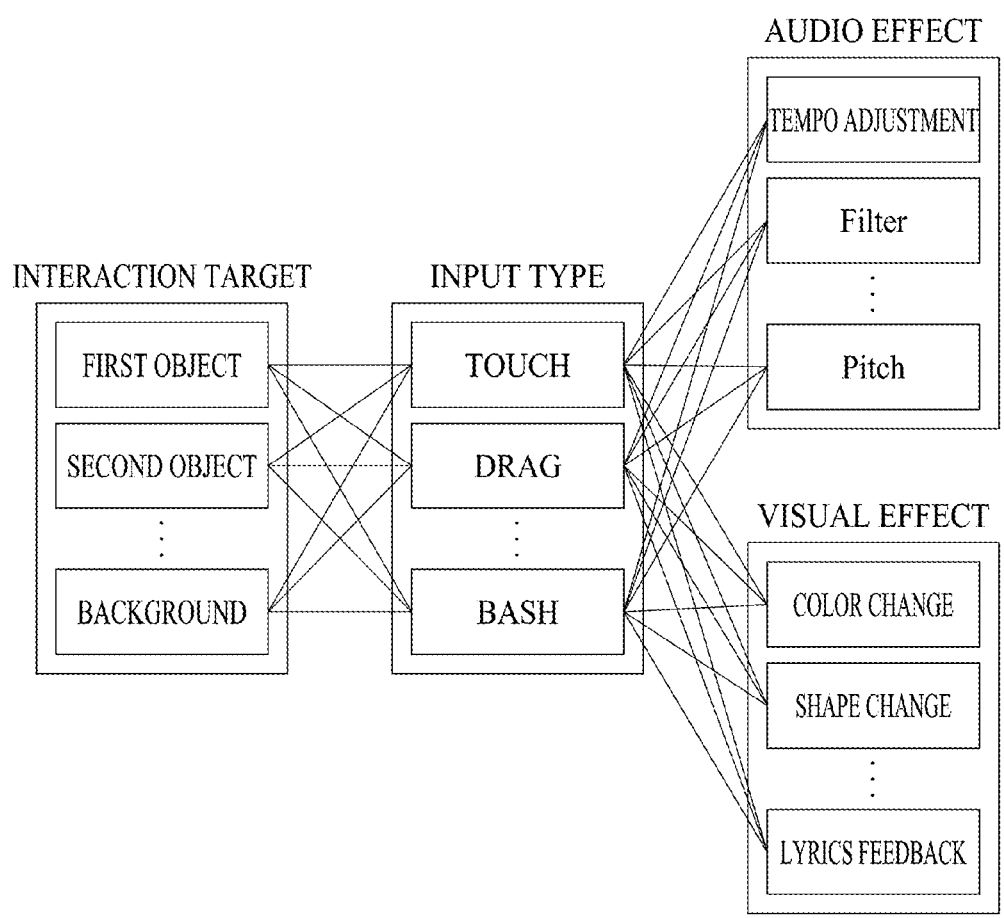
FIG. 4 is a diagram for describing an interaction rule according to an embodiment.

FIG. 4 is a diagram for describing an interaction rule according to an embodiment.

Referring to FIG. 4, the interaction rule according to an embodiment may be a rule for matching a specific interaction of a user acquired from a controller with a specific operation of the controller.

In this case, the user's interaction may be specified according to a target of the interaction, an input type, and the like.

The target of the interaction may mean a target of an input obtained from a user. For example, it may be a target that physically obtains input from a user and an object displayed through the user's terminal to obtain an input from the user, and may mean a specific area to obtain input from the user, and may be an object displayed through the user's terminal to guide a specific area for obtaining an input from the user, but is not limited thereto, and may mean things for directly or indirectly acquiring an input from a user or specifying an acquired input.

In addition, the target of the interaction may include at least one object displayed through the user's terminal.

For example, the target of the interaction may include a first object and a second object, but the present invention is not limited thereto.

In addition, the target of the interaction may include a background object displayed through the user's terminal.

For example, as the target of the interaction becomes a background object, when an interaction with the background object is obtained from a user, it may be designed to perform at least one operation, but the present invention is not limited thereto.

Also, the target of the interaction may include at least one hardware device.

For example, the target of the interaction may include a smartphone, and when acquiring the user's position change interaction with the smartphone, it may be designed to perform at least one operation, but the present invention is not limited thereto.

In this case, the at least one hardware device may include all hardware devices such as a smart phone, earphones, headphones, joy-con, and peripheral devices, but the present invention is not limited thereto.

The input type may mean a type of input obtained from a user. For example, the input type may include a touch input using a touch panel, a drag input, a bash input, a swap input, a specific pattern input, and the like, and include various inputs using at least one input device, and include various inputs such as shake input and swing input for at least one hardware device, and include various inputs such as a hollow touch input in which the position of the user and the position of an object are matched in a virtual space by tracking a motion input using a sensor such as a camera, but is not limited thereto, and include various inputs defined by an algorithm in order to perform a specific operation.

The specific operation of the controller may include an operation of applying at least one audio effect to apply musical transformation to the played audio source, an operation of applying a visual effect to the displayed screen, an operation of replacing or changing the audio source being played, an operation of adding an audio source different from the audio source being played, and an operation of not playing at least some of the audio sources to be played, but the present invention is not limited thereto.

In this case, the audio effect may include tempo adjustment for an audio source, a low pass filter, a high pass filter, a pitch adjustment, a vocal audio output, a musical instrument change, a sound source stop, an instrument sound output, voice reconstruction of a sound source, a beat repeater, outputting only a specific voice, adjusting an output level of a voice, echo, moving a section of a sound source, and a psychedelic mode, but the present invention is not limited thereto.

In this case, the visual effect may include a change of a background color, a change of a shape, size, color, etc. of at least one object, a lyrics display of a vocal of a sound source, etc., but the present invention is not limited thereto.

4. Various Embodiments of Interaction Rules and Various Audio Source Playback Methods using the Same.

Figure 5:
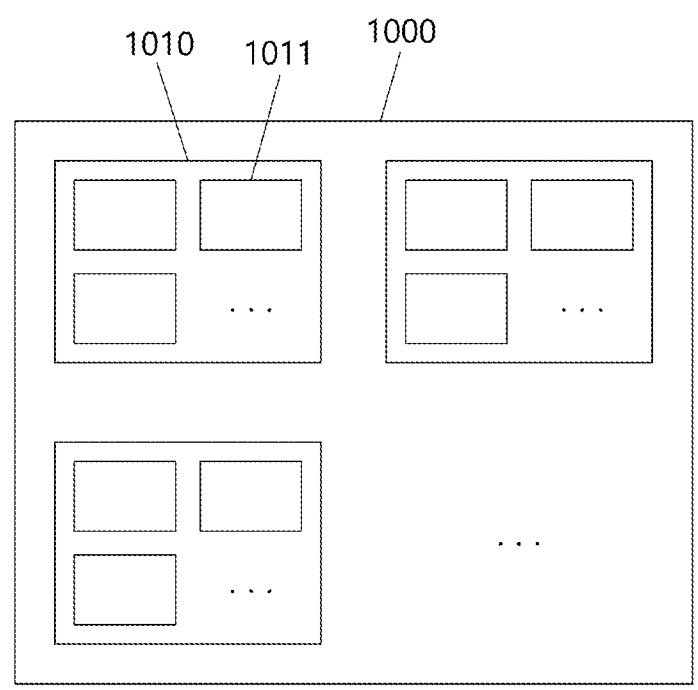
FIG. 5 is a diagram for describing an interaction rule set according to an embodiment.

FIG. 5 is a diagram for describing an interaction rule set according to an embodiment.

Referring to FIG. 5, an interaction rule set 1000 according to an embodiment may include at least one interaction rule subset 1010, and each interaction rule subset 1010 may include at least one interaction rule 1011.

That is, in this specification, a rule for matching a specific operation of a controller corresponding to a specific interaction of a user can be described as an interaction rule, and a group of interaction rules to be provided on one screen or interface including at least one interaction rule may be described as an interaction rule subset, and a group of interaction rules to be provided through at least one screen or interface including at least one subset of the interaction rules may be described as an interaction rule set, but the present invention is not limited thereto.

Hereinafter, an interaction rule set according to various embodiments and an audio source playback method using the same will be described.

4.1. First Embodiment of Interface for Playing Audio Source using Interaction Rule Set FIG. 6 is a diagram for describing an interface according to an exemplary embodiment.

Figure 6:
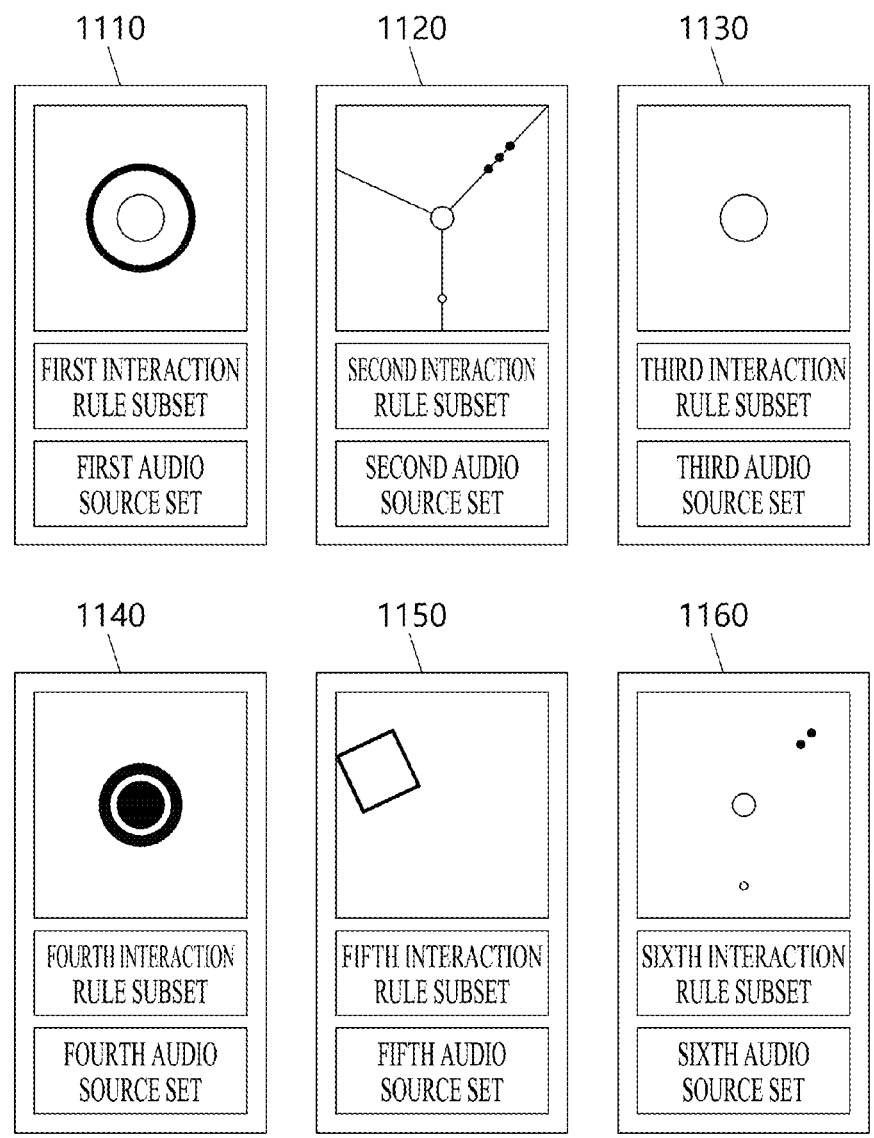
FIG. 6 is a diagram for describing an interface according to an exemplary embodiment.

Referring to FIG. 6, an interface 1100 according to an embodiment may include a first interface 1110, a second interface 1120, a third interface 1130, a fourth interface 1140, and a fifth interface 1150, and a sixth interface 1160.

In this case, each interface may be an interface provided to play an audio source using at least one interaction rule.

For example, the first interface 1110 may be an interface provided to play a first audio source set using a first interaction rule subset, and the second interface 1120 may be an interface provided to play a second audio source set using a second interaction rule subset, and the third interface 1130 may be an interface provided to play a third audio source set using a third interaction rule subset, and the fourth interface 1140 may be an interface provided to play a fourth audio source set using a fourth interaction rule subset, and the fifth interface 1150 may be an interface provided to play a fifth audio source set using a fifth interaction rule subset, and the sixth interface may be an interface provided to play a sixth audio source set using a sixth interaction rule subset, but the present invention is not limited thereto.

In addition, each audio source set may mean a different part of one audio source, and may include at least some of the same audio sources.

For example, the first audio source set, the second audio source set, the fourth audio source set, the fifth audio source set, and the sixth audio source set may include different portions of one piece of music, and the third audio source set may include an audio source that is at least partially identical to the first audio source set, the second audio source set, the fourth audio source set, the fifth audio source set, and the sixth audio source set, but the present invention is not limited thereto In addition, in order to move to each interface, user interaction in another interface may be required.

For example, in order to move to the second interface 1120, user interaction may be required in the first interface 1110, and in order to move to the third interface, user interaction may be required in the second interface 1120, but the present invention is not limited thereto.

For a more specific example, when the number of times a specific input is acquired from a user at a specific time in the first interface 1110 is equal to or greater than a preset number of times, the condition of moving to the second interface 1120 may be satisfied, and when a user's holding input for an object positioned at the center in the second interface 1120 is obtained, it is possible to move to the third interface 1130, but the present invention is not limited thereto.

Figure 7:
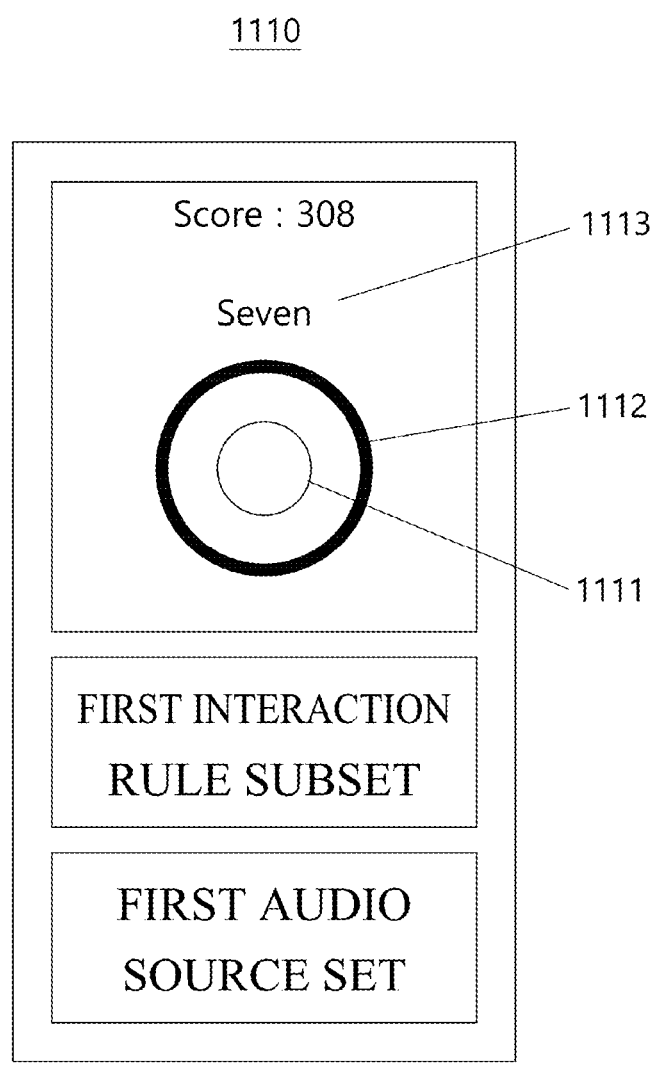
FIG. 7 is a diagram for describing an interface according to an exemplary embodiment.

FIG. 7 is a diagram for describing an interface according to an exemplary embodiment.

Referring to FIG. 7, the first interface 1110 according to an embodiment may be an interface for playing a first audio source set using a first interaction rule subset, and a screen output through the display according to the first interface may include a first object 1111 and a second object 1112.

In this case, according to the first interface 1110, the size of the first object 1111 may be set to change over time. For example, the first object 1111 may be designed to increase in size and then decrease again over time, but the present invention is not limited thereto.

In addition, according to the first interface 1110, the second object 1112 may include at least one or more objects having different sizes. For example, the second object 1112 may include one circular object as shown in FIG. 7, and although not illustrated in FIG. 7, may include two circular objects having different sizes, but the present invention is not limited thereto.

In addition, according to the first interface, a first audio source included in the first audio source set may be basically played. For example, background music included in the first audio source set may be played according to the first interface, but the present invention is not limited thereto.

In addition, the first interaction rule subset may include at least one interaction rule, and the interaction rules described below may be implemented as one interaction rule, but are not limited thereto and may be implemented as a plurality of interaction rules.

In this case, the first interaction rule subset may include at least one interaction rule for playing the first audio source set according to a user's interaction.

For example, the first interaction rule subset may include an interaction rule designed to output at least one audio effect when an input is obtained from a user, but the present invention is not limited thereto.

In addition, according to the first interaction rule subset, when a first input is obtained from a user, a second audio source different from the first audio source being played may be additionally played.

For example, according to the first interaction rule subset, when a first input is obtained from a user, a second audio source, which is a vocal sound of a part of the first audio source being played, may be additionally played, but the present invention is not limited thereto.

In addition, according to the first interaction rule subset, when a first input is obtained from a user, lyrics corresponding to the second audio source to be additionally played may be output through the display.

For example, according to the first interaction rule subset, when a first input is obtained from a user, a second audio source, which is a vocal sound of a part of the first audio source being played, may be additionally played, and when the lyrics of the second audio source to be additionally played are 'seven', the lyrics 1113 corresponding thereto may be output through a display, but the present invention is not limited thereto.

In addition, according to the first interaction rule subset, when a first input is obtained from a user, a score may be updated in response thereto.

For example, according to the first interaction rule subset, when a first input is obtained from a user, a second audio source, which is a vocal sound of a part of the first audio source being played, may be additionally played, and when the lyrics of the second audio source to be additionally played are 'seven', the lyrics 1113 corresponding thereto may be output through the display and the score may be updated, but the present invention is not limited thereto.

In addition, according to the first interaction rule subset, the first input obtained from the user may be a touch input obtained in a preset time section.

For example, according to the first interaction rule subset, the first input obtained from the user may be a touch input obtained from the user in a time section in which the first object 1111 overlaps at least partially with the second object 1112, but the present invention is not limited thereto.

In addition, according to the first interaction rule subset, a password sequence may be generated, and when a user input corresponding to the password sequence is acquired, the above-described operation may be performed.

For example, according to the first interaction rule subset, when a touch input is obtained from the user in the password sequence, an operation in which the second audio source is additionally played and a score is updated may be performed, but the present invention is not limited thereto.

Further, according to the first interaction rule subset, when the user's score is greater than or equal to the reference score, it may be moved to another interface, and when the user's score is less than the reference score, the first interface may be repeated for a predetermined time, but the present invention is not limited thereto.

Figure 8:
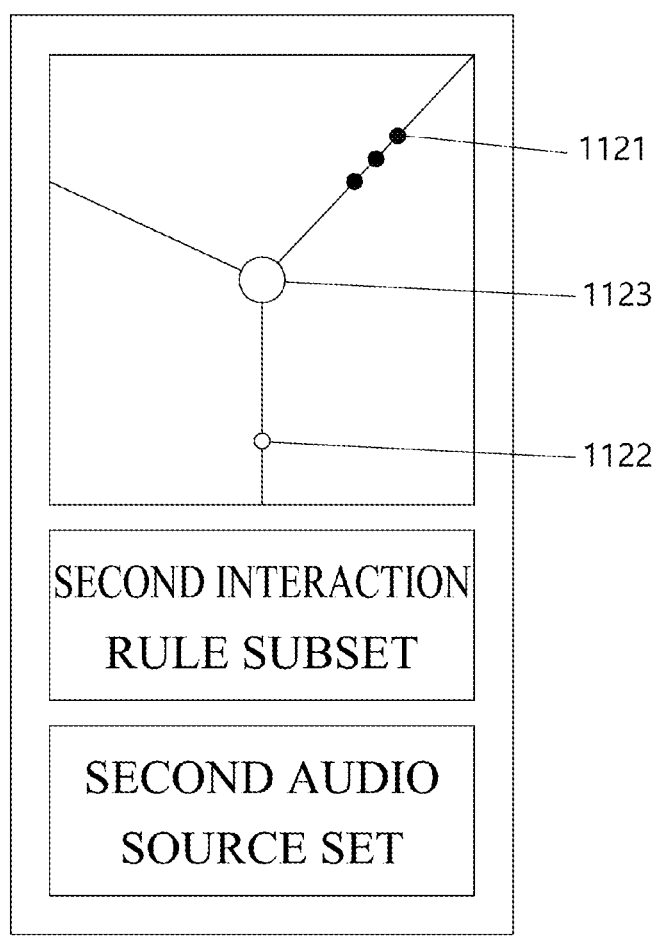
FIG. 8 is a diagram for describing an interface according to an exemplary embodiment.

FIG. 8 is a diagram for describing an interface according to an exemplary embodiment.

Referring to FIG. 8, the second interface according to an embodiment may be an interface for playing a second audio set using a second interaction rule subset, and a screen output through the display according to the second interface may include a third object 1121, a fourth object 1122, and a guide object 1123.

In addition, according to the second interface 1120, the guide object 1123 may be positioned on a portion of the screen. For example, the guide object 1123 may be displayed to be positioned at the center of the screen, but the present invention is not limited thereto.

In addition, according to the second interface 1120, a guide area corresponding to the guide object 1123 may be set. For example, the guide area may be set to be the same as the guide object 1123, and may be set smaller than the guide object 1123 and may be set larger than the guide object 1123, but the present invention is not limited thereto.

In this case, the guide area may be an area for specifying a user's interaction corresponding to the third and fourth objects 1121 and 1122, and hereinafter, for convenience of description, the guide object 1123 will be described as a concept including the guide area.

According to the second interface 1120, the third object 1121 may be moved toward the guide object 1123. For example, the third object 1121 may be generated outside the screen and moved toward the guide object 1123, but the present invention is not limited thereto.

In addition, according to the second interface 1120, the third object 1121 may be randomly generated. For example, the third object 1121 may be generated outside the screen at an arbitrary time point, but the present invention is not limited thereto.

In addition, according to the second interface 1120, the third object 1121 may be probabilistically generated at a preset time. For example, the third object 1121 may be generated probabilistically in ⅛ beat, but the present invention is not limited thereto.

In addition, according to the second interface 1120, the fourth object 1122 may be moved toward the guide object 1123. For example, the fourth object 1122 may be generated outside the screen and moved toward the guide object 1123, but the present invention is not limited thereto.

In addition, according to the second interface 1120, the fourth object 1122 may be arbitrarily generated. For example, the fourth object 1122 may be generated outside the screen at an arbitrary time point, but the present invention is not limited thereto.

In addition, according to the second interface 1120, the fourth object 1122 may be probabilistically generated at a preset time. For example, the fourth object 1122 may be generated probabilistically in ⅛ beat, but the present invention is not limited thereto.

In addition, according to the second interface 1120, the third and fourth objects 1121 and 1122 may be displayed to be visually distinguished. For example, the third object 1121 may be displayed as a black circle, and the fourth object 1122 may be displayed as a white circle, but the present invention is not limited thereto.

In addition, according to the second interface, a third audio source included in the second audio source set may be basically played. For example, background music included in the second audio source set may be played according to the second interface, but the present invention is not limited thereto.

In addition, the second interaction rule subset may include at least one interaction rule, and the interaction rules described below may be implemented as one interaction rule, but are not limited thereto and may be implemented as a plurality of interaction rules.

In this case, the second interaction rule subset may include at least one interaction rule for playing the second audio source set according to a user's interaction.

For example, the second interaction rule subset may include an interaction rule designed to output at least one audio effect when an input is obtained from a user, but the present invention is not limited thereto.

In addition, according to the second interaction rule subset, when a second input for the third object 1121 is obtained from a user, an audio source different from the third audio source may be additionally played.

For example, according to the second interaction rule subset, when a second input for the third object 1121 is obtained from a user, an audio source such as a bell sound, a piano sound, and a drum sound may be additionally played, but the present invention is not limited thereto.

In this case, according to the second interaction rule subset, when a second input for the third object 1121 is obtained from a user, the type of an additionally played audio source may be determined based on a current index.

For example, according to the second interaction rule subset, as a second input for the third object 1121 is obtained from a user, when the index is the first index at the time point at which the second input is acquired, an audio source including a bell sound is additionally played, and when the index is the second index at the time point at which the second input is acquired, an audio source including a piano sound may be additionally played, but the present invention is not limited thereto.

In addition, the second interaction rule subset may include an interaction rule designed to output at least one visual effect when a second input is obtained from the user, but the present invention is not limited thereto.

For example, according to the second interaction rule subset, when a second input for the third object 1121 is obtained from a user, at least one visual effect may be output on a screen output through the second interface, but the present invention is not limited thereto.

In addition, according to the second interaction rule subset, when a third input for the third object 1121 is obtained from a user, an audio source different from the third audio source may be additionally played.

For example, according to the second interaction rule subset, when a third input for the third object 1121 is obtained from a user, an audio source such as a bell playing, a piano playing, and a drum playing may be additionally played, but the present invention is not limited thereto.

In this case, according to the second interaction rule subset, when a third input for the third object 1121 is obtained from a user, the type of an additionally played audio source may be determined based on a current index.

For example, according to the second interaction rule subset, as a third input for the third object 1121 is obtained from a user, when the index is the first index at the time point at which the third input is acquired, an audio source including a bell performance is additionally played, and when an index is a third index at a time point at which the third input is obtained, an audio source including a piano performance may be additionally played, but the present invention is not limited thereto.

In addition, the second interaction rule subset may include an interaction rule designed to output at least one visual effect when a third input is obtained from the user, but the present invention is not limited thereto.

For example, according to the second interaction rule subset, when a third input for the third object 1121 is obtained from a user, at least one visual effect may be output on a screen output through the second interface, but the present invention is not limited thereto.

In addition, since the second input or the third input may include the type of user's interaction or the type of input described above, redundant descriptions will be omitted.

In addition, the second input and the third input may be different from each other.

For example, according to the second interaction rule subset, the input duration of the second input may be shorter than the input duration of the third input, but the present invention is not limited thereto.

For a more specific example, according to the second interaction rule subset, the second input may include a touch input for the third object 1121, and the third input may include a drag input for the third object 1121, but the present invention is not limited thereto.

In addition, according to the second interaction rule subset, the second input may be designed to induce a sound change at a specific time point, and the third input may be designed to extend the temporal degree of freedom of sound change.

For example, according to the second interaction rule subset, the second input may be designed as an input acquired at a time point at which the guide object 1123 and the third object 1121 at least partially overlap, and the third input may be designed regardless of whether the guide object 1123 and the third object 1121 overlap, but the present invention is not limited thereto.

For a more specific example, according to the second interaction rule subset, the second input may be designed as a touch input acquired at a time point at which the guide object 1123 and the third object 1121 at least partially overlap, and the third input may be designed as a drag input obtained for the third object 1121 at a time point irrespective of whether the guide object 1123 and the third object 1121 overlap, but the present invention is not limited thereto.

Also, the input for the above-described third object 1121 includes an input for an area in which the third object 1121 is positioned within the screen but is not limited thereto, and may include an input defined as an input corresponding to the third object 1121 according to an algorithm, or an input corresponding to a position and time of the third object 1121, such as a time point at which the third object 1121 is at a specific position.

In addition, according to the second interaction rule subset, when a fourth input for the fourth object 1122 is obtained from a user, an audio source different from the third audio source may be additionally played.

For example, according to the second interaction rule subset, when a fourth input for the fourth object 1122 is obtained from a user, a vocal audio source may be additionally played, but the present invention is not limited thereto.

In addition, according to the second interaction rule subset, when a fourth input for the fourth object 1122 is obtained from a user, index information related to the third object 1121 may be updated.

For example, according to the second interaction rule subset, when a fourth input for the fourth object 1122 is obtained from a user, index information related to the third object 1121 may be changed from a first index to a second index, but the present invention is not limited thereto.

In this case, according to the second interaction rule subset, the fourth object 1122 may include text information corresponding to index information to be updated when the fourth input is obtained.

For example, according to the second interaction rule subset, as the fourth input is obtained for the fourth object 1122 displayed on the screen at a first time point, if it is set to update to the second index, when the instrument corresponding to the second index is a piano, the fourth object 1122 may include text information corresponding to the piano, but the present invention is not limited thereto.

In addition, according to the second interaction rule subset, when a fourth input for the fourth object 1122 is obtained from a user, at least a part of the third audio source may be changed or substituted in order to give musical vitality by changing the frequency spectrum constituting the sound.

For example, according to the second interaction rule subset, when a fourth input for the fourth object 1122 is obtained from a user, at least a part of the third audio source may be changed or replaced with a fourth audio source.

In this case, the fact that at least a part of the third audio source is changed or replaced with the fourth audio source may mean that at least one instrument sound is changed to another instrument sound, or when the third audio source is an audio source composed of a plurality of instrument sounds, may mean that the third audio source is replaced with a fourth audio source that is an audio source having a different configuration from the third audio source but is not limited thereto, and may mean various operations for changing the configuration of a musical instrument included in an audio source to be played.

In addition, the second interaction rule subset may include an interaction rule designed to output at least one visual effect when a fourth input is obtained from the user, but the present invention is not limited thereto.

For example, according to the second interaction rule subset, when a fourth input for the fourth object 1122 is obtained from a user, lyrics corresponding to an audio source including an additionally played vocal sound may be output, and a background color of a screen according to the second interface may be changed, but the present invention is not limited thereto.

In addition, according to the second interaction rule subset, when a fifth input for the fourth object 1122 is obtained from a user, at least one audio effect may be applied to the third audio source.

For example, according to the second interaction rule subset, when a fifth input for the fourth object 1122 is obtained from a user, a bandpass filter effect may be applied to the third audio source, but the present invention is not limited thereto.

In addition, according to the second interaction rule subset, when a fifth input for the fourth object 1122 is obtained from a user, a different audio effect may be applied to the third audio source according to the position at which the fifth input is obtained.

For example, according to the second interaction rule subset, when a fifth input for the fourth object 1122 is obtained from a user, and the position at which the fifth input is obtained is a first area, a first audio effect is applied to the third audio source, and when the position at which the fifth input is obtained is a second region, a second audio effect is applied to the third audio source, and when the position at which the fifth input is obtained is a third region, a third audio effect may be applied to the third audio source, but the present invention is not limited thereto.

For a more specific example, according to the second interaction rule subset, when a fifth input for the fourth object 1122 is obtained from a user and the fifth input is a drag input for the fourth object 1122, if the fourth object 1122 is dragged and positioned in the first area, a first audio effect is applied to the third audio source, and when the fourth object 1122 is dragged and positioned in a second area, a second audio effect is applied to the third audio source, and when the fourth object 1122 is dragged and positioned in a third area, a third audio effect may be applied to the third audio source, but the present invention is not limited thereto.

In addition, according to the second interaction rule subset, when a fifth input for the fourth object 1122 is obtained from a user, the level of the audio effect applied to the third audio source may be changed according to the position at which the fifth input is obtained.

For example, according to the second interaction rule subset, when a fifth input for the fourth object 1122 is obtained from a user, and the fifth input is a drag input for the fourth object 1122, if the fourth object 1122 is dragged away from the center of the screen, the level of an audio effect applied to the third audio source may be increased, and when the fourth object 1122 is dragged and approaches the center of the screen, the level of the audio effect applied to the third audio source may be reduced, but the present invention is not limited thereto.

In addition, the second interaction rule subset may include an interaction rule designed to output at least one visual effect when a fifth input is obtained from the user, but the present invention is not limited thereto.

For example, according to the second interaction rule subset, when a fifth input for the fourth object 1122 is obtained from a user, at least one visual effect may be output on a screen displayed along the second interface, and the level of the output visual effect may vary according to the position of the fifth input, but the present invention is not limited thereto.

In addition, since the fourth input or the fifth input may include the type of user interaction or the type of input described above, redundant descriptions will be omitted.

In addition, the fourth input and the fifth input may be different from each other.

For example, according to the second interaction rule subset, the input duration of the fourth input may be shorter than the input duration of the fifth input, but the present invention is not limited thereto.

For a more specific example, according to the second interaction rule subset, the fourth input may include a touch input for the fourth object 1122, and the fifth input may include a drag input for the fourth object 1122, but the present invention is not limited thereto.

In addition, according to the second interaction rule subset, the fourth input may be designed to induce a sound change at a specific time point, and the fifth input may be designed to extend the temporal degree of freedom of sound change.

For example, according to the second interaction rule subset, the fourth input may be designed as an input acquired at a time point at which the guide object 1123 and the fourth object 1122 at least partially overlap, and the fifth input may be designed regardless of whether the guide object 1123 and the fourth object 1122 overlap, but the present invention is not limited thereto.

For a more specific example, according to the second interaction rule subset, the fourth input may be designed as a touch input acquired at a time point at which the guide object 1123 and the fourth object 1122 at least partially overlap, and the fifth input may be designed as a drag input obtained for the fourth object 1122 at a time point irrespective of whether the guide object 1123 and the fourth object 1122 overlap, but the present invention is not limited thereto.

In addition, the input to the fourth object 1122 described above includes an input to an area in which the fourth object 1122 is positioned within the screen, but is not limited to, and may include an input prescribed as an input corresponding to the fourth object 1122 according to an algorithm, or an input corresponding to a position and time of the fourth object 1122, such as a time point at which the fourth object 1122 will be in a specific position.

In addition, in order to give the user a natural musical vitality by changing the frequency spectrum constituting the sound based on the musical meter, a time point at which the guide object 1123 and the fourth object 1122 at least partially overlap may be designed based on a musical meter.

For example, according to the second interaction rule subset, when bar is a musical meter including a reference beat number of at least one audio source among the played audio sources, a time point at which the guide object 1123 and the fourth object 1122 at least partially overlap may be designed to be included in a time section between the last beat of the first bar and the first beat of the last bar, but the present invention is not limited thereto.

In this case, according to the second interaction rule subset, the third audio source is played in a partial section of the first bar in which the fourth object 1122 is displayed on the screen, and when the fourth input is acquired at a time point at which the fourth object 1122 overlaps at least partially with the guide object 1123, an audio source different from the third audio source may be played in some sections of the second bar in which the fourth object 1122 is not displayed on the screen, but the present invention is not limited thereto.

In addition, according to the second interaction rule subset, after a preset time elapses, the interface may be moved to another interface.

In addition, according to the second interaction rule subset, it may be determined whether or not it is possible to move to another interface by evaluating the user's interaction for a preset time.

For example, according to the second interaction rule subset, when the level of user interaction is higher than the reference level during the preset time, it is possible to move to other interfaces, and when the level of user interaction is less than the reference level, the second interface may be repeated, but the present invention is not limited thereto.

In addition, according to the second interaction rule subset, when a sixth input is obtained from the guide object 1123, it may be moved to another interface.

For example, according to the second interaction rule subset, when a holding input for the guide object 1123 is obtained, it may be moved to a third interface, but the present invention is not limited thereto.

Figure 9:
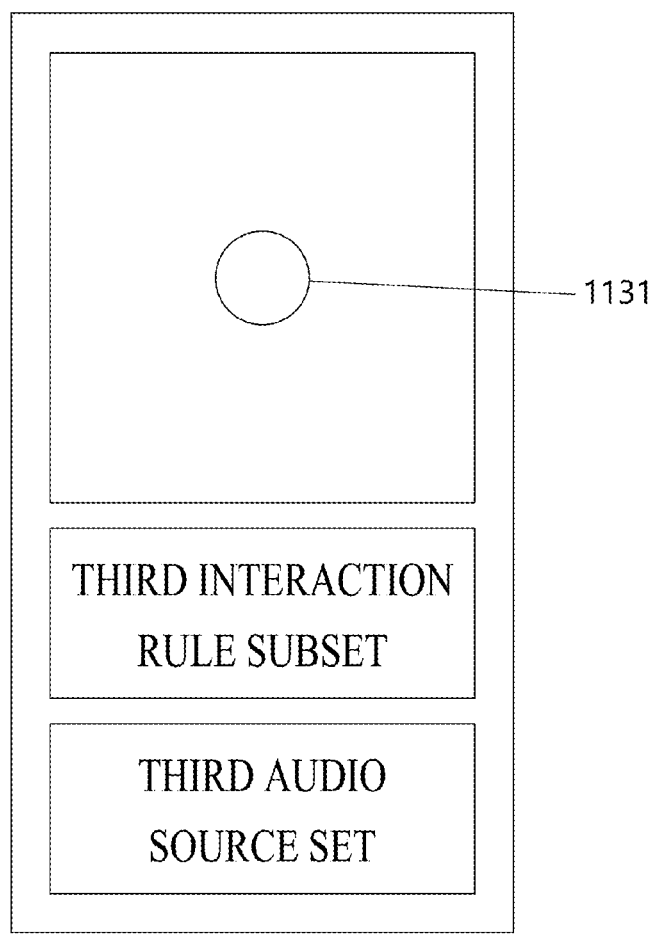
FIG. 9 is a diagram for describing an interface according to an exemplary embodiment.

FIG. 9 is a diagram for describing an interface according to an exemplary embodiment.

Referring to FIG. 9, a third interface 1130 according to an embodiment may be an interface for playing a third audio source set using a third interaction rule subset, and the screen output through the display according to the third interface may include a fifth object 1131.

In addition, according to the third interface 1130, the fifth object 1131 may be positioned on a portion of the screen. For example, the fifth object 1131 may be displayed to be positioned at the center of the screen, but the present invention is not limited thereto.

In addition, the third interface 1130 may be an interface that can be accessed according to a continuous input to the fifth object 1131.

For example, the third interface 1130 may be accessed according to an input such as continuous holding or dragging of the fifth object 1131, and if the corresponding input disappears, may be an interface that moves to another interface, but the present invention is not limited thereto.

Also, according to the third interface 1130, a fourth audio source included in the third audio source set may be basically played. For example, background music included in the third audio source set may be played according to the third interface 1130, but the present invention is not limited thereto.

In this case, the third audio source set may be the same as at least a part of the audio source set played in the immediately preceding interface, but the present invention is not limited thereto.

In addition, the third interaction rule subset may include at least one interaction rule, and the interaction rules described below may be implemented as one interaction rule, but are not limited thereto and may be implemented as a plurality of interaction rules.

In this case, the third interaction rule subset may include at least one interaction rule for playing the third audio source set according to a user's interaction.

For example, the third interaction rule subset may include an interaction rule designed to output at least one audio effect when an input is obtained from a user, but the present invention is not limited thereto.

Further, according to the third interaction rule subset, when a seventh input for the fifth object 1131 is obtained from a user, play of the fourth audio source may be stopped.

For example, according to the third interaction rule subset, when a holding input for the fifth object 1131 is obtained from a user, play of the fourth audio source may be stopped, but the present invention is not limited thereto.

In addition, according to the third interaction rule subset, when a seventh input for the fifth object 1131 is obtained from a user, different audio effects may be applied according to the position of the seventh input.

For example, according to the third interaction rule subset, when a seventh input for the fifth object 1131 is obtained from a user, and the position at which the seventh input is obtained is a first area, the fourth audio source is quickly played, and when the position at which the seventh input is acquired is the second area, the fourth audio source may be played backwards, but the present invention is not limited thereto.

In this case, the meaning of playing the fourth audio source upside down may include the meaning of playing the audio source upside down from the point of view of a person skilled in the art, such as playing back time information included in the fourth audio source, etc.

Further, according to the third interaction rule subset, when a seventh input to the fifth object 1131 is obtained from a user, the level of the audio effect may be changed according to the position of the seventh input.

For example, according to the third interaction rule subset, when a seventh input for the fifth object 1131 is obtained from the user and the position at which the seventh input is acquired is the first area, the fourth audio source is quickly played, and as the position at which the seventh input is acquired is farther from the center area of the screen, the speed at which the fourth audio source is played may increase, and when the position at which the seventh input is acquired is the second area, the fourth audio source is played upside down, and as the position at which the seventh input is acquired moves away from the center area of the screen, the speed at which the fourth audio source is played backwards may increase, but the present invention is not limited thereto.

Figure 10:
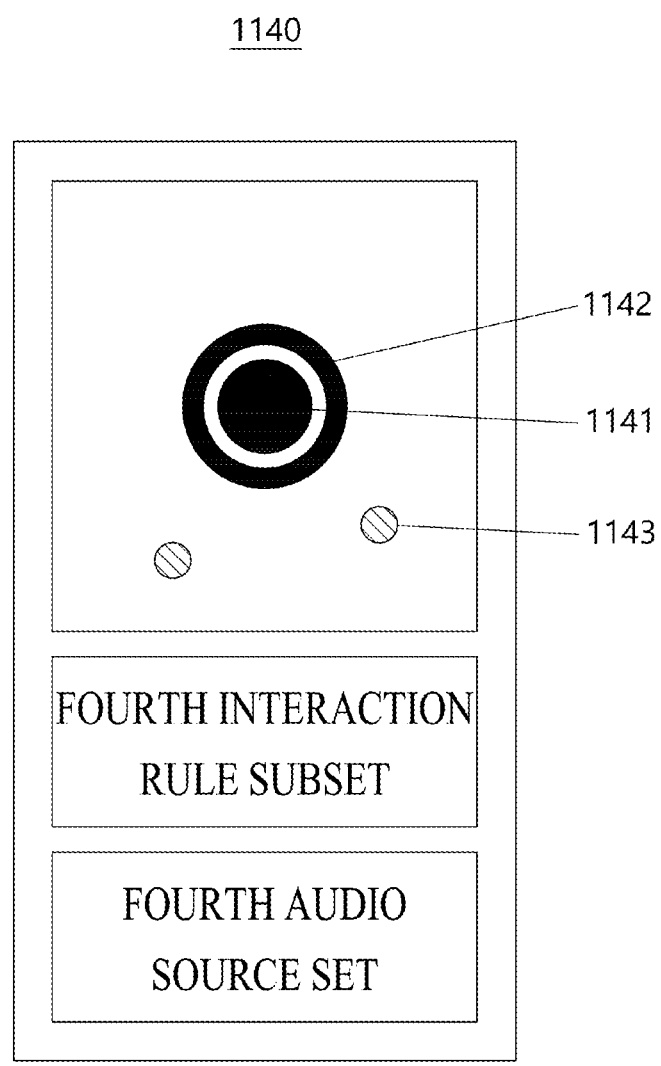
FIG. 10 is a diagram for describing an interface according to an exemplary embodiment.

FIG. 10 is a diagram for describing an interface according to an exemplary embodiment.

Referring to FIG. 10, the fourth interface 1140 according to an embodiment may be an interface for playing a fourth audio source set using a fourth interaction rule subset, and the screen output through the display according to the fourth interface may include a sixth object 1141, a seventh object 1142, and an eighth object 1143.

In addition, according to the fourth interface 1140, the sixth object 1141 may be positioned on a portion of the screen. For example, the sixth object 1141 may be displayed to be positioned at the center of the screen, but the present invention is not limited thereto.

In addition, according to the fourth interface 1140, the seventh object 1142 may be positioned on a portion of the screen. For example, the seventh object 1142 may be displayed to be positioned at the center of the screen, but the present invention is not limited thereto.

In addition, according to the fourth interface 1140, the size of the seventh object 1142 may be changed over time. For example, the seventh object 1142 may be designed to increase in size over time, but the present invention is not limited thereto.

In addition, according to the fourth interface 1140, the eighth object 1143 may be randomly generated. For example, the eighth object 1143 may be generated outside the screen at an arbitrary time point, but the present invention is not limited thereto.

In addition, according to the fourth interface 1140, when the eighth object 1143 at least partially overlaps with the seventh object 1142, the size of the seventh object 1142 may be changed. For example, when the eighth object 1143 overlaps at least partially with the seventh object 1142, the size of the seventh object 1142 may decrease, but the present invention is not limited thereto.

In addition, according to the fourth interface 1140, basically, a fifth audio source included in the fourth audio source set may be played. For example, background music included in the fourth audio source set may be played according to the fourth interface 1140, but the present invention is not limited thereto.

In addition, the fourth interaction rule subset may include at least one interaction rule, and the interaction rules described below may be implemented as one interaction rule, but are not limited thereto and may be implemented as a plurality of interaction rules.

In this case, the fourth interaction rule subset may include at least one interaction rule for playing the fourth audio source set according to a user's interaction.

For example, the fourth interaction rule subset may include an interaction rule designed to output at least one audio effect when an input is obtained from a user, but the present invention is not limited thereto.

In addition, according to the fourth interaction rule subset, when an eighth input to the sixth object 1141 is obtained from a user, an audio source different from the fifth audio source may be additionally played.

For example, according to the fourth interaction rule subset, when an eighth input for the sixth object 1141 is obtained from a user, an audio source such as a sound effect corresponding to this may be additionally played, but the present invention is not limited thereto.

In addition, the fourth interaction rule subset may include an interaction rule designed to output at least one visual effect when input is obtained from the user, but the present invention is not limited thereto.

Further, according to the fourth interaction rule subset, when an eighth input for the sixth object 1141 is obtained from a user, the size of the sixth object 1141 may be changed.

For example, according to the fourth interaction rule subset, when an eighth input for the sixth object 1141 is obtained from a user, the size of the sixth object 1141 may be increased, but the present invention is not limited thereto.

In addition, according to the fourth interaction rule subset, when an eighth input for the sixth object 1141 is obtained from a user, the size of the sixth object 1141 may be changed within the size of the seventh object 1142.

For example, according to the fourth interaction rule subset, when an eighth input for the sixth object 1141 is obtained from a user, the size of the sixth object 1141 may increase, but may not exceed the size of the seventh object 1142, but the present invention is not limited thereto.

In addition, since the eighth input may include the type of user's interaction or the type of input described above, redundant descriptions will be omitted.

In addition, the input for the sixth object 1141 includes an input for an area in which the sixth object 1141 is positioned within the screen, but is not limited thereto, and may include an input defined as an input corresponding to the sixth object 1141 according to an algorithm, or an input corresponding to a position and time of the sixth object 1141, such as a time point at which the sixth object 1141 is at a specific position.

For example, the eighth input to the sixth object 1141 may include a touch input to a background screen, and at this time, since there is at least one change to the sixth object 1141 according to the eighth input, the eighth input may be defined as an eighth input to the sixth object 1141.

In addition, according to the fourth interaction rule subset, when a certain condition is satisfied, it may be moved to another interface.

For example, according to the fourth interaction rule subset, when the size of the sixth object 1141 is maintained over a certain size for a certain time, it is moved to the fifth interface, and when the size of the sixth object 1141 cannot be maintained over a certain size for a certain period of time, it may also be moved to the sixth interface, but the present invention is not limited thereto.

Figure 11:
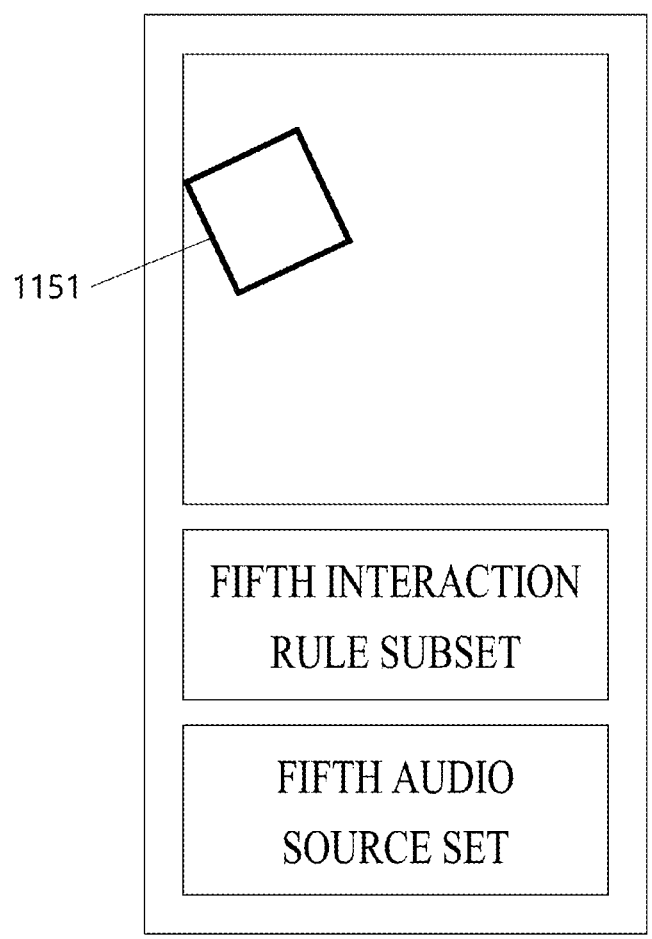
FIG. 11 is a diagram for describing an interface according to an exemplary embodiment.

FIG. 11 is a diagram for describing an interface according to an exemplary embodiment.

Referring to FIG. 11, a fifth interface 1150 according to an embodiment may be an interface for playing a fifth audio source set using a fifth interaction rule subset, and the screen output through the display according to the fifth interface may include a ninth object 1151.

In addition, according to the fifth interface 1150, the ninth object 1151 may be positioned on a portion of the screen. For example, the ninth object 1151 is positioned on a part of the screen, but the position may be changed according to a user's input, but the present invention is not limited thereto.

Further, according to the fifth interface 1150, basically, a sixth audio source included in the fifth audio source set may be played. For example, background music included in the fifth audio source set may be played according to the fifth interface 1150, but the present invention is not limited thereto.

In addition, the fifth interaction rule subset may include at least one interaction rule, and the interaction rules described below may be implemented as one interaction rule, but are not limited thereto and may be implemented as a plurality of interaction rules.

In this case, the fifth interaction rule subset may include at least one interaction rule for playing the fifth audio source set according to a user's interaction.

For example, the fifth interaction rule subset may include an interaction rule designed to output at least one audio effect when an input is obtained from a user, but the present invention is not limited thereto.

Further, according to the fifth interaction rule subset, when a ninth input is obtained from a user, an audio source different from the sixth audio source may be additionally played.

For example, according to the fifth interaction rule subset, when a ninth input is obtained from a user, an audio source including the first guitar sound may be additionally played, but the present invention is not limited thereto.

Further, according to the fifth interaction rule subset, when a tenth input is obtained from a user, an audio source different from the sixth audio source may be additionally played.

For example, according to the fifth interaction rule subset, when a tenth input is obtained from a user, an audio source including a second guitar sound may be additionally played, but the present invention is not limited thereto.

In addition, the ninth input and the tenth input may be different from each other.

For example, the ninth input may be an input in which the user's terminal is moved in the first direction, and the tenth input may be an input in which the user's terminal moves in a second direction different from the first direction, but the present invention is not limited thereto.

In addition, the first guitar sound and the second guitar sound may be different sounds according to a stroke direction.

For example, the first guitar sound may include a guitar sound played in a downstroke direction, and the second guitar sound may include a guitar sound played in the upstroke direction, but the present invention is not limited thereto.

In addition, the fifth interaction rule subset may include an interaction rule designed to output at least one visual effect when input is obtained from the user, but the present invention is not limited thereto.

For example, according to the fifth interaction rule subset, when an input is obtained from a user, the position of the ninth object 1151 may be changed, but the present invention is not limited thereto.

Figure 12:
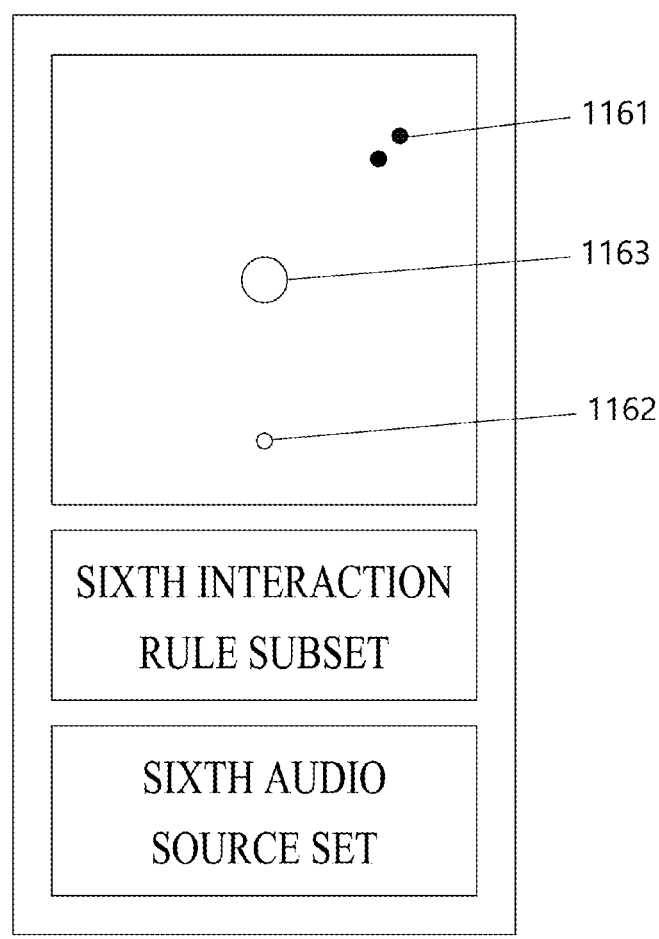
FIG. 12 is a diagram for describing an interface according to an exemplary embodiment.

FIG. 12 is a diagram for describing an interface according to an exemplary embodiment.

Referring to FIG. 12, a sixth interface 1160 according to an embodiment may be an interface for playing a sixth audio set using a sixth interaction rule subset, and the screen output through the display according to the sixth interface may include a tenth object 1161, an eleventh object 1162, and a second guide object 1163.

In this case, since the above-described contents regarding the tenth object 1161, the eleventh object 1162, and the second guide object 1163 may be applied, a redundant description will be omitted.

In addition, since the above-described contents regarding the sixth interaction rule subset may be applied, a redundant description will be omitted.

In addition, according to the sixth interface, a seventh audio source included in the sixth audio source set may be basically played. For example, background music included in the sixth audio source set may be played according to the sixth interface, but the present invention is not limited thereto.

In addition, according to the sixth interaction rule subset, when an eleventh input for a background object is obtained from a user, at least one audio effect may be output.

In addition, according to the sixth interaction rule subset, when an eleventh input for a background object is obtained from a user, an audio source different from the seventh audio source may be additionally played.

For example, according to the sixth interaction rule subset, when an eleventh input for a background object is obtained from a user, an audio source including a vocal sound may be additionally played, but the present invention is not limited thereto.

In addition, according to the sixth interaction rule subset, when a twelfth input for a background object is obtained from a user, at least one audio effect may be output.

For example, according to the sixth interaction rule subset, when a twelfth input for a background object is obtained from a user, a beat repeater effect may be applied to an audio source included in the sixth audio source and being played, but the present invention is not limited thereto.

In addition, according to the sixth interaction rule subset, when the twelfth input is a two-point touch input, the level of the audio effect may be changed according to the distance between the two points.

For example, according to the sixth interaction rule subset, when the twelfth input is a two-point touch input, the level of the beat repeater effect may be changed to repeat quickly when the distance between the two points becomes close, and repeat slowly when the distance between the two points increases, but the present invention is not limited thereto.

In addition, the eleventh input and the twelfth input may be different from each other.

For example, the eleventh input may be a one-point touch input for the background object, and the twelfth input may be a two-point touch input for the background object, but the present invention is not limited thereto.

Figure 13:
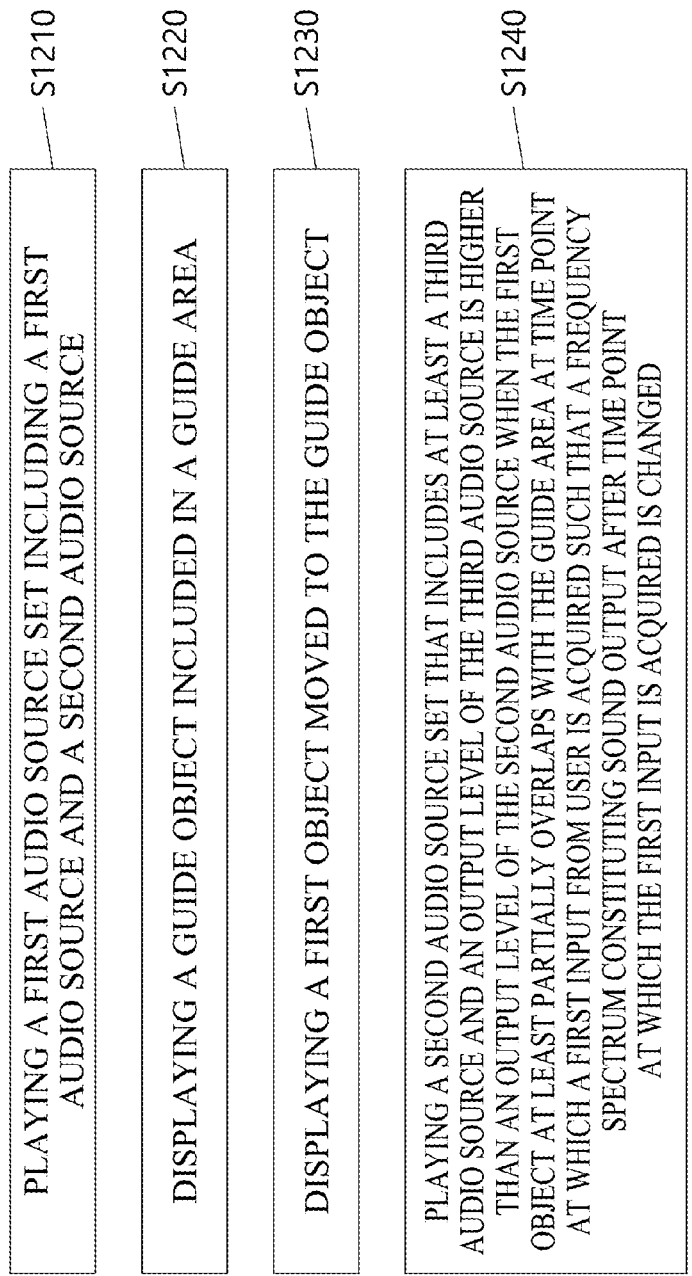
FIG. 13 is a flowchart illustrating a realistic audio source playback method according to an embodiment.

FIG. 13 is a flowchart illustrating a realistic audio source playback method according to an embodiment.

Before describing FIG. 13, the realistic audio source playback method according to an embodiment described based on FIG. 13 may be implemented using at least one of the aforementioned interfaces, but is not limited thereto, and it is apparent that although not included in the above examples, the method can be implemented using an interface for implementing a realistic audio source playback method according to an embodiment.

In addition, the realistic audio source playback method according to an embodiment may be performed by at least one processor, and is described based on a flowchart for convenience of description, but may be performed regardless of the order described in the flowchart.

Referring to FIG. 13, a realistic audio source playback method according to an embodiment may include playing a first audio source set including a first audio source and a second audio source (S1210), displaying a guide object included in a guide area (S1220), displaying a first object moved to the guide object (S1230), and playing a second audio source set that includes at least a third audio source and an output level of the third audio source is higher than an output level of the second audio source when the first object at least partially overlaps with the guide area at a time point at which a first input from the user is acquired such that the frequency spectrum constituting the sound output after the time point at which the first input is acquired is changed (S1240).

In this case, the realistic audio source playback method according to an embodiment changes the frequency spectrum constituting the sound in real time based on a musical meter to give the user a natural musical vitality, but the present invention is not limited thereto.

In addition, since the above-described audio source and audio source set are applied to the first and second audio sources, a redundant description will be omitted.

In addition, since the above-described audio source and audio source set are applied to the first and second audio source sets, redundant descriptions will be omitted.

In addition, since the guide area and the guide object may be applied to the contents of the guide area and the guide object described above, a duplicate description will be omitted.

Further, according to an embodiment, when bar is a musical meter including a reference beat number of at least one of the first to third audio sources, the first audio source set is played in a partial section of the first bar in which the first object is displayed, and a time point at which the first object at least partially overlaps with the guide area so that the second audio source set is played in a partial section of the second bar in which the first object is not displayed may be included in the time section between the last beat of the first bar and the first beat of the second bar.

Also, according to an embodiment, the first input may include a touch input.

Further, according to an embodiment, the first input may include a touch input corresponding to the position of the first object.

Also, according to an embodiment, the first input may include a touch input for a background object.

Further, according to an embodiment, the second audio source set may include the first audio source and the third audio source, but may not include the second audio source.

Further, according to an embodiment, the second audio source set includes the first audio source, the second audio source, and the third audio source, but a volume level of the second audio source may be set to be lower than a volume level of the third audio source.

Further, according to an embodiment, the first audio source, the second audio source, and the third audio source may each include different musical instrument sounds.

Further, according to an embodiment, the first audio source may include a piano sound, the second audio source may include a drum sound, and the third audio source may include a guitar sound.

Further, according to an embodiment, when the first object at least partially overlaps the guide area at a time point at which the first input is obtained, a fourth audio source may be additionally played.

Further, according to an embodiment, the fourth audio source may include vocal sound.

Further, according to an embodiment, when the first object at least partially overlaps the guide area at a time point at which the first input is obtained, at least one visual effect may be output.

Further, according to an embodiment, the at least one visual effect may include lyrics information corresponding to a vocal sound included in the fourth audio source to be additionally played.

According to the realistic audio source playback method according to an embodiment of the present invention described above, rewards are given to the user of musical changes according to the interaction by changing the audio sources constituting the audio source set based on the user's interaction, and the energy change of the sound is induced by changing the frequency spectrum constituting the sound that is output based on the audio source, and by using this, users can feel the dynamic musical change according to the interaction, and it is possible to give a user a natural musical vitality by inducing a musical change according to the above-described interaction to be made based on a musical meter.

Figure 14:
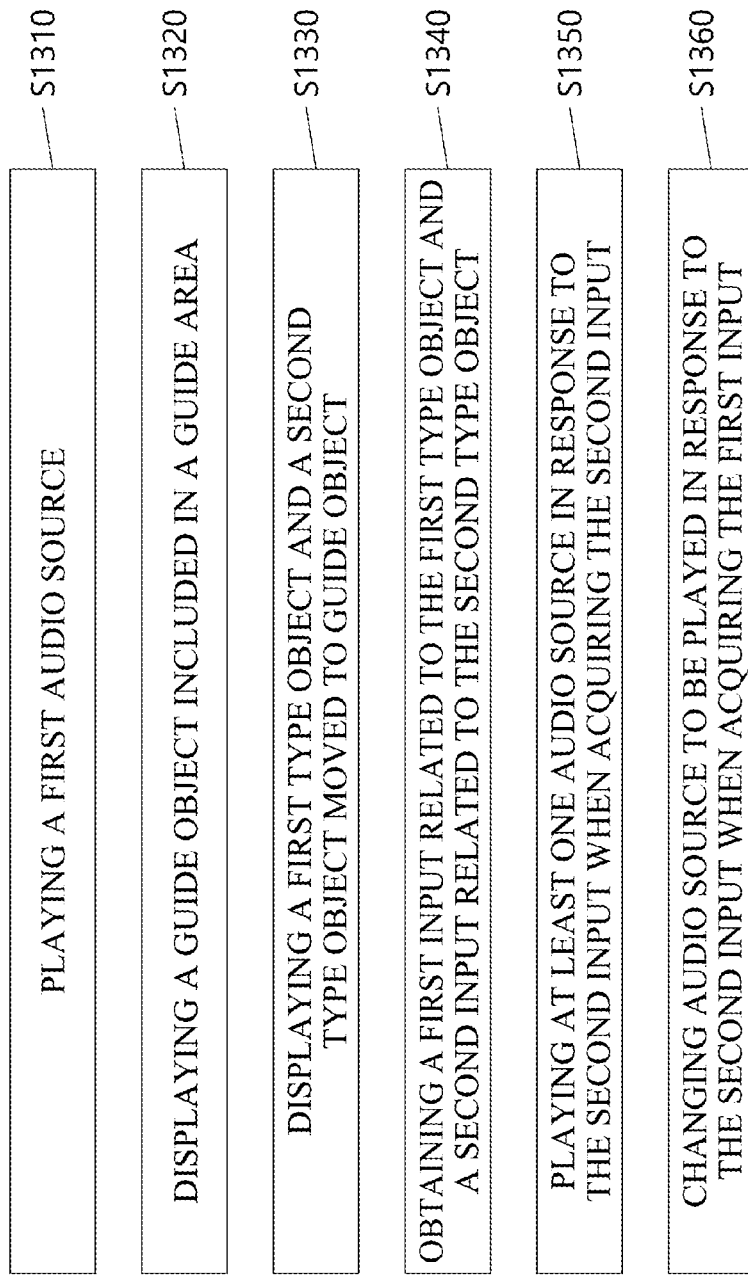
FIG. 14 is a flowchart illustrating a realistic audio source playback method according to an embodiment.

FIG. 14 is a flowchart illustrating a realistic audio source playback method according to an embodiment.

Before describing FIG. 14, the realistic audio source playback method according to an embodiment described based on FIG. 14 may be implemented using at least one of the aforementioned interfaces, but is not limited thereto, and it is apparent that although not included in the above examples, the method can be implemented using an interface for implementing a realistic audio source playback method according to an embodiment.

In addition, the realistic audio source playback method according to an embodiment may be performed by at least one processor, and is described based on a flowchart for convenience of description, but may be performed regardless of the order described in the flowchart.

Referring to FIG. 14, a realistic audio playback method according to an embodiment may include playing a first audio source (S1310), displaying a guide object included in a guide area (S1320), displaying a first type object and a second type object moved to the guide object (S1330), obtaining a first input related to the first type object and a second input related to the second type object (S1340), playing at least one audio source in response to the second input when acquiring the second input (S1350) and changing an audio source to be played in response to the second input when acquiring the first input (S1360).

In this case, the realistic audio source playback method according to an exemplary embodiment changes the frequency spectrum constituting the sound in real time to give the user a natural musical vitality, but the present invention is not limited thereto. In addition, since the contents of the audio source and the audio source set described above are applied to the first audio source and the like, a redundant description will be omitted.

In addition, since the guide area and the guide object may be applied to the contents of the guide area and the guide object described above, a duplicate description will be omitted.

Further, according to an embodiment, when the second input is obtained from the user at the first time point, the second audio source may be played, and when obtaining the first input from the user at a second time point after the first time point, an audio source may be changed to be played in response to the second input, and when obtaining the second input from the user at a third time point after the second time point, a third audio source different from the second audio source may be played.

In addition, according to an embodiment, the first type object and the second type object may be displayed to be visually distinguished.

In addition, according to an embodiment, the number of the first type objects displayed on one screen at at least one time point may be less than the number of the second type objects.

In addition, according to an embodiment, the first input and the second input include an input for a background object, and the first input related to the first type object may be an input obtained at a time point at which the first type object at least partially overlaps with the guide area, and the second input related to the second type object may be an input obtained at a time point at which the second type object at least partially overlaps with the guide area.

In addition, according to an embodiment, the second audio source and the third audio source may include different musical instrument sounds.

According to the realistic audio source playback method according to an embodiment of the present invention described above, based on the user's interaction, an additional audio source is played to give the user a reward for musical change according to the interaction, and the type of additionally played audio source is allowed to be changed based on the user's interaction, and beyond passive music appreciation, users can use light interaction to enable active music play to participate in musical change.

Figure 15:
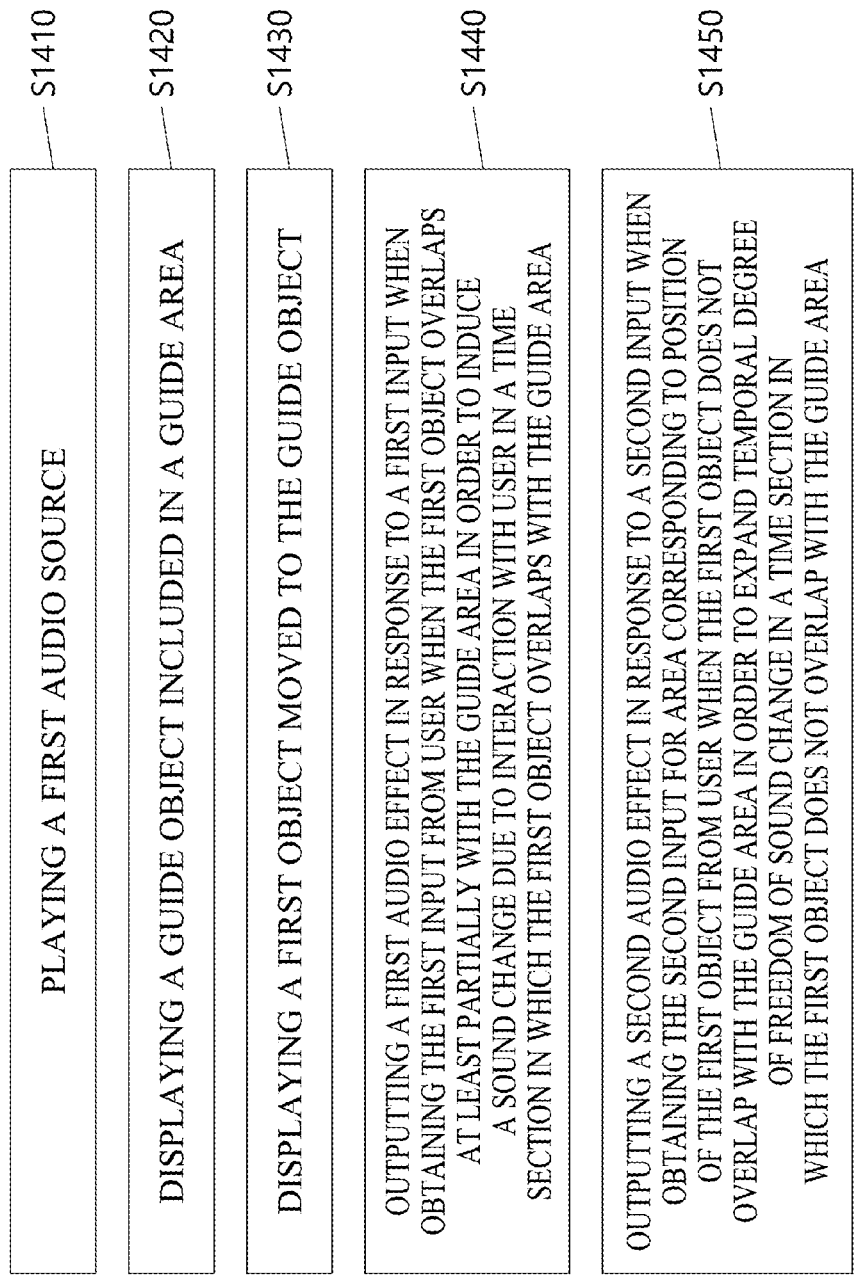
FIG. 15 is a flowchart illustrating a realistic audio source playback method according to an embodiment.

FIG. 15 is a flowchart illustrating a realistic audio source playback method according to an embodiment.

Before describing FIG. 15, the realistic audio source playback method according to an embodiment described based on FIG. 15 may be implemented using at least one of the aforementioned interfaces, but is not limited thereto, and it is apparent that although not included in the above examples, the method can be implemented using an interface for implementing a realistic audio source playback method according to an embodiment.

In addition, the realistic audio source playback method according to an embodiment may be performed by at least one processor, and is described based on a flowchart for convenience of description, but may be performed regardless of the order described in the flowchart.

Referring to FIG. 15, a realistic audio playback method according to an embodiment may include playing a first audio source (S1410), displaying a guide object included in a guide area (S1420), displaying a first object moved to the guide object (S1430), outputting a first audio effect in response to a first input when obtaining the first input from user when the first object overlaps at least partially with the guide area in order to induce a sound change due to an interaction with user in a time section in which the first object overlaps with the guide area (S1440), outputting a second audio effect in response to a second input when obtaining the second input for area corresponding to position of the first object from user when the first object does not overlap with the guide area in order to expand temporal degree of freedom of sound change in a time section in which the first object does not overlap with the guide area (S1450).

In this case, the realistic audio source playback method according to an embodiment induces a natural change in music exhibition within a limited time and space to the user based on an interaction with the user, and gives a sense of life by allowing free musical change, but the present invention is not limited thereto In addition, since the contents of the audio source and the audio source set described above are applied to the first audio source and the like, a redundant description will be omitted.

In addition, since the guide area and the guide object may be applied to the contents of the guide area and the guide object described above, a duplicate description will be omitted.

In addition, since the above-described contents regarding the first and second audio effects may be applied, a redundant description will be omitted.

Also, according to an embodiment, the first input may include a touch input for a background object.

Also, according to an embodiment, the first audio effect and the second audio effect may be the same audio effect.

Further, according to an embodiment, the second input includes a drag input for an area corresponding to the position of the first object, and the first audio effect may be output singularly in response to the first input, but the second audio effect may be continuously output for a duration of the second input.

Further, according to an embodiment, the first audio effect is an audio effect for additionally playing a second audio source, and the second audio effect is an audio effect for additionally playing a third audio source, and the length of the third audio source may be longer than the length of the second audio source.

According to the realistic audio source playback method according to an embodiment of the present invention described above, it is possible to induce a natural musical change by guiding the user to the timing of the interaction and it is possible to expand the temporal freedom for musical change by allowing the user to freely change musically, such that it is possible to give music a natural and free sense of vitality by allowing users to make natural and rich musical changes using simpler interactions.

4.2. Second Embodiment of Interface for Playing Audio Source using Interaction Rule Set FIG. 16 is a diagram for describing an interface according to an exemplary embodiment.

Figure 16:
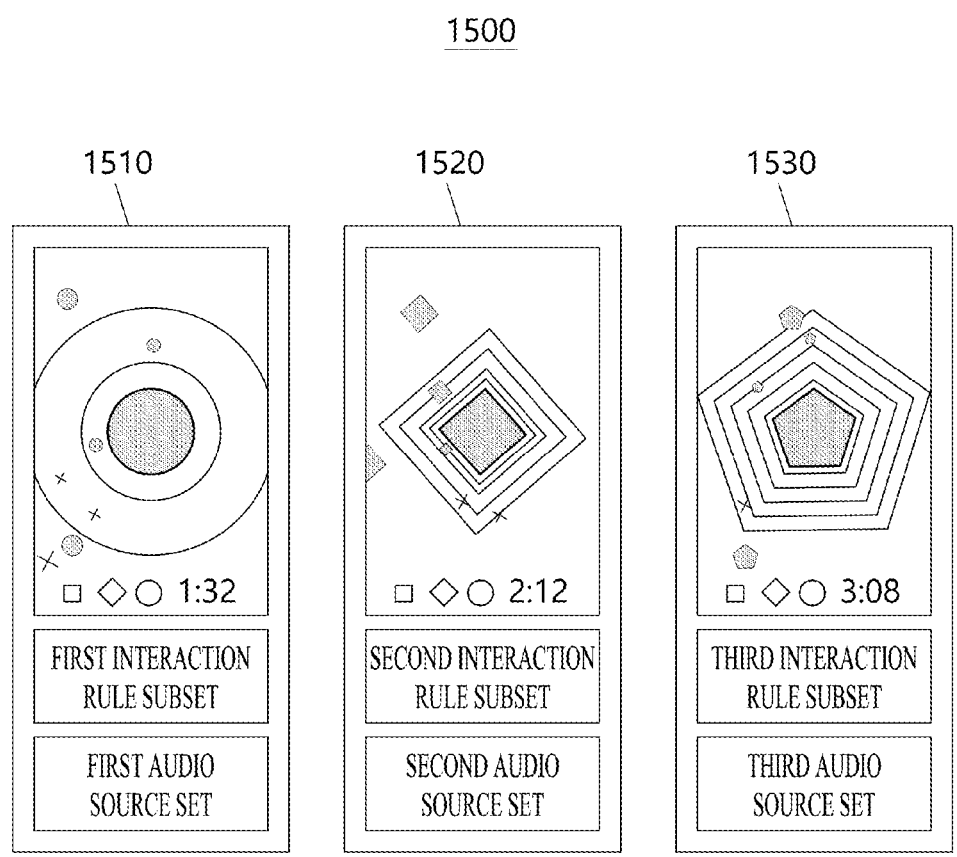
FIG. 16 is a diagram for describing an interface according to an exemplary embodiment.

Referring to FIG. 16, an interface 1500 according to an embodiment may include a first interface 1510, a second interface 1520, and a third interface 1530.

In this case, each interface may be an interface provided to play an audio source using at least one interaction rule.

For example, the first interface 1510 may be an interface provided to play a first audio source set using a first interaction rule subset, and the second interface 1520 may be an interface provided to play a second audio source set using a second interaction rule subset, and the third interface 1530 may be an interface provided to play a third audio source set using a third interaction rule subset, but the present invention is not limited thereto.

In addition, each audio source set may mean a different part of one audio source, and may include at least some of the same audio sources.

For example, the first audio source set, the second audio source set, and the third audio source set may include different portions of one piece of music, but the present invention is not limited thereto.

In addition, in order to move to each interface, user interaction in another interface may be required.

For example, in order to move to the second interface 1520, user interaction may be required in the first interface 1510, and in order to move to the third interface, user interaction may be required in the first or second interface 1510 or 1520, but the present invention is not limited thereto.

For a more specific example, when a swap input for a main object is obtained from the first interface 1510, it may be moved to the second interface 1520, and when a bash input for a main object is obtained from the first or second interfaces 1510 and 1520, it may be moved to the third interface 1530, but the present invention is not limited thereto.

Figure 17:
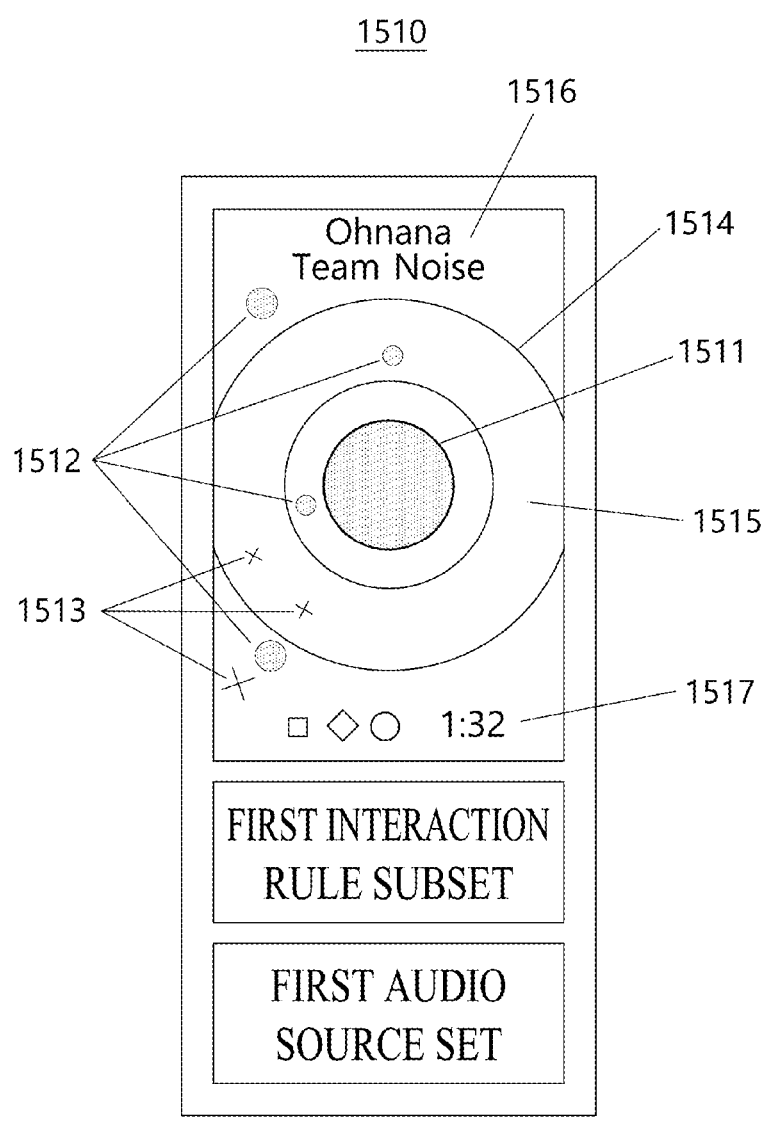
FIG. 17 is a diagram for describing an interface according to an exemplary embodiment.

FIG. 17 is a diagram for describing an interface according to an exemplary embodiment.

Referring to FIG. 17, a first interface 1510 according to an embodiment may be an interface for playing a first audio source set using a first interaction rule subset, and the screen output through the display according to the first interface may include a first object 1511, a second object 1512, a third object 1513, a fourth object 1514, a background object 1515, a music information display area 1516, and a play information display area 1517.

In this case, according to the first interface 1510, the first object 1511 may be set to change its color over time. For example, the first object 1511 may be designed in a manner in which a specific color is filled and disappears according to the BPM of the audio source being played, but the present invention is not limited thereto.

Further, according to the first interface 1510, the first object 1511 may be designed to change its size and color according to the rhythm of the played audio source, but the present invention is not limited thereto.

In addition, according to the first interface 1510, the shape of the first object 1511 may be determined according to the atmosphere, energy, tempo, etc. of the audio source being played, and for example, if the atmosphere of the audio source is determined to be the first atmosphere, the first object 1511 may be provided in a circular shape, and if the atmosphere of the audio source is determined to be the second atmosphere, the first object 1511 may be provided in a rectangular shape, but the present invention is not limited thereto.

In addition, according to the first interface 1510, the first object 1511 may be designed to be positioned on at least a part of the screen. For example, the first object 1511 may be designed to be positioned at the center of the screen, but the present invention is not limited thereto.

In addition, according to the first interface 1510, the second object 1512 may be generated in the same shape as the first object 1511. For example, when the first object 1511 has a circular shape, the second object 1512 may be generated in a circular shape, and when the first object 1511 has a rectangular shape, the second object 1512 may be generated in a rectangular shape, but the present invention is not limited thereto.

In addition, according to the first interface 1510, the second object 1512 may be generated from the center of the screen. For example, the second object 1512 may be designed to be generated in the center of the screen and moved to the outside of the screen, but the present invention is not limited thereto.

In addition, according to the first interface 1510, the second object 1512 may be designed to be moved in a direction outside the screen from the generated position. For example, the second object 1512 may be generated at an arbitrary point on the screen, and may be designed to move in a direction outside the screen from the generated position, but the present invention is not limited thereto.

In addition, according to the first interface 1510, the second object 1512 may be designed to change in size as it moves away from the center of the screen. For example, the second object 1512 may be designed to increase in size as it moves away from the center of the screen, but the present invention is not limited thereto.

In addition, according to the first interface 1510, the third object 1513 may be generated in a different shape from the first object 1511. For example, when the first object 1511 has a circular shape, the third object 1513 may be generated in an x shape different from the circular shape, but the present invention is not limited thereto.

In addition, according to the first interface 1510, the third object 1513 may be generated from the center of the screen. For example, the third object 1513 may be designed to be generated in the center of the screen and moved to the outside of the screen, but the present invention is not limited thereto.

In addition, according to the first interface 1510, the third object 1513 may be designed to be moved in a direction outside the screen from the generated position. For example, the third object 1513 may be generated at an arbitrary point on the screen, and may be designed to move in a direction outside the screen from the generated position, but the present invention is not limited thereto.

In addition, according to the first interface 1510, the third object 1513 may be designed to change in size as it moves away from the center of the screen. For example, the third object 1513 may be designed to increase in size as it moves away from the center of the screen, but the present invention is not limited thereto.

In addition, according to the first interface 1510, the fourth object 1514 may be generated in a concentric wave shape. For example, the fourth object 1514 may be generated in the shape of a concentric wave generated from a concentric wave generator positioned on a part of the screen, but the present invention is not limited thereto.

In addition, according to the first interface 1510, the fourth object 1514 may be generated in the same shape as the outer periphery of the first object 1511. For example, when the first object 1511 has a circular shape, the fourth object 1514 may be generated in a circular concentric wave shape, and when the first object 1511 has a rectangular shape, the fourth object 1514 may be generated in a rectangular concentric wave shape, but the present invention is not limited thereto.

In addition, according to the first interface 1510, the fourth object 1514 may be generated by a user's interaction. For example, when an input for the first object 1511 is obtained from a user, the fourth object 1514 may be generated in response to the obtained input, but the present invention is not limited thereto.

In addition, according to the first interface 1510, the generation period of the fourth object 1514 may be set based on information on an audio source being played. For example, when the BPM information included in the information of the audio source being played is high, the generation period of the fourth object 1514 may be shortened, and when the BPM information included in the information of the played audio source is low, the generation period of the fourth object 1514 may be lengthened, but the present invention is not limited thereto.

In addition, according to the first interface 1510, the background object 1515 may be designed to change at least a part of a color from the center of the screen toward the outer side of the screen. For example, the background object 1515 may be designed such that the saturation or brightness of a color decreases from the center of the screen toward the outer side, but the present invention is not limited thereto.

In addition, according to the first interface 1510, the music information display area 1516 may display information on an audio source to be played. For example, the music information display area 1516 may display a title and singer information of an audio source to be played, but the present invention is not limited thereto.

In addition, according to the first interface 1510, the play information display area 1517 may display information on which an audio source is played. For example, the play information display area 1517 may display interface information and time information moved to play an audio source, but the present invention is not limited thereto.

Also, according to the first interface 1510, at least some of the audio sources included in the first audio source set may be basically played. For example, a first audio source, a second audio source, and a third audio source included in the first audio source set may be played according to the first interface, but the present invention is not limited thereto.

For a more specific example, a first drum audio source, a first vocal audio source, and a first melody audio source included in the first audio source set may be played according to the first interface 1510, but the present invention is not limited thereto.

In addition, the first interaction rule subset may include at least one interaction rule, and the interaction rules described below may be implemented as one interaction rule, but are not limited thereto and may be implemented as a plurality of interaction rules.

In this case, the first interaction rule subset may include at least one interaction rule for playing the first audio source set according to a user's interaction.

For example, the first interaction rule subset may include an interaction rule designed to output at least one audio effect when an input is obtained from a user, but the present invention is not limited thereto.

Further, according to the first interaction rule subset, when a first input for the first object 1511 is obtained from a user, a configuration of the first audio source set being played may be changed.

For example, according to the first interaction rule subset, when a first input for the first object 1511 is obtained from a user, the configuration of the first audio source set being played may be changed from the first drum audio source, the first melody audio source, and the first vocal audio source to the first drum audio source, the first melody audio source, and the first mechanical vocal audio source, but the present invention is not limited thereto.

In addition, according to the first interaction rule subset, when a second input to the first object 1511 is obtained from a user, an output level of the first audio source set being played may be adjusted.

For example, according to the first interaction rule subset, when a second input for the first object 1511 is obtained from a user, the output level of at least one audio source included in the first audio source set being played may be adjusted to be the highest, but the present invention is not limited thereto.

For a more specific example, according to the first interaction rule subset, when a second input for the first object 1511 is obtained from a user, the first vocal audio source included in the first audio source set being played may be adjusted to have the highest output level, but the present invention is not limited thereto.

In this case, controlling the output level of the audio source to be the highest may mean that the output volume level is adjusted and mean that audio sources other than the audio source with the highest output level are not played or are muted.

In addition, according to the first interaction rule subset, when a second input for the first object 1511 is obtained from a user, the output level of the first audio source set being played may be differently adjusted according to the position of the second input.

For example, in the case where the second input is a drag input, according to the first interaction rule subset, when a second input corresponding to the first area for the first object 1511 is obtained from the user, the output level of the first drum audio source among the first audio source sets to be played may be adjusted to be the highest, and when a second input corresponding to the second area for the first object 1511 is obtained from the user, the output level of the first melody audio source among the played first audio source sets may be adjusted to be the highest, and when a second input corresponding to the third area for the first object 1511 is obtained from the user, the output level of the first vocal audio source among the first audio source sets to be played may be adjusted to be the highest, but the present invention is not limited thereto.

In addition, according to the first interaction rule subset, when a second input for the first object 1511 is obtained from a user, the output level of the first audio source set being played may be differently adjusted according to the position of the second input, or a video source corresponding to the played audio source may be output.

For example, in the case where the second input is a drag input, according to the first interaction rule subset, when a second input corresponding to the first area for the first object 1511 is obtained from the user, the output level of the first drum audio source among the first audio source sets to be played may be adjusted to be the highest, and when a second input corresponding to the second area for the first object 1511 is obtained from the user, the output level of the first melody audio source among the played first audio source sets may be adjusted to be the highest, and when a second input corresponding to the third area for the first object 1511 is obtained from the user, the output level of the first vocal audio source among the first audio source sets to be played may be adjusted to be the highest, and when a second input corresponding to the fourth area of the first object 1511 is obtained, a first video source corresponding to the first audio source set to be played may be output, but the present invention is not limited thereto.

In addition, according to the first interaction rule subset, when a third input for the second object 1512 is obtained from a user, at least one audio effect may be applied to an audio source to be played.

For example, according to the first interaction rule subset, when a third input for the second object 1512 is obtained from a user, a filter effect may be applied to an audio source to be played, but the present invention is not limited thereto.

In addition, according to the first interaction rule subset, when a third input for the second object 1512 is obtained from a user, an arbitrary audio effect may be applied to an audio source to be played.

In this case, the arbitrary audio effect may be an arbitrary audio effect that is matched when the second object 1512 is generated, and may be an audio effect arbitrarily determined at a time point at which an input is obtained from a user, but the present invention is not limited thereto.

In addition, according to the first interaction rule subset, when a third input for the second object 1512 is obtained from a user, the level of the audio effect applied may be changed according to the position at which the third input is obtained.

For example, according to the first interaction rule subset, in the case where a third input for the second object 1512 is obtained from a user, when the user's input moves toward the top of the screen, the level of any audio effect applied to the audio source being played may be increased, and when the user's input moves toward the bottom of the screen, the level of an arbitrary audio effect applied to the played audio source may be lowered, but the present invention is not limited thereto.

Further, according to the first interaction rule subset, when a fourth input for the third object 1513 is obtained from a user, an audio source may be additionally played.

For example, according to the first interaction rule subset, when a fourth input for the third object 1513 is obtained from a user, the bell audio source included in the first audio source set may be played, but the present invention is not limited thereto.

In addition, the first interaction rule subset may include an interaction rule for moving to another interface.

In addition, according to the first interaction rule subset, when a fifth input for the first object 1511 is obtained from a user, it may be moved to another interface.

For example, according to the first interaction rule subset, when a swap (flick) input for the first object 1511 is obtained from a user, it may be moved to the second interface, but the present invention is not limited thereto.

In addition, according to the first interaction rule subset, when a sixth input for the first object 1511 is obtained from a user, it may be moved to another interface.

For example, according to the first interaction rule subset, when a bash (random press) input for the first object 1511 is obtained from a user, it may be moved to a third interface, but the present invention is not limited thereto.

In this case, an audio source set played in the second interface and an audio source set played in the third interface may be different from each other.

For example, the energy level of the audio source set played in the third interface may be higher than the energy level of the audio source set played in the second interface, but the present invention is not limited thereto.

Hereinafter, an interface according to a user's interaction will be described using FIGS. 18 to 20.

Figure 18:
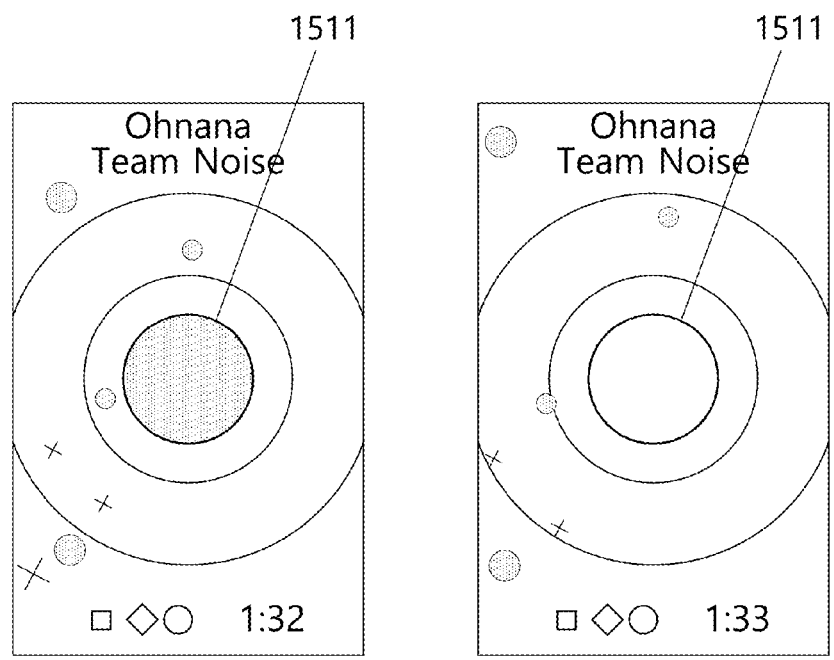
Figure 19:
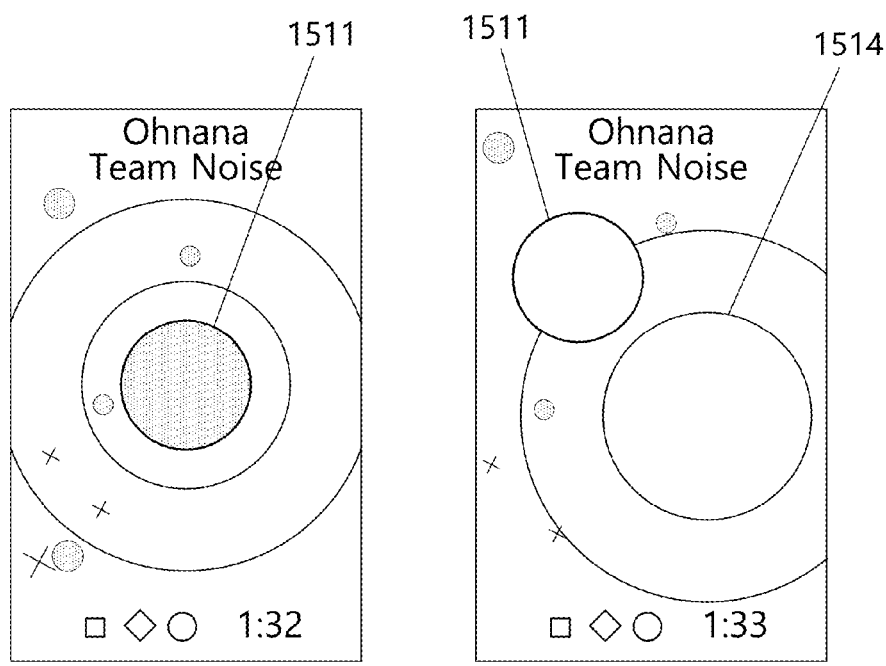

FIGS. 18 to 20 are diagrams for explaining an interface according to an embodiment.

The left diagram of FIG. 18 is a diagram showing a screen according to the first interface 1510 at a first time point, and the right diagram of FIG. 18 is a diagram showing a screen according to the first interface 1510 at a second time point.

Referring to FIG. 18, the first object 1511 may be set to change its color over time. For example, the first object 1511 may be designed in a manner in which a specific color is filled and disappears according to the BPM of the audio source being played, but the present invention is not limited thereto.

The left diagram of FIG. 19 is a diagram showing a screen according to the first interface 1510 at a third time point, and the right diagram of FIG. 19 is a diagram showing a screen according to the first interface 1510 at a fourth time point at which a user's interaction is obtained.

Referring to FIG. 19, a position of the first object 1511 may be changed according to a user's interaction.

For example, when a drag input is obtained from a user, the position of the first object 1511 may be changed according to the acquired drag input.

In this case, since the above-described contents may be applied to the play of the audio source according to the user's input, the overlapping description will be omitted.

In addition, when the position of the first object 1511 is changed, the position of the concentric wave generator for generating the fourth object 1514 may be changed.

For example, when the position of the first object 1511 is changed as shown in FIG. 19, the position of the concentric wave generator for generating the fourth object 1514 may be changed in a direction opposite to the position of the first object 1511, but the present invention is not limited thereto.

The left diagram of FIG. 20 is a diagram showing a screen according to the first interface 1510 at a fifth time point, and the right diagram of FIG. 20 is a diagram showing a screen according to the first interface 1510 at a sixth time point at which a user's interaction is obtained.

Referring to FIG. 20, information on an audio effect applied when a user's input to the second object 1512 is acquired may be displayed.

For example, when a user's input for the second object 1512 is acquired, filter effects can be applied to the audio source being played, and the text "filter" may be displayed to indicate the type of audio effect applied, and at least one figure may be displayed to indicate the level of the applied audio effect, but the present invention is not limited thereto.

In this case, since the above-described contents may be applied to the play of the audio source according to the user's input, the overlapping description will be omitted.

Figure 21:
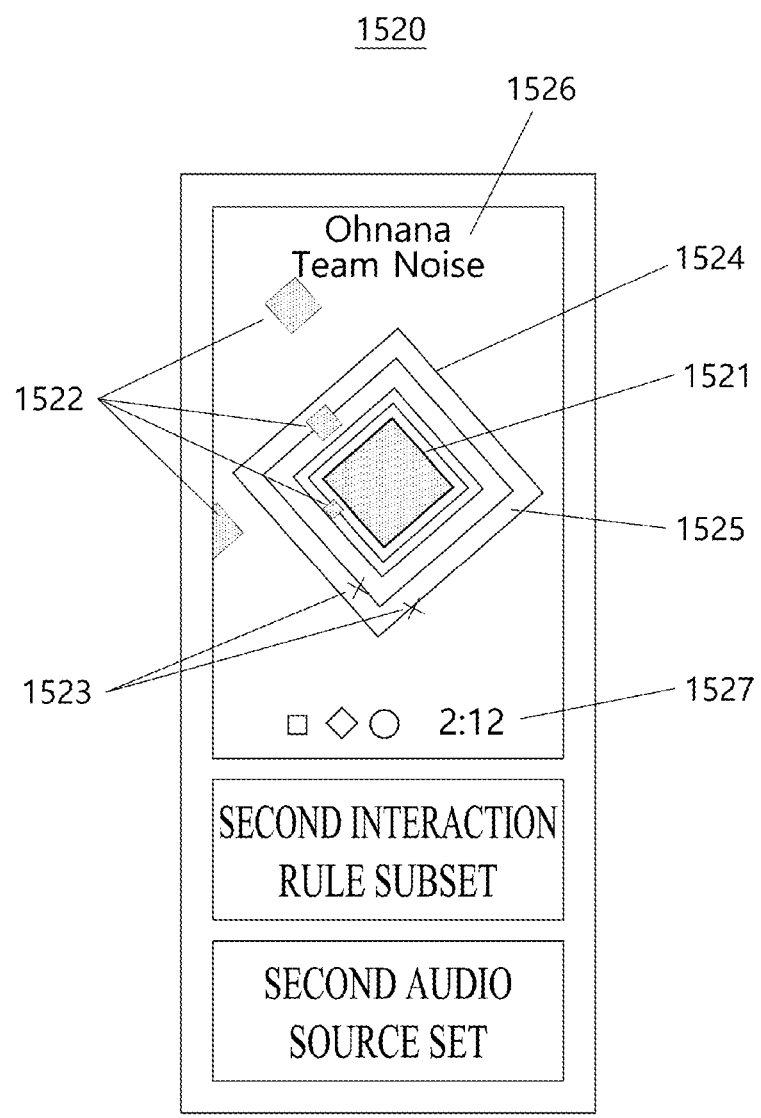
FIG. 21 is a diagram for describing an interface according to an exemplary embodiment.

FIG. 21 is a diagram for describing an interface according to an exemplary embodiment.

Referring to FIG. 21, a second interface 1520 according to an embodiment may be an interface for playing a second audio source set using a second interaction rule subset, and the screen output through the display according to the second interface 1520 may include a first object 1521, a second object 1522, a third object 1523, a fourth object 1524, a background object 1525, a music information display area 1526, and a play information display area 1527.

In this case, the first object 1521, the second object 1522, the third object 1523, the fourth object 1524, the background object 1525, the music information display area 1526, and the play information display area 1527 may be different from the objects described through FIGS. 17 to 20, but for convenience of explanation, they will be described in such terms.

In this case, according to the second interface 1520, the first object 1521 may be set to change its color over time. For example, the first object 1521 may be designed in a manner in which a specific color is filled and disappears according to the BPM of the audio source being played, but the present invention is not limited thereto.

Further, according to the second interface 1520, the first object 1521 may be designed to change its size and color according to the rhythm of the played audio source, but the present invention is not limited thereto.

In addition, according to the second interface 1520, the shape of the first object 1521 may be determined according to the atmosphere, energy, tempo, etc. of the audio source being played, and for example, if the atmosphere of the audio source is determined to be the first atmosphere, the first object 1521 may be provided in a circular shape, and if the atmosphere of the audio source is determined to be the second atmosphere, the first object 1521 may be provided in a rectangular shape, but the present invention is not limited thereto.

In addition, according to the second interface 1520, the first object 1521 may be designed to be positioned on at least a part of the screen. For example, the first object 1521 may be designed to be positioned at the center of the screen, but the present invention is not limited thereto.

In addition, according to the second interface 1520, the second object 1522 may be generated in the same shape as the first object 1521. For example, when the first object 1521 has a rectangular shape, the second object 1522 may be generated in a rectangular shape, but the present invention is not limited thereto.

In addition, according to the second interface 1520, the second object 1522 may be generated from the center of the screen. For example, the second object 1522 may be designed to be generated in the center of the screen and moved to the outside of the screen, but the present invention is not limited thereto.

In addition, according to the second interface 1520, the second object 1522 may be designed to move from the generated position to the outer side of the screen. For example, the second object 1522 may be generated at an arbitrary point on the screen, and may be designed to move in a direction outside the screen from the generated position, but the present invention is not limited thereto.

In addition, according to the second interface 1520, the second object 1522 may be designed to change in size as it moves away from the center of the screen. For example, the second object 1522 may be designed to increase in size as it moves away from the center of the screen, but the present invention is not limited thereto.

In addition, according to the second interface 1520, the third object 1523 may be generated in a shape different from that of the first object 1521. For example, when the first object 1521 has a square shape, the third object 1523 may be generated in an x shape different from the square shape, but the present invention is not limited thereto.

In addition, according to the second interface 1520, the third object 1523 may be generated from the center of the screen. For example, the third object 1523 may be designed to be generated in the center of the screen and moved to the outside of the screen, but the present invention is not limited thereto.

In addition, according to the second interface 1520, the third object 1523 may be designed to move from the generated position to the outer side of the screen. For example, the third object 1523 may be generated at an arbitrary point on the screen, and may be designed to move in a direction outside the screen from the generated position, but the present invention is not limited thereto.

In addition, according to the second interface 1520, the third object 1523 may be designed to change in size as it moves away from the center of the screen. For example, the third object 1523 may be designed to increase in size as it moves away from the center of the screen, but the present invention is not limited thereto.

In addition, according to the second interface 1520, the fourth object 1524 may be generated in a concentric wave shape. For example, the fourth object 1524 may be generated in a concentric wave shape generated from a concentric wave generator positioned on a part of the screen, but the present invention is not limited thereto.

Further, according to the second interface 1520, the fourth object 1524 may be generated in the same shape as the outer periphery of the first object 1521. For example, when the first object 1521 has a rectangular shape, the fourth object 1524 may be generated in a rectangular concentric wave shape, but the present invention is not limited thereto.

In addition, according to the second interface 1520, the fourth object 1524 may be generated by a user's interaction. For example, when an input for the first object 1521 is obtained from a user, the fourth object 1524 may be generated in response to the obtained input, but the present invention is not limited thereto.

In addition, according to the second interface 1520, the generation period of the fourth object 1524 may be set based on information on an audio source being played. For example, when the BPM information included in the information of the audio source being played is high, the generation period of the fourth object 1524 may be shortened, and when the BPM information included in the information of the played audio source is low, the generation period of the fourth object 1524 may be lengthened, but the present invention is not limited thereto.

In addition, according to the second interface 1520, the background object 1525 may be designed to change at least a part of a color from the center of the screen toward the outer side of the screen. For example, the background object 1525 may be designed such that the saturation or brightness of a color decreases from the center of the screen toward the outer side, but the present invention is not limited thereto.

In addition, according to the second interface 1520, the music information display area 1526 may display information on an audio source to be played. For example, the music information display area 1526 may display a title and singer information of an audio source to be played, but the present invention is not limited thereto.

In addition, according to the second interface 1520, the play information display area 1527 may display information on which an audio source is played. For example, the play information display area 1527 may display interface information and time information moved to play an audio source, but the present invention is not limited thereto.

Also, according to the second interface 1520, at least some of the audio sources included in the second audio source set may be basically played. For example, a first audio source, a second audio source, and a third audio source included in the second audio source set may be played according to the second interface, but the present invention is not limited thereto.

For a more specific example, a second drum audio source, a second vocal audio source, and a second melody audio source included in the second audio source set may be played according to the second interface 1520, but the present invention is not limited thereto.

In addition, the second interaction rule subset may include at least one interaction rule, and the interaction rules described below may be implemented as one interaction rule, but are not limited thereto and may be implemented as a plurality of interaction rules.

In this case, the second interaction rule subset may include at least one interaction rule for playing the second audio source set according to a user's interaction.

For example, the second interaction rule subset may include an interaction rule designed to output at least one audio effect when an input is obtained from a user, but is not limited thereto.

Further, according to the second interaction rule subset, when a first input for the first object 1521 is obtained from a user, a configuration of the second audio source set being played may be changed.

For example, according to the second interaction rule subset, when a first input for the first object 1521 is obtained from a user, the configuration of the second audio source set being played may be changed from the second drum audio source, the second melody audio source, and the second vocal audio source to the second drum audio source, the second melody audio source, and the second mechanical vocal audio source, but the present invention is not limited thereto.

In addition, according to the second interaction rule subset, when a second input to the first object 1521 is obtained from a user, an output level of the second audio source set being played may be adjusted.

For example, according to the second interaction rule subset, when a second input for the first object 1521 is obtained from a user, the output level of at least one audio source included in the second audio source set being played may be adjusted to be the highest, but the present invention is not limited thereto.

For a more specific example, according to the second interaction rule subset, when a second input for the first object 1521 is obtained from a user, the second vocal audio source included in the second audio source set being played may be adjusted to have the highest output level, but the present invention is not limited thereto.

In this case, controlling the output level of the audio source to be the highest may mean that the output volume level is adjusted and mean that audio sources other than the audio source with the highest output level are not played or are muted.

In addition, according to the second interaction rule subset, when a second input for the first object 1521 is obtained from a user, the output level of the first audio source set being played may be differently adjusted according to the position of the second input.

For example, in the case where the second input is a drag input, according to the second interaction rule subset, when a second input corresponding to the first area for the first object 1521 is obtained from the user, the output level of the second drum audio source among the second audio source sets to be played may be adjusted to be the highest, and when a second input corresponding to the second area for the first object 1521 is obtained from the user, the output level of the second melody audio source among the played second audio source sets may be adjusted to be the highest, and when a second input corresponding to the third area for the first object 1521 is obtained from the user, the output level of the second vocal audio source among the second audio source sets to be played may be adjusted to be the highest, but the present invention is not limited thereto.

In addition, according to the second interaction rule subset, when a second input for the first object 1521 is obtained from a user, the output level of the second audio source set being played may be differently adjusted according to the position of the second input, or a video source corresponding to the played audio source may be output.

For example, in the case where the second input is a drag input, according to the second interaction rule subset, when a second input corresponding to the first area for the first object 1521 is obtained from the user, the output level of the second drum audio source among the second audio source sets to be played may be adjusted to be the highest, and when a second input corresponding to the second area for the first object 1521 is obtained from the user, the output level of the second melody audio source among the played second audio source sets may be adjusted to be the highest, and when a second input corresponding to the third area for the first object 1521 is obtained from the user, the output level of the second vocal audio source among the second audio source sets to be played may be adjusted to be the highest, and when a second input corresponding to the fourth area of the first object 1521 is obtained, a second video source corresponding to the second audio source set to be played may be output, but the present invention is not limited thereto.

In addition, according to the second interaction rule subset, when a third input for the second object 1522 is obtained from a user, at least one audio effect may be applied to an audio source to be played.

For example, according to the second interaction rule subset, when a third input for the second object 1522 is obtained from a user, a filter effect may be applied to an audio source to be played, but the present invention is not limited thereto.

In addition, according to the second interaction rule subset, when a third input for the second object 1522 is obtained from a user, an arbitrary audio effect may be applied to an audio source to be played.

In this case, the arbitrary audio effect may be an arbitrary audio effect that is matched when the second object 1522 is generated, and may be an audio effect arbitrarily determined at a time point at which an input is obtained from a user, but the present invention is not limited thereto.

In addition, according to the second interaction rule subset, when a third input for the second object 1522 is obtained from a user, the level of the audio effect applied may be changed according to the position at which the third input is obtained.

For example, according to the second interaction rule subset, in the case where a third input for the second object 1522 is obtained from a user, when the user's input moves toward the top of the screen, the level of any audio effect applied to the audio source being played may be increased, and when the user's input moves toward the bottom of the screen, the level of an arbitrary audio effect applied to the played audio source may be lowered, but the present invention is not limited thereto.

Further, according to the second interaction rule subset, when a fourth input for the third object 1523 is obtained from a user, an audio source may be additionally played.

For example, according to the second interaction rule subset, when a fourth input for the third object 1523 is obtained from a user, the bell audio source included in the second audio source set may be played, but the present invention is not limited thereto.

In addition, the second interaction rule subset may include an interaction rule for moving to another interface.

In addition, according to the second interaction rule subset, when a fifth input for the first object 1521 is obtained from a user, it may be moved to another interface.

For example, according to the second interaction rule subset, when a swap (flick) input for the first object 1521 is obtained from a user, it may be moved to the first interface, but the present invention is not limited thereto.

In addition, according to the second interaction rule subset, when a sixth input for the first object 1521 is obtained from a user, it may be moved to another interface.

For example, according to the second interaction rule subset, when a bash (random press) input for the first object 1521 is obtained from a user, it may be moved to the third interface, but the present invention is not limited thereto.

In this case, an audio source set played in the first interface and an audio source set played in the third interface may be different from each other.

For example, the energy level of the audio source set played in the third interface may be higher than the energy level of the audio source set played in the first interface, but the present invention is not limited thereto.

Figure 22:
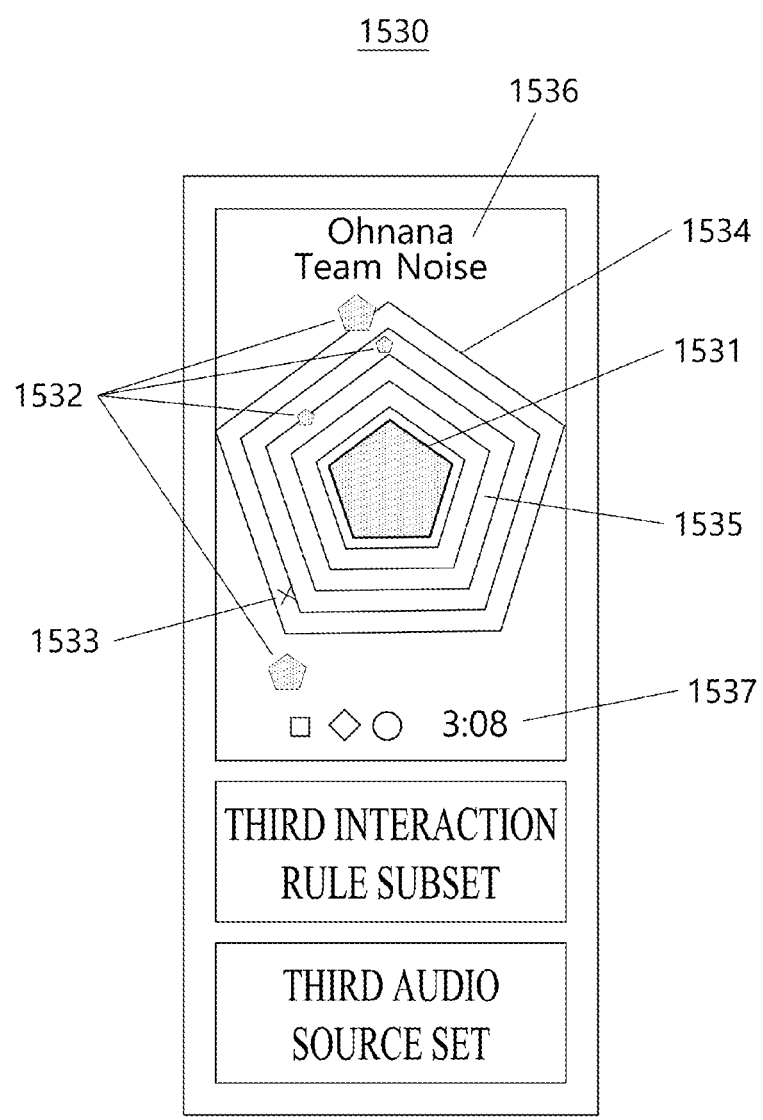
FIG. 22 is a diagram for describing an interface according to an exemplary embodiment.

FIG. 22 is a diagram for describing an interface according to an exemplary embodiment.

Referring to FIG. 22, a third interface 1530 according to an embodiment may be an interface for playing a third audio source set using a third interaction rule subset, and the screen output through the display according to the third interface 1530 may include a first object 1531, a second object 1522, a third object 1532, a fourth object 1534, a background object 1535, a music information display area 1536, and a play information display area 1537.

In this case, the first object 1531, the second object 1532, the third object 1533, the fourth object 1534, the background object 1535, the music information display area 1536, and the play information display area 1537 may be different from the objects described through FIGS. 17 to 20 or the objects described through FIG. 21, but for convenience of explanation, they will be described in such terms.

In this case, according to the third interface 1530, the first object 1531 may be set to change its color over time. For example, the first object 1531 may be designed in a manner in which a specific color is filled and disappears according to the BPM of the audio source being played, but the present invention is not limited thereto.

Further, according to the third interface 1530, the first object 1531 may be designed to change its size and color according to the rhythm of the played audio source, but the present invention is not limited thereto.

In addition, according to the third interface 1530, the shape of the first object 1531 may be determined according to the atmosphere, energy, tempo, etc. of the audio source being played, and for example, if the atmosphere of the audio source is determined to be the first atmosphere, the first object 1531 may be provided in a circular shape, and if the atmosphere of the audio source is determined to be the second atmosphere, the first object 1531 may be provided in a pentagonal shape, but the present invention is not limited thereto.

In addition, according to the third interface 1530, the first object 1531 may be designed to be positioned on at least a part of the screen. For example, the first object 1531 may be designed to be positioned at the center of the screen, but the present invention is not limited thereto.

In addition, according to the third interface 1530, the second object 1532 may be generated in the same shape as the first object 1531. For example, when the first object 1531 has a pentagonal shape, the second object 1532 may be generated in a pentagonal shape, but the present invention is not limited thereto.

In addition, according to the third interface 1530, the second object 1532 may be generated from the center of the screen. For example, the second object 1532 may be designed to be generated in the center of the screen and moved to the outside of the screen, but the present invention is not limited thereto.

In addition, according to the third interface 1530, the second object 1532 may be designed to move from the generated position to the outer side of the screen. For example, the second object 1532 may be generated at an arbitrary point on the screen, and may be designed to move in a direction outside the screen from the generated position, but the present invention is not limited thereto.

In addition, according to the third interface 1530, the second object 1532 may be designed to change in size as it moves away from the center of the screen. For example, the second object 1532 may be designed to increase in size as it moves away from the center of the screen, but the present invention is not limited thereto.

In addition, according to the third interface 1530, the third object 1533 may be generated in a shape different from that of the first object 1531. For example, when the first object 1531 has a pentagonal shape, the third object 1533 may be generated in an x shape different from the pentagonal shape, but the present invention is not limited thereto.

In addition, according to the third interface 1530, the third object 1533 may be generated from the center of the screen. For example, the third object 1533 may be designed to be generated in the center of the screen and moved to the outside of the screen, but the present invention is not limited thereto.

In addition, according to the third interface 1530, the third object 1533 may be designed to move from the generated position to the outer side of the screen. For example, the third object 1533 may be generated at an arbitrary point on the screen, and may be designed to move in a direction outside the screen from the generated position, but the present invention is not limited thereto.

In addition, according to the third interface 1530, the third object 1533 may be designed to change in size as it moves away from the center of the screen. For example, the third object 1533 may be designed to increase in size as it moves away from the center of the screen, but the present invention is not limited thereto.

In addition, according to the third interface 1530, the fourth object 1534 may be generated in a concentric wave shape. For example, the fourth object 1534 may be generated in a concentric wave shape generated from a concentric wave generator positioned on a part of the screen, but the present invention is not limited thereto.

Further, according to the third interface 1530, the fourth object 1534 may be generated in the same shape as the outer periphery of the first object 1531. For example, when the first object 1531 has a pentagonal shape, the fourth object 1534 may be generated in a pentagonal concentric wave shape, but the present invention is not limited thereto.

In addition, according to the third interface 1530, the fourth object 1534 may be generated by a user's interaction. For example, when an input for the first object 1531 is obtained from a user, the fourth object 1534 may be generated in response to the obtained input, but the present invention is not limited thereto.

In addition, according to the third interface 1530, the generation period of the fourth object 1534 may be set based on information on an audio source being played. For example, when the BPM information included in the information of the audio source being played is high, the generation period of the fourth object 1534 may be shortened, and when the BPM information included in the information of the played audio source is low, the generation period of the fourth object 1534 may be lengthened, but the present invention is not limited thereto.

In addition, according to the third interface 1530, the background object 1535 may be designed to change at least a part of a color from the center of the screen toward the outer side of the screen. For example, the background object 1535 may be designed such that the saturation or brightness of a color decreases from the center of the screen toward the outer side, but the present invention is not limited thereto.

In addition, according to the third interface 1530, the music information display area 1536 may display information on an audio source to be played. For example, the music information display area 1536 may display a title and singer information of an audio source to be played, but the present invention is not limited thereto.

In addition, according to the third interface 1530, the play information display area 1537 may display information on which an audio source is played. For example, the play information display area 1537 may display interface information and time information moved to play an audio source, but the present invention is not limited thereto.

Also, according to the third interface 1530, at least some of the audio sources included in the third audio source set may be basically played. For example, a first audio source, a second audio source, and a third audio source included in the third audio source set may be played according to the third interface, but the present invention is not limited thereto.

For a more specific example, a third drum audio source, a third vocal audio source, and a third melody audio source included in the third audio source set may be played according to the third interface 1530, but the present invention is not limited thereto.

In addition, the third interaction rule subset may include at least one interaction rule, and the interaction rules described below may be implemented as one interaction rule, but are not limited thereto and may be implemented as a plurality of interaction rules.

In this case, the third interaction rule subset may include at least one interaction rule for playing the third audio source set according to a user's interaction.

For example, the third interaction rule subset may include an interaction rule designed to output at least one audio effect when an input is obtained from a user, but the present invention is not limited thereto.

Further, according to the third interaction rule subset, when a first input for the first object 1531 is obtained from a user, a configuration of the third audio source set being played may be changed.

For example, according to the third interaction rule subset, when a first input for the first object 1531 is obtained from a user, the configuration of the third audio source set being played may be changed from the third drum audio source, the third melody audio source, and the third vocal audio source to the third drum audio source, the third melody audio source, and the third mechanical vocal audio source, but the present invention is not limited thereto.

In addition, according to the third interaction rule subset, when a second input for the first object 1531 is obtained from a user, the output level of the third audio source set being played may be adjusted.

For example, according to the third interaction rule subset, when a second input for the first object 1531 is obtained from a user, the output level of at least one audio source included in the third audio source set being played may be adjusted to be the highest, but the present invention is not limited thereto.

In more detail, according to the third interaction rule subset, when a second input for the first object 1531 is obtained from a user, the output level of a third vocal audio source included in the third audio source set being played may be adjusted to be the highest, but the present invention is not limited thereto.

In this case, controlling the output level of the audio source to be the highest may mean that the output volume level is adjusted and mean that audio sources other than the audio source with the highest output level are not played or are muted.

In addition, according to the third interaction rule subset, when a second input for the first object 1531 is obtained from a user, the output level of the third audio source set being played may be differently adjusted according to the position of the second input.

For example, in the case where the second input is a drag input, according to the third interaction rule subset, when a second input corresponding to the first area for the first object 1531 is obtained from the user, the output level of the third drum audio source among the third audio source sets to be played may be adjusted to be the highest, and when a second input corresponding to the second area for the first object 1531 is obtained from the user, the output level of the third melody audio source among the played third audio source sets may be adjusted to be the highest, and when a second input corresponding to the third area for the first object 1531 is obtained from the user, the output level of the third vocal audio source among the third audio source sets to be played may be adjusted to be the highest, but the present invention is not limited thereto.

In addition, according to the third interaction rule subset, when a second input for the first object 1531 is obtained from a user, the output level of the third audio source set being played may be differently adjusted according to the position of the second input, or a video source corresponding to the played audio source may be output.

For example, in the case where the second input is a drag input, according to the third interaction rule subset, when a second input corresponding to the first area for the first object 1531 is obtained from the user, the output level of the third drum audio source among the third audio source sets to be played may be adjusted to be the highest, and when a second input corresponding to the second area for the first object 1531 is obtained from the user, the output level of the third melody audio source among the played third audio source sets may be adjusted to be the highest, and when a second input corresponding to the third area for the first object 1531 is obtained from the user, the output level of the third vocal audio source among the third audio source sets to be played may be adjusted to be the highest, and when a second input corresponding to the fourth area of the first object 1531 is obtained, a third video source corresponding to the third audio source set to be played may be output, but the present invention is not limited thereto.

Further, according to the third interaction rule subset, when a third input for the second object 1532 is obtained from a user, at least one audio effect may be applied to an audio source to be played.

For example, according to the third interaction rule subset, when a third input for the second object 1532 is obtained from a user, a filter effect may be applied to an audio source to be played, but the present invention is not limited thereto.

In addition, according to the third interaction rule subset, when a third input for the second object 1532 is obtained from a user, an arbitrary audio effect may be applied to an audio source to be played.

In this case, the arbitrary audio effect may be an arbitrary audio effect that is matched when the second object 1532 is generated, and may be an audio effect arbitrarily determined at a time point at which an input is obtained from a user, but the present invention is not limited thereto.

In addition, according to the third interaction rule subset, when a third input for the second object 1532 is obtained from a user, the level of the audio effect applied may be changed according to the position at which the third input is obtained.

For example, according to the third interaction rule subset, in the case where a third input for the second object 1532 is obtained from a user, when the user's input moves toward the top of the screen, the level of any audio effect applied to the audio source being played may be increased, and when the user's input moves toward the bottom of the screen, the level of an arbitrary audio effect applied to the played audio source may be lowered, but the present invention is not limited thereto.

Further, according to the third interaction rule subset, when a fourth input for the third object 1533 is obtained from a user, an audio source may be additionally played.

For example, according to the third interaction rule subset, when a fourth input for the third object 1533 is obtained from a user, the bell audio source included in the second audio source set may be played, but the present invention is not limited thereto.

In addition, the third interaction rule subset may include an interaction rule for moving to another interface.

In addition, according to the third interaction rule subset, when a fifth input for the first object 1531 is obtained from a user, it may be moved to another interface.

For example, according to the third interaction rule subset, when a swap (flick) input for the first object 1531 is obtained from a user, it may be moved to the first or second interface, but the present invention is not limited thereto.

Figure 23:
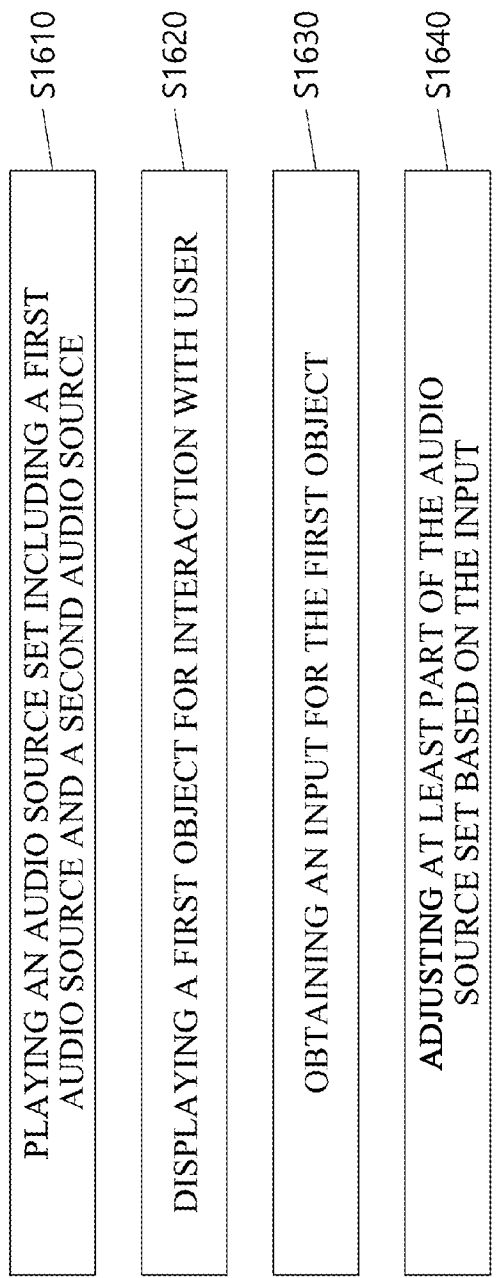
FIG. 23 is a flowchart illustrating a realistic audio source playback method according to an embodiment.

FIG. 23 is a flowchart illustrating a realistic audio source playback method according to an embodiment.

Before describing FIG. 23, the realistic audio source playback method according to an embodiment described based on FIG. 23 may be implemented using at least one of the aforementioned interfaces, but is not limited thereto, and it is apparent that although not included in the above examples, the method can be implemented using an interface for implementing a realistic audio source playback method according to an embodiment.

In addition, the realistic audio source playback method according to an embodiment may be performed by at least one processor, and is described based on a flowchart for convenience of description, but may be performed regardless of the order described in the flowchart.

Referring to FIG. 23, a realistic audio source playback method according to an embodiment may include playing an audio source set including a first audio source and a second audio source (S1610), displaying a first object for interaction with a user (S1620), obtaining an input for the first object (S1630), and adjusting at least a part of the audio source set based on the acquired input (S1640).

In this case, the realistic audio source playback method according to an embodiment creates a leading musical experience for the user by giving a selective change to the audio source based on the interaction with the user, but creates a variety of musical experiences for users by giving non-selective changes to the audio source, but the present invention is not limited thereto.

In addition, since the above-described audio source and audio source set are applied to the first and second audio sources, a redundant description will be omitted.

In addition, since the contents of the audio source and the audio source set described above are applied to the audio source set, overlapping descriptions will be omitted.

Further, according to an embodiment, in the changing of at least the part of the audio source set, when obtaining a first input for the first object so that a selective change to the audio source set is given at a time point intended by the user according to an interaction with the user, the audio source set is changed so that the output level of the first audio source selected by the first input among the audio source sets is highest, and when obtaining a second input for the first object such that a random change to the audio source set is given at a time point intended by the user according to the interaction with the user, any audio effect may be applied to at least one audio source in the audio source set.

Further, according to an embodiment, the first input related to the first object may include a drag input for the first object, and the second input related to the first object may include a touch input on the first object.

Further, according to an embodiment, in order to adjust the audio source set so that the output level of the first audio source is the highest, the second audio source may not be played.

Further, according to an embodiment, in order to adjust the audio source set so that the output level of the first audio source is the highest, the volume level of the first audio source may be set to be higher than the volume level of the second audio source.

Further, according to an embodiment, the volume level of the first audio source is increased and the volume level of the second audio source is decreased, but the volume level of the first audio source may be non-linearly increased, and the volume level of the second audio source may be non-linearly decreased.

Further, according to an embodiment, the arbitrary audio effect may be determined based on a time point at which the second input is obtained.

According to the realistic audio source playback method according to an embodiment of the present invention described above, since it allows the user to change the music proactively by enabling the selective change intended by the user, and allows users to experience unpredictable musical experiences by enabling unintended random changes, it is possible to induce users with weak musical experience to take the lead in various musical changes, and make musical changes that are not well known possible, resulting in a variety of musical experiences for users.

Figure 24:
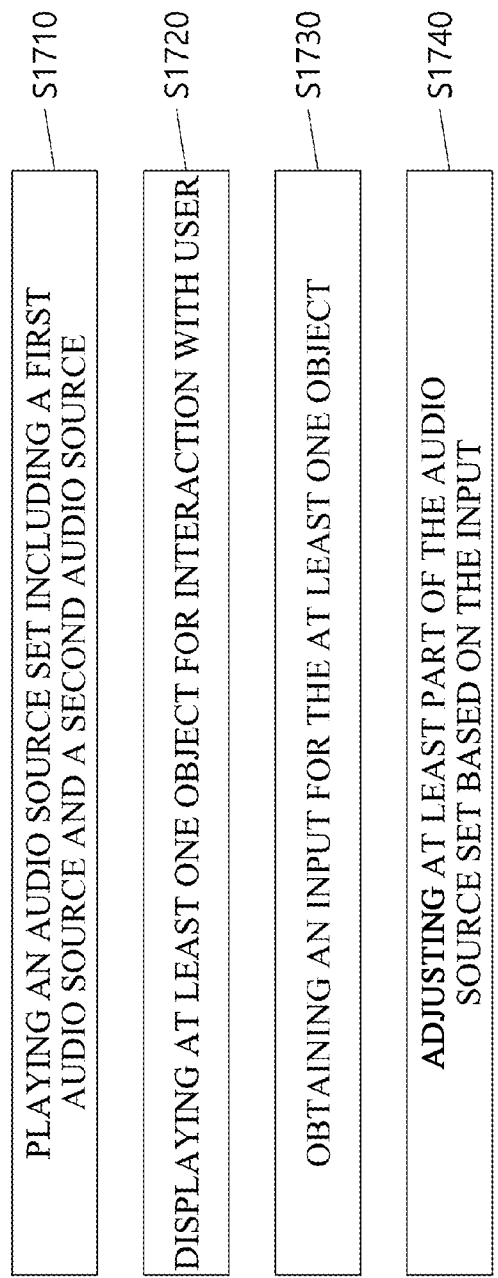
FIG. 24 is a flowchart illustrating a realistic audio source playback method according to an embodiment.

FIG. 24 is a flowchart illustrating a realistic audio source playback method according to an embodiment.

Before describing FIG. 24, the realistic audio source playback method according to an embodiment described based on FIG. 24 may be implemented using at least one of the aforementioned interfaces, but is not limited thereto, and it is apparent that although not included in the above examples, the method can be implemented using an interface for implementing a realistic audio source playback method according to an embodiment.

In addition, the realistic audio source playback method according to an embodiment may be performed by at least one processor, and is described based on a flowchart for convenience of description, but may be performed regardless of the order described in the flowchart.

Referring to FIG. 24, a realistic audio source playback method according to an embodiment may include playing an audio source set including a first audio source and a second audio source (S1710), displaying at least one object for interaction with a user (S1720), obtaining an input for the at least one object (S1730), and adjusting at least a part of the audio source set based on the acquired input (S1740).

In this case, the realistic audio source playback method according to an embodiment creates a leading musical experience for the user by giving the possibility of continuous change to the audio source based on the interaction with the user, but creates a variety of musical experiences for users by giving the possibility of random changes to the audio source, but the present invention is not limited thereto.

In addition, since the above-described audio source and audio source set are applied to the first and second audio sources, a redundant description will be omitted.

In addition, since the contents of the audio source and the audio source set described above are applied to the audio source set, overlapping descriptions will be omitted.

Further, according to an embodiment, in the changing of at least the part of the audio source set, in order to perform selective change to the audio source set at a time point expected by the user according to the interaction with the user, a first object among the at least one object is displayed during a first time section, and when a first input is obtained for the first object, the audio source set is adjusted so that the output level of the first audio source selected by the first input among the audio source sets is highest, and when a second object among the at least one object is displayed at an arbitrary time point for a time within a second time section shorter than the first time section to perform selective change to the audio source set at an arbitrary time section according to the interaction with the user and a second input is obtained for the second object, an audio effect corresponding to the second object may be applied to at least a part of the audio source set.

In addition, according to an embodiment, the size of the first object may be larger than the size of the second object.

Further, according to an embodiment, the audio effect corresponding to the second object may include at least one of a tempo control for an audio source, a low pass filter, a high pass filter, a pitch control, a beat repeater, an echo, and a psychedelic mode.

Further, according to an embodiment, the audio effect corresponding to the second object may be matched and set when the second object is generated.

Further, according to an embodiment, the number of the second objects displayed on one screen at the at least one time point may be greater than the number of the first objects.

Further, according to an embodiment, in the changing of at least the part of the audio source set, in order to maintain the possibility of user interaction with the first audio effect group, but randomly generate the possibility of user interaction with the second audio effect group, a first object among the at least one object is displayed during a first time section, and when a second object among the at least one object is displayed for a second time section shorter than the first time section at an arbitrary time point, and a first input for the first object is obtained from a user, the audio source set is adjusted so that the output level of the first audio source selected by the first input among the audio source sets is highest, and when a second input is obtained for the second object from the user, an audio effect corresponding to the second object may be applied to at least one audio source in the audio source set.

In addition, according to an embodiment, the first audio effect group includes an audio effect for adjusting an audio source set such that an output level of the first or second audio source included in the audio source set is higher than an output level of another audio source, and the second audio effect group may include at least one audio effect among tempo adjustment, low pass filter, high pass filter, pitch adjustment, beat repeater, echo, and psychedelic mode for at least one audio source in the audio source set.

In addition, according to an embodiment, when the first input is obtained for the first object, the audio source set may be adjusted such that the output level of the first audio source selected by the first input among the audio source set is highest.

According to the realistic audio source playback method according to an embodiment of the present invention described above, it continuously opens the possibility of selective change to the user, but sporadically opens the possibility of random change, so that various musical changes can be made within a limited time and space, and various musical experiences can be created for users by using this.

4.3. Third Embodiment of Interface for Playing Audio Source using Interaction Rule Set FIG. 25 is a diagram for describing an interface according to an exemplary embodiment.

Figure 25:
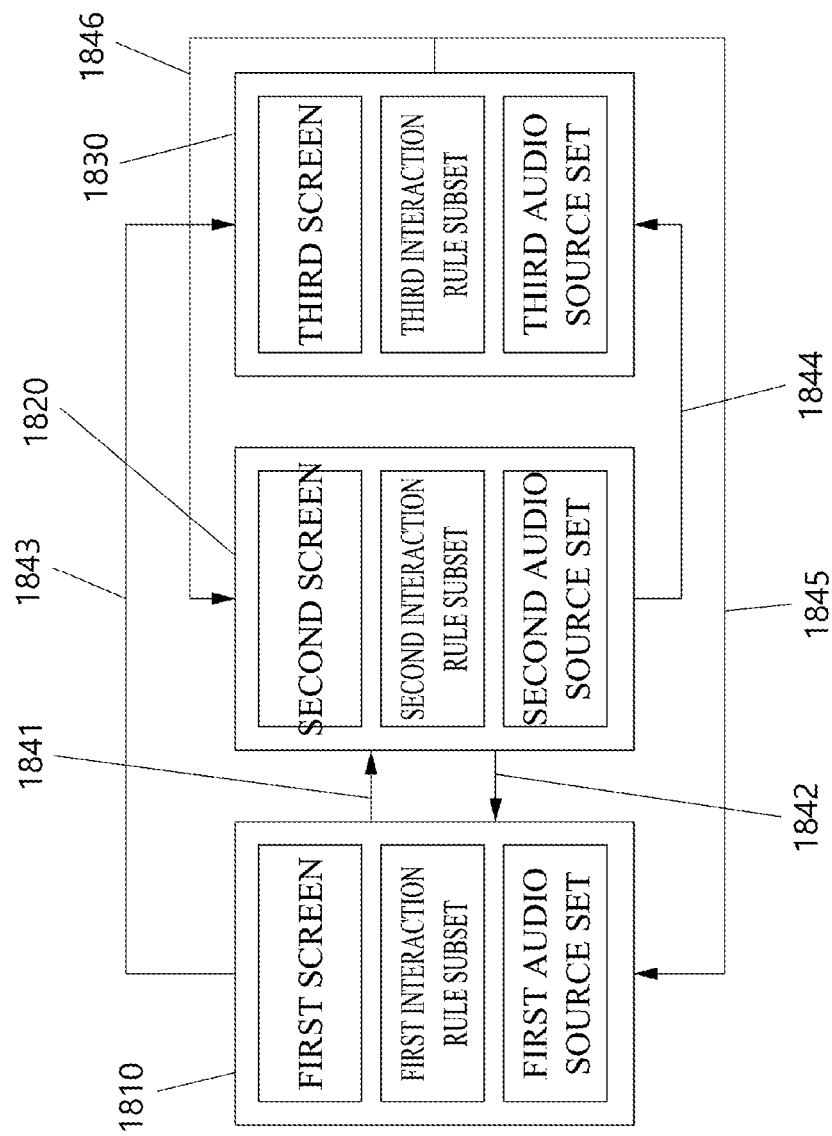
FIG. 25 is a diagram for describing an interface according to an exemplary embodiment.

Referring to FIG. 25, an interface 1800 according to an embodiment may include a first interface 1810, a second interface 1820, and a third interface 1830.

In this case, each interface may be an interface provided to play an audio source using at least one interaction rule.

For example, the first interface 1810 may be an interface provided to play a first audio source set using a first interaction rule subset, and the second interface 1820 may be an interface provided to play a second audio source set using a second interaction rule subset, and the third interface 1830 may be an interface provided to play a third audio source set using a third interaction rule subset, but the present invention is not limited thereto.

In addition, each audio source set may mean a different part of one audio source, and may include at least some of the same audio sources.

For example, the first audio source set, the second audio source set, and the third audio source set may include different portions of one piece of music, but the present invention is not limited thereto.

In this chapter, at least one interaction rule for movement between various interfaces will be described, and therefore, a description of each detailed interface will be omitted for convenience of description.

However, the contents of the above-described interfaces may be applied to each interface, and although not described above, various interfaces for playing an audio source may be applied.

In addition, when using the movement between various interfaces described in this chapter and between the audio source sets that play through each interface, linear and non-linear movement of music may be possible, and a new experience for music may be possible by breaking away from the conventional time-series musical structure.

In addition, in the present specification, a nonlinear movement of music, a nonlinear movement of an audio source, or a nonlinear movement of an audio source set may mean movement that is not restricted to time information of an audio source, and may mean a non-time-series movement, and may be understood as a concept different from the existing time-series and linear movements, but the present invention is not limited thereto.

Referring to FIG. 25, a first movement 1841 according to an embodiment may be a movement from the first interface 1810 to the second interface 1820.

In addition, according to an embodiment, when the time at which the first interface 1810 is provided exceeds a reference time, the first movement 1841 may be performed. For example, when the time at which the first interface 1810 is provided passes 1 minute, which is a reference time, the first movement 1841 may be performed and the second interface 1820 may be provided, but the present invention is not limited thereto.

In addition, according to an embodiment, the first movement 1841 may be performed according to the end of the first audio source set played in the first interface 1810. For example, in the case where the length of the first audio source set played in the first interface 1810 is 1 minute 30 seconds, when 1 minute and 30 seconds elapse because the first audio source set is played in the first interface 1810, and the first audio source set ends, the first movement 1841 may be performed to provide the second interface 1820, but the present invention is not limited thereto.

In addition, according to an embodiment, when a preset first type input is obtained from a user in the first interface 1810, the first movement 1841 may be performed. For example, when a swap input, which is a preset first type input, is obtained from the user in the first interface 1810, the first movement 1841 may be performed to provide the second interface 1820, but the present invention is not limited thereto.

In addition, in the above-described case, as the first movement 1841 from the first interface 1810 to the second interface 1820 is performed, the first audio source set may be played, and then the second audio source set may be played, and this may mean that the music section is moved, but the present invention is not limited thereto.

Accordingly, the above-described movement between interfaces may be understood as movement between audio source sets, and may also be understood as movement between interaction rule subsets, but redundant descriptions will be omitted.

Referring to FIG. 25, the second movement 1842 according to an embodiment may be a movement from the second interface 1820 to the first interface 1810.

In addition, according to an embodiment, when the time at which the second interface 1820 is provided exceeds a reference time, the second movement 1842 may be performed. For example, when the time at which the second interface 1820 is provided passes 1 minute, which is the reference time, the second movement 1842 may be performed to provide the first interface 1810, but the present invention is not limited thereto.

In addition, according to an embodiment, the second movement 1842 may be performed according to the end of the second audio source set played in the second interface 1820. For example, in the case where the length of the second audio source set played in the second interface 1820 is 1 minute 30 seconds, when 1 minute and 30 seconds elapse because the second audio source set is played in the second interface 1820, and the second audio source set ends, the second movement 1842 may be performed to provide the first interface 1810, but the present invention is not limited thereto.

In addition, according to an embodiment, when a preset first type input is obtained from a user in the second interface 1820, the second movement 1842 may be performed. For example, when a swap input, which is a preset first type input, is obtained from the user in the second interface 1820, the second movement 1842 may be performed to provide the first interface 1810, but the present invention is not limited thereto.

In addition, in the above-described case, as the second movement 1842 from the second interface 1820 to the first interface 1810 is performed, the second audio source set may be played, and then the first audio source set may be played, and this may mean that the music section is moved, but the present invention is not limited thereto.

Accordingly, the above-described movement between interfaces may be understood as movement between audio source sets, and may also be understood as movement between interaction rule subsets, but redundant descriptions will be omitted.

Referring to FIG. 25, a third movement 1843 according to an embodiment may be a movement from the first interface 1810 to the third interface 1830.

In this case, according to an embodiment, when a preset second type input is obtained from the user in the first interface 1810, the third movement 1843 may be performed. For example, when a bash input, which is a preset second type input, is obtained from a user in the first interface 1810, the third movement 1843 is performed to provide the third interface 1830, but the present invention is not limited thereto.

Further, according to an embodiment, the third movement 1843 may not be performed except when a preset second type input is obtained from the user in the first interface 1810. For example, even if the time at which the first interface 1810 is provided exceeds a reference time, or when the first audio source set played in the first interface 1810 is terminated, the third movement 1843 may not be performed.

In addition, in the above-described case, as the third movement 1843 from the first interface 1810 to the third interface 1830 is performed, the first audio source set may be played, and then the third audio source set may be played, and this may mean that the music section is moved, but the present invention is not limited thereto.

Accordingly, the above-described movement between interfaces may be understood as movement between audio source sets, and may also be understood as movement between interaction rule subsets, but redundant descriptions will be omitted.

In addition, in this case, the third interface 1830 may be an interface accessible only by user interaction, and accordingly, the third audio source set played in the third interface 1830 may be an audio source set played only by a user's interaction.

Referring to FIG. 25, a fourth movement 1844 according to an embodiment may be a movement from the second interface 1820 to the third interface 1830.

In this case, according to an embodiment, when a preset second type input is obtained from the user in the second interface 1820, the fourth movement 1843 may be performed. For example, when a bash input, which is a preset second type input, is obtained from the user in the second interface 1820, the fourth movement 1844 may be performed to provide the third interface 1830, but the present invention is not limited thereto.

In addition, according to an embodiment, the fourth movement 1844 may not be performed except when a preset second type input is obtained from the user in the second interface 1820. For example, even if the time when the second interface 1820 is provided exceeds the reference time or the second audio source set played in the second interface 1820 is terminated, the fourth movement 1844 may not be performed.

In addition, in the above-described case, as the fourth movement 1844 from the second interface 1820 to the third interface 1830 is performed, the second audio source set may be played, and then the third audio source set may be played, and this may mean that the music section is moved, but the present invention is not limited thereto.

Accordingly, the above-described movement between interfaces may be understood as movement between audio source sets, and may also be understood as movement between interaction rule subsets, but redundant descriptions will be omitted.

In addition, in this case, the third interface 1830 may be an interface accessible only by user interaction, and accordingly, the third audio source set played in the third interface 1830 may be an audio source set played only by a user's interaction.

Referring to FIG. 25, a fifth movement 1845 according to an embodiment may be a movement from the third interface 1830 to the first interface 1810.

In addition, according to an embodiment, when the time at which the third interface 1830 is provided exceeds a reference time, the fifth movement 1845 may be performed. For example, when the time at which the third interface 1830 is provided passes 30 seconds, which is a reference time, the fifth movement 1845 may be performed to provide the first interface 1810, but the present invention is not limited thereto.

In addition, according to an embodiment, the fifth movement 1845 may be performed according to the termination of the third audio source set played in the third interface 1830. For example, in the case where the length of the third audio source set played in the third interface 1830 is 30 seconds, when the third audio source set is terminated after 30 seconds elapse since the third audio source set is played in the third interface 1830, the fifth movement 1845 may be performed to provide the first interface 1810, but the present invention is not limited thereto.

In addition, according to an embodiment, when a preset first type input is obtained from the user in the third interface 1830, the fifth movement 1845 may be performed. For example, when a swap input, which is a preset first type input, is obtained from the user in the third interface 1830, the fifth movement 1845 may be performed to provide the first interface 1810, but the present invention is not limited thereto.

In addition, in the above-described case, as the fifth movement 1845 from the third interface 1830 to the first interface 1810 is performed, the third audio source set may be played, and then the first audio source set may be played, and this may mean that the music section is moved, but the present invention is not limited thereto.

Accordingly, the above-described movement between interfaces may be understood as movement between audio source sets, and may also be understood as movement between interaction rule subsets, but redundant descriptions will be omitted.

Referring to FIG. 25, a sixth movement 1846 according to an embodiment may be a movement from the third interface 1830 to the second interface 1820.

In addition, according to an embodiment, when the time at which the third interface 1830 is provided exceeds a reference time, the sixth movement 1846 may be performed. For example, when the time at which the third interface 1830 is provided passes 30 seconds, which is a reference time, the sixth movement 1846 may be performed to provide the second interface 1820, but the present invention is not limited thereto.

In addition, according to an embodiment, the sixth movement 1846 may be performed according to the termination of the third audio source set played in the third interface 1830. For example, in the case where the length of the third audio source set played in the third interface 1830 is 30 seconds, when the third audio source set is terminated after 30 seconds elapse since the third audio source set is played in the third interface 1830, the sixth movement 1846 may be performed to provide the second interface 1820, but the present invention is not limited thereto.

In addition, according to an embodiment, when a preset first type input is obtained from the user in the third interface 1830, the sixth movement 1846 may be performed. For example, when a swap input, which is a preset first type input, is obtained from the user in the third interface 1830, the sixth movement 1846 may be performed to provide the second interface 1820, but the present invention is not limited thereto.

In addition, in the above-described case, as the sixth movement 1846 from the third interface 1830 to the second interface 1820 is performed, the third audio source set may be played, and then the second audio source set may be played, and this may mean that the music section is moved, but the present invention is not limited thereto.

Accordingly, the above-described movement between interfaces may be understood as movement between audio source sets, and may also be understood as movement between interaction rule subsets, but redundant descriptions will be omitted.

In addition, the interaction rules for implementing the first to sixth movements 1841 to 1846 described above may be applied in addition to the above-described contents by way of example.

In addition, the first type input and the second type input may be different from each other.

For example, the first type input may be a swap input, and the second type input may be a bash input, but the present invention is not limited thereto.

In addition, for example, the number of inputs of the second type input, length of the input period, number of input points, input area or input speed may be greater than the number of times the first type input is input, longer than the length of the input period, more than the number of input points, greater than the input area, or faster than the input speed, but the present invention is not limited thereto.

In addition, the above-described first to third audio source sets may be part of one piece of music, and in this case, the third audio source set may be a highlight part of music, but the present invention is not limited thereto.

In addition, the highlight part of the music may be extracted based on the frequency analysis of the music, the energy analysis, the analysis of the instrument sound constituting the audio source, the analysis of the vocal sound, the analysis of the atmosphere of the music, the analysis of the time information of the music, etc. and is not limited thereto, and may be understood as a highlight part that can be understood by a person skilled in the art.

In addition, when playing an audio source using the above-described interface, it is possible to play across the structure of the audio source in time series/non-time series by breaking away from the existing time-series audio source playback method, an interface that can only be accessed through a user's interaction and an audio source that can be played are provided, so that more various audio sources can be played using the user's interaction.

FIG. 26 is a flowchart illustrating a realistic audio source playback method according to an embodiment.

Before describing FIG. 26, the realistic audio source playback method according to an embodiment described based on FIG. 26 may be implemented using at least one of the aforementioned interfaces, but is not limited thereto, and it is apparent that although not included in the above examples, the method can be implemented using an interface for implementing a realistic audio source playback method according to an embodiment.

In addition, the realistic audio source playback method according to an embodiment may be performed by at least one processor, and is described based on a flowchart for convenience of description, but may be performed regardless of the order described in the flowchart.

Referring to FIG. 26, a realistic audio source playback method according to an embodiment may include displaying at least one object for non-linearly playing the first audio source set, the second audio source set, and the third audio source set (S1910), and playing at least one audio source set of the first audio source set, the second audio source set, and the third audio source set (S1920).

At this time, the realistic audio source playback method according to an embodiment non-linearly plays a first audio source set corresponding to a first section of music, a second audio source set corresponding to a second section of music, and a third audio source set corresponding to a third section of music based on user interaction, but the present invention is not limited thereto.

In addition, since the above-described audio source and audio source set are applied to the first, second, and third audio source sets, redundant descriptions will be omitted.

In addition, according to an embodiment, in order to non-linearly play the first, second and third audio source sets based on the user's interaction, when the first input for the at least one object is obtained when the first audio source set is played, the second audio source set is played irrespective of whether the first audio source set is terminated, and when the second input for the at least one object is obtained when the first audio source set is played, the third audio source set is played irrespective of whether the first audio source set is terminated, and the second audio source set is played as at least one audio source set of the first and third audio source sets is terminated, but the third audio source set may be set not to be played when the first and second audio source sets are terminated.

In addition, according to an embodiment, in order to non-linearly play the first, second and third audio source sets based on the user's interaction, the second audio source set is played according to the end of at least one audio source set of the first and third audio source sets, and when an input to the at least one object of the first or second audio source set play is acquired, regardless of the end of the first or second audio source set, the third audio source set is set to play, and if there is no input to the at least one object among the play of the first or second audio source set, it may be set not to play.

Further, according to an embodiment, the average energy of the third audio source set at the same volume level may be greater than the average energy of the second audio source set.

In addition, according to an embodiment, in order to non-linearly play the first, second and third audio source sets based on the user's interaction, when the first input for the at least one object is obtained when the first audio source set is played, the second audio source set is played irrespective of whether the first audio source set is terminated, and when the second input for the at least one object is obtained when the first audio source set is played, the third audio source set is played irrespective of whether the first audio source set is terminated, and the average energy of the third audio source set at the same volume is greater than the average energy of the second audio source set, and the number of times of inputting the second input or the length of the input period may be greater than the number of times of inputting the first input or longer than the length of the input period of the first input.

In addition, according to an embodiment, the first audio source set may correspond to a first portion of music, the second audio source set may correspond to a second portion of the music, and the third audio source set may correspond to a third portion of the music.

In addition, according to an embodiment, the number of times the second input is input or the length of the input period may be greater than the number of times that the first input is input or longer than the length of the input period of the first input.

According to the realistic audio source playback method according to an embodiment of the present invention described above, users can create a more diverse musical experience that goes beyond the temporal limitations of existing music by allowing users to experience movement between audio source sets constituting one or more music, and it is possible to provide a new musical experience that expands variously in time by breaking the stereotype of the existing music played within a limited time.

FIG. 27 is a flowchart illustrating a realistic audio source playback method according to an embodiment.

Before describing FIG. 27, the realistic audio source playback method according to an embodiment described based on FIG. 27 may be implemented using at least one of the aforementioned interfaces, but is not limited thereto, and it is apparent that although not included in the above examples, the method can be implemented using an interface for implementing a realistic audio source playback method according to an embodiment.

In addition, the realistic audio source playback method according to an embodiment may be performed by at least one processor, and is described based on a flowchart for convenience of description, but may be performed regardless of the order described in the flowchart.

Referring to FIG. 27, a realistic audio source playback method according to an embodiment may include playing the first audio source set and displaying the first object (S2010), changing the musical effect of the first audio source set in response to the first type input when the first type input for the first object is obtained when the first audio source set is played (S2020), displaying a second object in response to the second type input and playing a second audio source set different from the first audio source set as a second type input for the first object is obtained when the first audio source set is played (S2030), changing a musical effect of the second audio source set in response to the first type input when the first type input for the second object is obtained when the second audio source set is played (S2040), displaying a third object in response to the third type input and playing a third audio source set when a third type input for the second object is obtained when the second audio source set is played (S2050), and changing the musical effect of the third audio source set in response to the first type input when the first type input for the third object is obtained when the third audio source set is played (S2060).

At this time, the realistic audio source playback method according to an embodiment non-linearly plays a first audio source set corresponding to a first section of music, a second audio source set corresponding to a second section of music, and a third audio source set corresponding to a third section of music based on user interaction, but the present invention is not limited thereto.

In addition, since the above-described audio source and audio source set are applied to the first, second, and third audio source sets, redundant descriptions will be omitted.

Also, according to one embodiment, as the second type input for the third object is obtained when the third audio source set is played, the method may further include playing one of the first audio source set and the second audio source set in response to the second type input.

Also, according to one embodiment, as the second type input for the third object is obtained when the third audio source set is played, the method may further include playing one of the first audio source set and the second audio source set in response to the second type input.

Also, according to one embodiment, as the third type input for the first object is obtained when the first audio source set is played, the method may further include displaying the third object and playing the third audio source set in response to the third type input.

Also, according to one embodiment, the first object, the second object, and the third object may have different shapes.

Also, according to one embodiment, the type of instrument sound included in the third audio source set is more than the type of instrument sound included in the second audio source set, and the number of sides of the third object may be greater than the number of sides of the second object.

According to the realistic audio source playback method according to an embodiment of the present invention described above, users can create a more diverse musical experience that goes beyond the temporal limitations of existing music by allowing users to experience movement between audio source sets constituting one or more music, and it is possible to provide a new musical experience that expands variously in time by breaking the stereotype of the existing music played within a limited time.

The method according to the embodiment may be implemented in the form of program instructions that can be executed through various computer means and recorded in a computer-readable medium. The computer-readable medium may include program instructions, data files, data structures, etc. alone or in combination. The program instructions recorded in the medium may be specially designed and configured for embodiments, or may be known and usable to those skilled in computer software. Examples of computer-readable recording media include hardware devices specially configured to store and execute program instructions, for example, magnetic media such as hard disks, floppy disks and magnetic tapes, optical media such as CD-ROM and DVD, magneto-optical media such as a floptical disk, and ROM, RAM, flash memory, etc. Examples of the program instructions include not only machine language codes such as those produced by a compiler, but also high-level language codes that can be executed by a computer using an interpreter or the like. The above-described hardware device may be configured to operate as one or more software modules to perform the operation of an embodiment, and vice versa.

Effects of the present disclosure will not be limited to the above-described effects, and unstated effects can be clearly understood by those skilled in the art through the specification and the attached drawings.

Although the limited embodiments have been described above with reference to the drawings, a variety of modifications and changes may be made by one of ordinary skill in the art from the above disclosure. For example, an adequate result may be achieved even when the above-described technologies are performed in a different sequence from the above-described method and/or the above-described components such as a system, a structure, a device, a circuit, and the like are coupled or combined in a different form from the above-described method or are replaced or substituted by other components or equivalents thereof.

Therefore, other implements, other embodiments, and equivalents of the claims will be included within the scope of the claims.

What is claimed is:

1. An operation method of an electronic device including:
obtaining a music file including a plurality of audio sources;
outputting a first sound having a first frequency spectrum corresponding to a first part of the music file while displaying a first screen including at least one first object corresponding to the first part of the music file;
identifying an input of a user for the at least one first object while outputting the first sound;
when a first condition related to the identified input is satisfied:
when the identified input is the first input, outputting a second sound having a second frequency spectrum while displaying a second screen to which a first visual effect is applied; and
when the identified input is the second input, outputting a third sound having a third frequency spectrum while displaying a third screen to which a second visual effect is applied;
when a second condition related to the identified input is satisfied:
outputting a second sound having a fourth frequency spectrum corresponding to a second part of the music file while displaying a second screen including at least one second object corresponding to the second part of the music file.

2. The operation method of claim 1,
wherein the first condition is satisfied when an input less than a specified number of times is received for the at least one first object,
when the identified input is the first input, outputting the first sound based on controlling at least one first audio source among the plurality of audio sources; and
when the identified input is the second input, outputting a second sound based on controlling at least one second audio source among the plurality of audio sources.

3. The operation method of claim 1, wherein the second condition is a condition satisfied when an input for the at least one first object is received a specified number of times or more.

4. The operation method of claim 3, wherein the first screen is a first interface, and the second screen is a second interface.

5. The operation method of claim 4, When an input less than the specified number of times is received while the music file is being played, the second screen is not provided.

6. An electronic device including:
a speaker;
a display;
a memory storing a program; and
at least one processor, wherein, when the program executed, the program causes the at least one processor to:
obtain a music file including a plurality of audio sources;
output, using the speaker, a first sound having a first frequency spectrum corresponding to a first part of the music file while displaying, on the display, a first screen including at least one first object corresponding to the first part of the music file;
identify an input of a user for the at least one first object while outputting the first sound;
when a first condition related to the identified input is satisfied:
when the identified input is the first input, outputting, using the speaker, a second sound having a second frequency spectrum while displaying, on the display, a second screen to which a first visual effect is applied; and
when the identified input is the second input, outputting a third sound, using the speaker, having a third frequency spectrum while displaying, on the display, a third screen to which a second visual effect is applied;
when a second condition related to the identified input is satisfied:
outputting a second sound, using the speaker, having a fourth frequency spectrum corresponding to a second part of the music file while displaying, on the display, a second screen including at least one second object corresponding to the second part of the music file.

* * * * *